US012346899B2

(12) United States Patent
Kapur et al.

(10) Patent No.: US 12,346,899 B2
(45) Date of Patent: Jul. 1, 2025

(54) METHODS FOR EVOLUTION OF TOKENIZED ARTWORK, CONTENT EVOLUTION TECHNIQUES, NON-FUNGIBLE TOKEN PEELING, USER-SPECIFIC EVOLUTION SPAWNING AND PEELING, AND GRAPHICAL USER INTERFACE FOR COMPLEX TOKEN DEVELOPMENT AND SIMULATION

(71) Applicant: Artema Labs, Inc, Los Angeles, CA (US)

(72) Inventors: Ajay Kapur, Valencia, CA (US); Bjorn Markus Jakobsson, Portola Valley, CA (US); Stephen C. Gerber, Austin, TX (US); Perry R. Cook, Jacksonville, OR (US); Rebecca Anne Fiebrink, London (GB)

(73) Assignee: Artema Labs, Inc, Los Angeles, CA (US)

( * ) Notice: Subject to any disclaimer, the term of this patent is extended or adjusted under 35 U.S.C. 154(b) by 0 days.

(21) Appl. No.: 17/929,894

(22) Filed: Sep. 6, 2022

(65) Prior Publication Data

US 2023/0070586 A1  Mar. 9, 2023

Related U.S. Application Data

(60) Provisional application No. 63/293,739, filed on Dec. 24, 2021, provisional application No. 63/275,713, (Continued)

(51) Int. Cl.
*G06Q 20/38* (2012.01)
*G06Q 20/12* (2012.01)
(Continued)

(52) U.S. Cl.
CPC ........ *G06Q 20/389* (2013.01); *G06Q 20/123* (2013.01); *G06Q 20/3678* (2013.01); *G06Q 30/08* (2013.01)

(58) Field of Classification Search
CPC .................................................... G06Q 20/389
See application file for complete search history.

(56) References Cited

U.S. PATENT DOCUMENTS 10,505,726 B1 * 12/2019 Andon ................. H04L 9/0866
10,949,994 B1 *  3/2021 Scheffler ................ G06T 7/73
(Continued)

FOREIGN PATENT DOCUMENTS

WO    WO-2021231911 A1 * 11/2021 ......... G06F 16/2379
WO       2023035008 A1    3/2023

OTHER PUBLICATIONS

Blockchain in Media—A True Calling?, IEEE (Year: 2019).*
(Continued)

*Primary Examiner* — Bruce I Ebersman
(74) *Attorney, Agent, or Firm* — KPPB LLP

(57) ABSTRACT

Non-fungible evolution platforms in accordance with various embodiments of the invention are described. In an embodiment, an NFT evolution platform, includes: a network interface; memory; and a processor, the processor configured to: generate an NFT that includes several layers, where each layer includes content, provide access to a first set of layers of the several layers of the NFT, detect a trigger event, and provide access to a different second set of layers of the several layers of the NFT.

6 Claims, 49 Drawing Sheets

Related U.S. Application Data filed on Nov. 4, 2021, provisional application No. 63/255,032, filed on Oct. 13, 2021, provisional application No. 63/248,570, filed on Sep. 27, 2021, provisional application No. 63/240,953, filed on Sep. 5, 2021.

(51) Int. Cl.
*G06Q 20/36* (2012.01)
*G06Q 30/08* (2012.01)

(56) References Cited

U.S. PATENT DOCUMENTS

| | | | |
|---|---|---|---|
| 10,977,696 | B1 | 4/2021 | Jakobsson |
| 11,192,033 | B1* | 12/2021 | Koch ................ A63F 13/35 |
| 11,367,060 | B1* | 6/2022 | Barbashin .......... H04N 21/2743 |
| 11,605,062 | B2* | 3/2023 | Prakash ............. G06Q 20/3672 |
| 2020/0005284 | A1* | 1/2020 | Vijayan ................ H04L 9/3247 |
| 2020/0184041 | A1* | 6/2020 | Andon ................ H04L 9/0891 |
| 2020/0184547 | A1* | 6/2020 | Andon ............... G06Q 30/0209 |
| 2020/0273048 | A1* | 8/2020 | Andon .................. G06Q 10/02 |
| 2020/0328891 | A1 | 10/2020 | Drouot |
| 2020/0342539 | A1 | 10/2020 | Doney |
| 2021/0248214 | A1 | 8/2021 | Goldston et al. |
| 2021/0256070 | A1* | 8/2021 | Tran ................ G06F 16/90332 |
| 2021/0258155 | A1 | 8/2021 | Andon et al. |
| 2021/0326872 | A1* | 10/2021 | Robotham .......... G06Q 20/401 |
| 2021/0357489 | A1* | 11/2021 | Tali ..................... G06F 16/2379 |
| 2022/0040557 | A1* | 2/2022 | Tran ........................ G06F 1/163 |
| 2022/0300966 | A1 | 9/2022 | Andon et al. |
| 2022/0391887 | A1* | 12/2022 | Jakobsson ............. H04L 9/3239 |
| 2022/0398340 | A1 | 12/2022 | Jakobsson et al. |
| 2022/0407702 | A1 | 12/2022 | Jakobsson et al. |
| 2023/0004970 | A1 | 1/2023 | Jakobsson et al. |
| 2023/0009304 | A1 | 1/2023 | Jakobsson et al. |
| 2023/0011621 | A1 | 1/2023 | Jakobsson et al. |
| 2023/0041807 | A1* | 2/2023 | Benedetto .......... G06Q 30/0645 |
| 2023/0043223 | A1* | 2/2023 | Jakobsson ............... G06F 21/44 |

OTHER PUBLICATIONS

Fusing Blockchain and AI With Metaverse: A Survey IEEE (Year: 2022).*
Decentralized Applications: The Blockchain-Empowered Software System Arciv (Year: 2018).*
A Survey of Blockchain, Artificial Intelligence, and Edge Computing for Web 3.0, IEEE (Year: 2023).*
U.S. Appl. No. 17/401,687, filed Aug. 13, 2021, 242 pages.
U.S. Appl. No. 63/210,040, filed Jun. 13, 2021, 55 pages (presented in two parts).
U.S. Appl. No. 63/213,251, filed Jun. 22, 2021, 49 pages.
U.S. Appl. No. 63/219,864, filed Jul. 9, 2021, 33 pages.
U.S. Appl. No. 63/220,641, filed Jul. 12, 2021, 42 pages.
U.S. Appl. No. 63/232,728, filed Aug. 13, 2021, 27 pages.
U.S. Appl. No. 63/233,304, filed Aug. 15, 2021, 25 pages.
U.S. Appl. No. 63/235,682, filed Aug. 21, 2021, 20 pages.
U.S. Appl. No. 63/240,953, filed Sep. 5, 2021, 28 pages.
U.S. Appl. No. 63/248,570, filed Sep. 27, 2021, 17 pages.
U.S. Appl. No. 63/254,062, filed Oct. 9, 2021, 19 pages.
U.S. Appl. No. 63/255,032, filed Oct. 13, 2021, 19 pages.
U.S. Appl. No. 63/270,092, filed Oct. 21, 2021, 16 pages.
U.S. Appl. No. 63/270,386, filed Oct. 21, 2021, 16 pages.
U.S. Appl. No. 63/275,713, filed Nov. 4, 2021, 20 pages.
U.S. Appl. No. 63/281,721, filed Nov. 21, 2021, 19 pages.
U.S. Appl. No. 63/293,809, filed Dec. 26, 2021, pages.
Boneh et al., "Private Information Retrieval", Retrieved from https://crypto.stanford.edu/pir-library on Aug. 27, 2024, 1 page.
Goldschlag et al., "Onion Routing for Anonymous and Private Internet Connections", Communications of the ACM, Feb. 1999, 42(2) DOI:10.1145/293411.293443, 6 pgs.
Schnorr et al., "Security of Signed ElGamal Encryption", Lecture Notes in Computer Science vol. 1976, pp. 73-89, Dec. 2000, DOI:10.1007/3-540-44448-3_7.
International Preliminary Report on Patentability for International Application PCT/US2022/075973, Report issued Mar. 5, 2024, Mailed on Mar. 14, 2024, 8 Pgs.
International Search Report and Written Opinion for International Application No. PCT/US2022/075973, Search completed Jan. 4, 2023, Mailed Jan. 31, 2023, 17 Pgs.

* cited by examiner

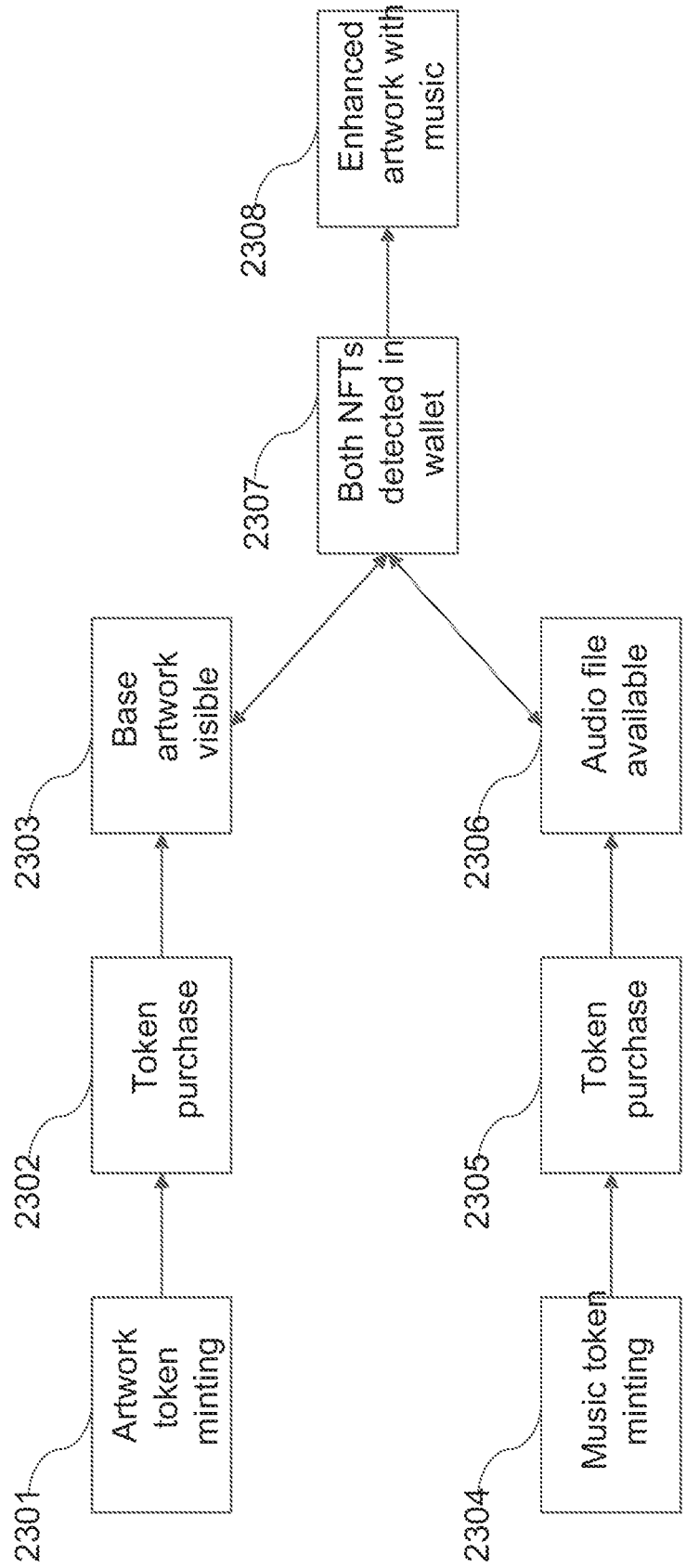

METHODS FOR EVOLUTION OF TOKENIZED ARTWORK, CONTENT EVOLUTION TECHNIQUES, NON-FUNGIBLE TOKEN PEELING, USER-SPECIFIC EVOLUTION SPAWNING AND PEELING, AND GRAPHICAL USER INTERFACE FOR COMPLEX TOKEN DEVELOPMENT AND SIMULATION

CROSS-REFERENCE TO RELATED APPLICATION

This application claims benefit of and priority under 35 U.S.C. 119(e) to U.S. Provisional Patent Application No. 63/240,953, entitled "Evolution of Tokenized Artwork" by Kapur et al., filed Sep. 5, 2021, U.S. Provisional Patent Application No. 63/248,570, entitled "Content Evolution Techniques" by Jakobsson, filed Sep. 27, 2021, U.S. Provisional Patent Application No. 63/255,032, entitled "Non-Fungible Token Peeling" by Jakobsson, filed Oct. 13, 2021, U.S. Provisional Patent Application No. 63/275,713, entitled "User-Specific Evolution, Spawning and Peeling" by Jakobsson et al., filed Nov. 4, 2021, and U.S. Provisional Patent Application No. 63/293,739, entitled "Graphical User Interface for Complex Token Development and Simulation" by Jakobsson et al., filed Dec. 24, 2021, the disclosures of which are hereby incorporated by reference in their entirety for all purposes.

FIELD OF THE INVENTION

This invention relates to non-fungible token (NFT) in distributed and tokenized environments.

BACKGROUND

The emergence of Non-Fungible Token (NFT) marketplaces has allowed artists to reach buyers. However, current systems do not enable the full potential for the marketplaces. For one thing, current marketplaces allow only purchases of static artwork. Furthermore, the trading of tokens is becoming increasingly common. In particular, an NFT may be used for assigning a digital representation of ownership for digital items, such as images, but also other physical items. A current holder of an NFT is typically provided asset usage rights for the underlying NFT asset. Different tokens may be associated with different values, where some tokens may be associated with very high values and some tokens may be associated with more moderate value. Furthermore, as tokens become increasingly complex, it may be increasingly difficult for content producers to understand, control and anticipate expressed functionality.

In the context blockchains, the term smart contract is often used to refer to software programs that run on a blockchain. While a standard legal contract outlines the terms of a relationship (usually one enforceable by law), a smart contract enforces a set of rules using cryptographic code. Smart contracts are often developed as high-level programming abstractions that can be compiled down to bytecode that can be deployed to a blockchain for execution by computer systems using a virtual machine deployed in conjunction with the blockchain. Once a smart contract is written to a blockchain, the code of the smart contract acts as a programmatically defined autonomous agent with its own persistent variables (and often key/value store) that executes by computer systems within the blockchain when the smart contract is referenced by a message and/or transaction. In many instances, smart contracts execute by leveraging the code of other smart contracts in a manner similar to calling upon a software library.

SUMMARY OF THE INVENTION

Systems and method for generating evolving non-fungible tokens (NFTs) in distributed and tokenized environments in accordance with various embodiments of the invention are described.

One embodiment of the invention includes a non-fungible token evolution platform, including: several computer systems connected via a network, where the several computer systems: form at least one immutable ledger; and provide a non-fungible token (NFT) registry, where entries in the NFT registry correspond to programmatically defined smart contracts written to the at least one immutable ledger, where at least one of the computer systems is configured as an NFT registry service, where the NFT registry service is configured to: authenticate content creator credentials; mint NFTs to the at least one immutable ledger; and record the minted NFT in the NFT registry, where minted NFTs are cryptographically co-signed by the NFT registry service and an authenticated content creator, where NFTs are cryptographic tokens that are created with respect to content, where an NFT includes several layers, each layer associated with a particular content; and several user devices, where each user device is configured by a media wallet application to: securely store NFTs owned by the user on the user device; send a communication to the several computer systems to write media consumption data to the at least one immutable ledger in conjunction with a set of data access permissions; display in a user interface, an NFT with several layers displayed based on transparency settings of the several layers; detect a trigger event based on a smart contract associated with the NFT and update the transparency settings of the several layers of the NFT; display in the user interface, the NFT with the several layers based on the updated transparency settings.

An NFT evolution platform in accordance with an embodiment of the invention includes a network interface; memory; and a processor, the processor configured to: generate a non-fungible token (NFT) includes several layers, each layer including content; provide access to a first set of layers of the several layers of the NFT; detect a trigger event; and provide access to a different second set of layers of the several layers of the NFT.

In a further embodiment, the NFT evolution platform further includes:
  associating a smart contract with the NFT; and detecting the trigger event based on the smart contract.

In a further embodiment, detecting a trigger event includes detecting at least one event selected from the group consisting of: detecting a transaction associated with the NFT; detecting a geophysical location of a device associated with the NFT is at a particular location; detecting a monetary value associated with the NFT; and detecting an amount of bidding activity associated with the NFT.

In still a further embodiment, at least one layer of the several layers of the NFT is encrypted.

In still a further embodiment again, the NFT evolution platform further includes: generating a smart contract that provides an asset control policy associated with the NFT; storing the smart contract in a storage element of the NFT; and placing the storage element on a blockchain.

In still a further embodiment, the storage elements on the blockchain are linked, where a more recent storage element references a prior storage element and adds data that augments the prior storage element.

In still a further embodiment, the NFT is associate with a timestamp and a GPS location, wherein detecting the triggering event includes using the timestamp and the GPS location of the NFT.

In still a further embodiment, the NFT evolution platform further includes accessing data from at least one digital wallet associated with the NFT, where detecting the triggering event includes using data from the at least one digital wallet associated with the NFT.

In still a further embodiment, the data from the at least one digital wallet includes different types of data including data selected from the group consisting of location data, sound data, voice data, biometric data, audio data, image data, and QR-codes.

In still a further embodiment, the NFT evolution platform further includes generating a new NFT based on the triggering event.

A non-fungible token (NFT) evolution platform in accordance with an embodiment of the invention includes: a network interface; memory; and a processor, the processor configured to: extracting from a first token a first compatibility indicator value; extracting from a second token a second compatibility indicator value; determining, based on the first compatibility indicator value and the second compatibility indicator value that the first token and the second token are compatible; extracting from the first token a first content information; extracting from the second token a second content information; generating, based on the first content information and the second content information, a third content information; and generating a third token comprising a third compatibility indicator value and the third content information, wherein the third compatibility indicator value is based at least in part on the first compatibility indicator value and the second compatibility indicator value.

In still a further embodiment, the third token replaces at least one of the first token and the second token.

In still a further embodiment at least one of the first compatibility indicator value and the second compatibility indicator value indicates a family.

In still a further embodiment the third content information includes, at least in part, the first content information and the second content information.

In still a further embodiment the third content information is generated based on a model trained by the first content information.

In still a further embodiment the third content information is computed by applying the model to the second content information.

In still a further embodiment at least one of the first content information or the second content information includes a representation of audio.

In still a further embodiment at least one of the first content information or the second content information includes a representation of an image.

In still a further embodiment at least one of the first content information or the second content information includes a representation of video.

In still a further embodiment at least one of the first content information or the second content information includes executable content.

In still a further embodiment the generation of the third token is conditional on the first token and the second token having the same owner.

In still a further embodiment the generation of the third token is conditional on a user action.

In still a further embodiment the generation of the third token is conditional on an event recorded on a blockchain.

In still a further embodiment the first token and the second token comprise origination indicators.

In still a further embodiment the third token includes an origination indicator that is based on the origination indicators of the first token and the second token.

In still a further embodiment the generation of the third token is conditional on a signal transmitted by an entity indicated in at least one of the origin indicator of the first token and the origin indicator of the second token.

In still a further embodiment the third token information is based on a fitness score associated with the first token.

In still a further embodiment the fitness score is based on a value associated with an ownership change transaction.

In still a further embodiment the fitness score is based on a number of times the first token content has been rendered.

In still a further embodiment the fitness score is based on a feedback score provided by a user associated with the rendering of the first token content.

A non-fungible token (NFT) evolution platform in accordance with an embodiment of the invention includes: a network interface; memory; and a processor, the processor configured to: receive a first NFT comprising content; receive a second NFT comprising content; determine compatibility of the first NFT and the second NFT; and generate a third NFT that combines content from the first NFT and the second NFT.

In still a further embodiment each NFT is associated with a score, wherein the score is based on transactions associated with the NFT.

In still a further embodiment the third NFT replaces at least one of the first NFT and the second NFT by modifying content of the first NFT and the second NFT.

In still a further embodiment the third NFT is a new NFT.

In still a further embodiment, the NFT evolution platform further comprising detecting a triggering event and generating the third NFT in response to the detection.

A non-fungible token (NFT) evolution platform in accordance with an embodiment of the invention includes: a network interface; memory; and a processor, the processor configured to: receive, using a user interface, a selection of a token; receive a request to initiate an update; initiate the update by committing the selected token from a wallet to a switch; perform, by the switch, a determination regarding whether the selected token can be updated; upon determining that the selected token can be updated, perform an update of the selected token; and commit the updated token from the switch to the wallet.

In still a further embodiment, the token is a non-fungible token (NFT).

In still a further embodiment, the token corresponds to first content that represents a first artwork, and where updated token corresponds to second content that represents a second artwork different from the first artwork.

In still a further embodiment the user interface includes a graphical user interface (GUI).

In still a further embodiment a selected token is committed by modifying its ownership status.

In still a further embodiment the switch is part of the wallet.

In still a further embodiment the switch is a processing environment associated with the creator of a content associated with the token.

In still a further embodiment the switch is a distributed processing entity.

In still a further embodiment the determination is made by evaluating a policy.

In still a further embodiment the token includes data representative of the policy.

In still a further embodiment the switch has access to a database storing the policy.

In still a further embodiment the updated token is associated with the policy.

In still a further embodiment the updated token is not associated with the policy.

In still a further embodiment the switch generates a log entry based on the request.

In still a further embodiment the log entry is used to identify an anomaly.

In still a further embodiment the log entry is used to perform a recommendation.

A non-fungible token (NFT) evolution platform in accordance with an embodiment of the invention, includes: a network interface; memory; and a processor, the processor configured to: generate a first NFT comprising a first set of functionalities; receive an indication to peel the first NFT; and modify the first NFT to provide a different second set of functionalities.

In still a further embodiment modifying the first NFT includes determining the first NFT is peelable and updating the first NFT to provide a different second set of functionalities.

In still a further embodiment modifying the first NFT comprising determining that the first NFT is not peelable and destroying the first NFT.

In still a further embodiment the first NFT is peeled N times to generate N new NFTs that each provide different sets of functionalities.

In still a further embodiment the first NFT provides a visual indicator regarding characteristics of the first NFT.

In still a further embodiment modifying the first NFT includes modifying content being referenced by a link in the first NFT.

In still a further embodiment modifying the first NFT includes generating a new second NFT that inherits properties of the first NFT.

A non-fungible token (NFT) evolution platform in accordance with an embodiment of the invention includes: a network interface; memory; and a processor, the processor configured to: receive, based on a triggering event, an anonymized request based at least in part of a user profile, wherein the user profile is based on the content of a wallet; convey a content indicator based on the anonymized request; and facilitate a transaction based on a conversion event, wherein the conversion event is associated with the content indicator.

In still a further embodiment the content indicator is related to a non-fungible token (NFT).

In still a further embodiment the triggering event is a user action associated with the wallet.

In still a further embodiment the triggering event is a publicly recorded event.

In still a further embodiment the user action includes an interaction with a non-fungible token (NFT).

In still a further embodiment the anonymized request hides the content of the wallet.

In still a further embodiment the anonymized request hides the identity of the wallet.

In still a further embodiment the anonymized request hides information related to the triggering event.

In still a further embodiment wallet stores at least one of a non-fungible token (NFT) and a crypto currency element.

In still a further embodiment the content indicator is provided by a content provider.

In still a further embodiment the content indicator is selected based on determining a winning bid.

In still a further embodiment the winning bid is associated with the anonymized request.

In still a further embodiment the conversion event corresponds to a rendering of content associated with the content indicator.

In still a further embodiment the conversion event corresponds to a financial transaction.

In still a further embodiment the conversion event corresponds to a use of content associated with the content indicator.

In still a further embodiment the triggering event is associated with at least one of evolution, spawning or peeling.

In still a further embodiment the payment is associated with a bid.

In still a further embodiment the content indicator is determined based on a bid.

In still a further embodiment the transaction is a purchase.

In still a further embodiment the transaction is a transfer of ownership.

A non-fungible token (NFT) evolution platform in accordance with an embodiment of the invention includes: a network interface; memory; and a processor, the processor configured to: generate a first NFT comprising a first content; detect a triggering event; and generate a second NFT comprising a second content, wherein the second content is determined based on a user profile associated with the first NFT.

In still a further embodiment the triggering event is a peeling of the first NFT.

In still a further embodiment the second NFT is at least one NFT selected from the group consisting of a modification to the first NFT and a newly minted NFT.

In still a further embodiment, the NFT evolution platform further includes obtaining data from a digital wallet associated with the first NFT and generating the second NFT based on the data.

In still a further embodiment, the NFT evolution platform further includes determining a user profile associated with the first NFT by obtaining data regarding transactions related to the first NFT and data regarding transactions associated with the user.

In still a further embodiment, the NFT evolution platform further includes removing personally identifiable information (PII) from the user profile.

A non-fungible token (NFT) evolution platform for configuring content in accordance with an embodiment of the invention includes: an upload entity, a processing entity, a recommendation entity, and a graphical user interface, wherein: the upload entity is configured to receive at least one content element; the processing entity makes a determination associated with the at least one content element; the recommendation entity generates a selection of a parameter based at least in part of the determination; the graphical user interface conveys information related to the parameter to a user, and obtains a user input; and the processing entity outputs data comprising the parameter, thereby facilitating the generation of a non-fungible token comprising at least a portion of the at least one content element and configured using the parameter.

In still a further embodiment the determination is based on a clustering of content.

In still a further embodiment the determination is based on an identity associated with the at least one content element.

In still a further embodiment the determination is performed using a simulation.

In still a further embodiment the determination is performed using a machine learning component associated with the processing entity.

In still a further embodiment the user input is provided to the recommendation engine, the input indicating a basis of ranking.

In still a further embodiment the basis of ranking includes at least one of a maximization of estimated profit, a maximization of estimated references, a maximization of estimated access.

In still a further embodiment the parameter governs an event associated with at least one of an evolution, a spawning or a peeling associated with the at least one content element.

In still a further embodiment the parameter specifies a triggering event.

In still a further embodiment the parameter governs a number of NFTs generated from the at least one content element.

In still a further embodiment the parameter governs a royalty policy.

In still a further embodiment the at least one content element includes an audio file.

In still a further embodiment the at least one content element includes a video file.

In still a further embodiment the at least one content element includes an image file.

In still a further embodiment the at least one content element includes an executable file.

In still a further embodiment the graphical user interface is used to render a simulation result.

In still a further embodiment the graphical user interface is used to render a description of a cluster.

In still a further embodiment the graphical user interface is used to render a description of a basis for a ranking.

In still a further embodiment the graphical user interface is used to render a ranking.

In still a further embodiment the graphical user interface is used to render at least two selectable input options.

A method of processing evolving non-fungible tokens (NFTs) in an NFT evolution platform in accordance with an embodiment of the invention, includes: generating a non-fungible token (NFT) comprising several layers, each layer includes content; providing access to a first set of layers of the several layers of the NFT; detecting a trigger event; and providing access to a different second set of layers of the several layers of the NFT.

A method of processing evolving non-fungible tokens (NFTs) in an NFT evolution platform in accordance with an embodiment of the invention includes: extracting from a first token a first compatibility indicator value; extracting from a second token a second compatibility indicator value; determining, based on the first compatibility indicator value and the second compatibility indicator value that the first token and the second token are compatible; extracting from the first token a first content information; extracting from the second token a second content information; generating, based on the first content information and the second content information, a third content information; and generating a third token includes a third compatibility indicator value and the third content information, wherein the third compatibility indicator value is based at least in part on the first compatibility indicator value and the second compatibility indicator value.

A method of processing non-fungible tokens (NFT) in an NFT evolution platform in accordance with an embodiment of the invention includes: receiving a first non-fungible token (NFT) includes content; receiving a second NFT includes content; determining compatibility of the first NFT and the second NFT; and generating a third NFT that combines content from the first NFT and the second NFT.

A method of processing non-fungible tokens (NFT) in an NFT evolution platform in accordance with an embodiment of the invention includes: receiving, using a user interface, a selection of a token; receiving a request to initiate an update; initiating an update by committing the selected token from a wallet to a switch; performing, by the switch, a determination regarding whether the selected token can be updated; upon determining that the selected token can be updated, performing an update of the selected token; and transferring the updated token from the switch to the wallet.

A method of processing evolving non-fungible tokens (NFT) in an NFT evolution platform in accordance with an embodiment of the invention includes: generating a first NFT includes a first set of functionalities; receiving an indication to peel the first NFT; and modifying the first NFT to provide a different second set of functionalities.

A method of processing non-fungible tokens (NFTs) in an NFT evolution platform in accordance with an embodiment of the invention includes: receiving, based on a triggering event, an anonymized request based at least in part of a user profile, wherein the user profile is based on the content of a wallet; generating a content indicator based on the anonymized request; and performing a transaction based on a conversion event, wherein the conversion event is associated with the content indicator.

A method of processing non-fungible tokens (NFTs) in an NFT evolution platform in accordance with an embodiment of the invention includes: generating a first NFT includes a first content; detecting a triggering event; and generating a second NFT includes a second content, wherein the second content is determined based on a user profile associated with the first NFT.

A method of processing non-fungible tokens (NFTs) in an NFT evolution platform in accordance with an embodiment of the invention includes: receiving, using an upload entity, at least one content element using an upload entity making, using a processing entity, a determination associated with the at least one content element; generating, using a recommendation entity, a selection of a parameter based at least in part of the determination; conveying, using a graphical user interface, information related to the parameter to a user, and obtaining a user input; and outputting, using the processing entity, data includes the parameter, thereby facilitating the generation of a non-fungible token includes at least a portion of the at least one content element and configured using the parameter.

In many embodiments, media wallet applications enable users to securely store NFTs and/or other tokens on their devices.

One embodiment of the invention is a media wallet including: a processor; a network interface; and memory containing a media wallet application. In addition, the processor is capable of being configured by the media wallet application to: securely store non-fungible tokens (NFTs), where each NFT includes several layers and is associated with a programmatically defined smart contract written to at least one immutable ledger; provide access to a first set of layers of the plurality of layers of the NFT; detect a trigger event based on the smart contract; and provide access to a different second set of layers of the plurality of layers of the NFT.

In a further embodiment, the processor is capable of being configured by the media wallet application to enable purchase of NFTs using fungible tokens via at least one distributed exchange.

In another embodiment, the processor is capable of being configured by the media wallet application to receive NFTs distributed via push notification.

In a still further embodiment, the processor is capable of being configured by the media wallet application to manage accounts on multiple immutable ledgers using a deterministic wallet key.

In still another embodiment, the at least one immutable ledger includes: an NFT blockchain to which the smart contracts for each NFT are written.

One embodiment of the invention includes a user device, including: a processor; memory containing a media wallet application; where the processor is configured by the media wallet application to: securely store non-fungible tokens (NFTs), where each NFT is associated with a programmatically defined smart contract written to at least one immutable ledger, wherein NFTs are cryptographic tokens that are created with respect to content, wherein an NFT comprises several layers, each layer includes a different content and a transparency setting regarding display of the particular layer; display in a user interface, an NFT with the several layers displayed based on transparency settings of the several layers; detect a trigger event based on a smart contract associated with the NFT and update the transparency settings of the several layers of the NFT; display in the user interface, the NFT with the several layers based on the updated transparency settings.

In a further embodiment, a transparency setting for a particular layer of an NFT specifies that the particular layer of the NFT is at least one transparency selected from the group consisting of: a hidden layer, a displayed layer, a public layer, and a private layer.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIG. 23 illustrates a process to detect qualifying events for NFT evaluations including the "unlocking" or revelation of layers in accordance with an embodiment of the invention.

DETAILED DESCRIPTION

Overview

Figure 1:
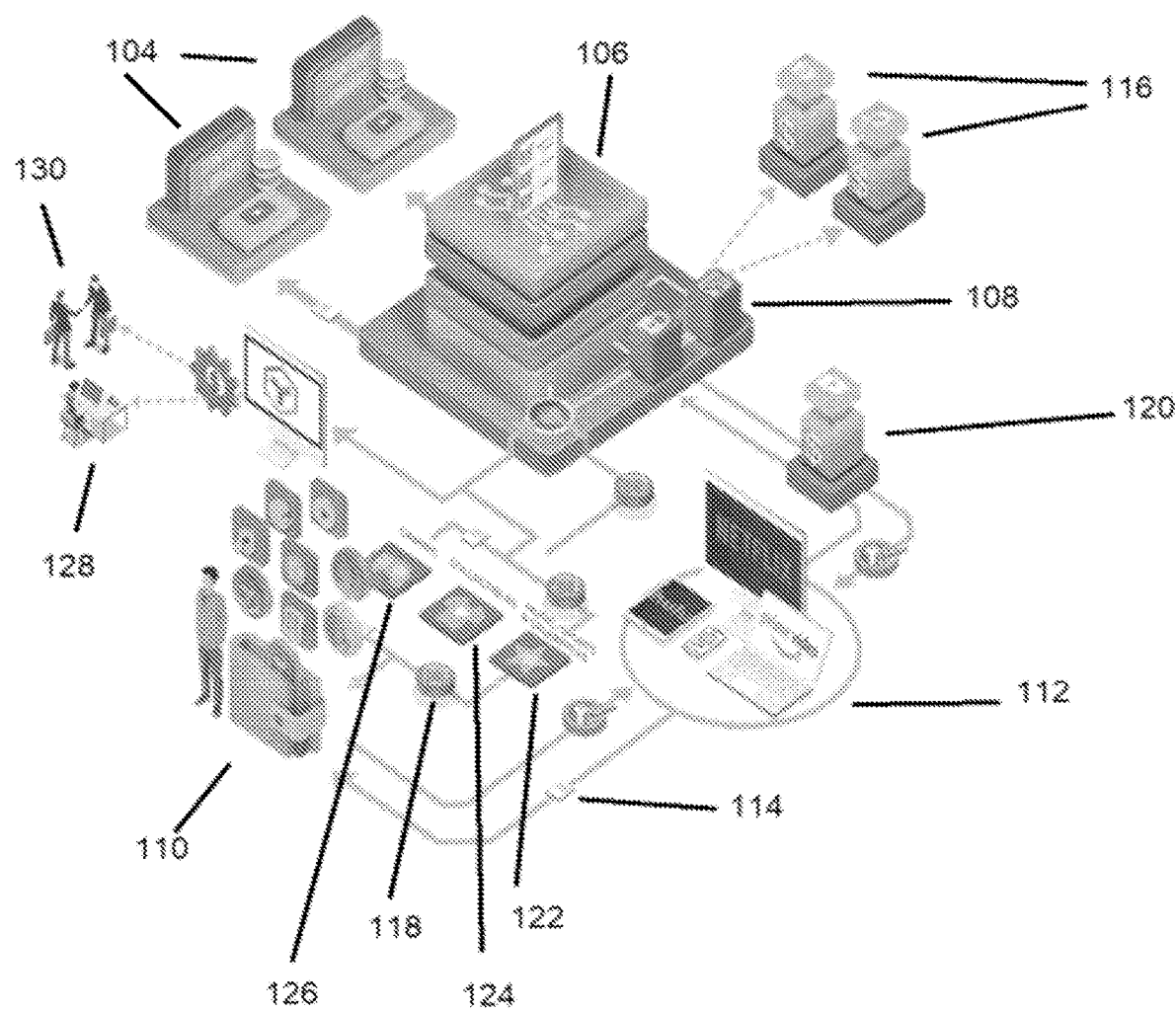
FIG. 1 is a conceptual diagram of an NFT platform in accordance with an embodiment of the invention.

Turning now to the drawings, systems and methods for implementing blockchain-based Non-Fungible Token (NFT) that can generate evolving tokens in accordance with various embodiments of the invention are illustrated. In several embodiments, a blockchain-based NFT evolution platform is provided that generates evolving NFTs that enable content creators to issue, mint, and/or transfer NFTs that can include content that can evolve based on different triggering events.

In a number of embodiments, content creators can issue evolving NFTs to users within the NFT evolution platforms. NFTs can be created around a large range of real-world media content and intellectual property. Movie studios can mint digital collectibles for their movies, characters, notable scenes and/or notable objects. Record labels can mint digital collectibles for artists, bands, albums and/or songs. Similarly, official digital trading cards can be made from likeness of celebrities, cartoon characters and/or gaming avatars.

NFT evolution platforms can use one or more policies to determine an evolution of an NFT, including different triggering events that can cause an NFT to change and/or spawn new NFTs that include different content and/or functionalities. Policies can be specified in one or more smart contracts associated with an NFT. In certain embodiments, policies can be specified based on user input and stored in a container within an NFT. In several embodiments of the NFT evolution platforms, policies associated with an NFT can be stored external to the NFT and referenced by the NFT.

In several embodiments of the NFT evolution platforms, an NFT can evolve based on triggering events related to transactions (e.g., trades, sales, licensing, bidding, among various other activities) associated with the NFT. Upon detecting a triggering event occurs, an NFT can be modified and/or a new NFT can be generated, where the NFT can provide new content and/or different features. In many embodiments, an NFT can be "peeled" to reveal new content. In many embodiments, an NFT can be configured to have several layers, with different layers of the NFT being accessible at a particular time (e.g., private vs. public) based on the occurrence of different triggering events. Triggering events can be based on the occurrence of different events that can rely on various different types of data to trigger the event, including timestamps and/or user GPS locations of an NFT. In particular, a triggering event can specify that an NFT be at a particular location (e.g., concert venue) at a particular time (e.g., during a concert) in order to satisfy the policy set out by the particular triggering event. In many embodiments of the NFT evolution platforms, a user can set out different policies that govern the evolution of NFTs.

NFT evolution platforms can combine existing "parent" NFTs to generate new child NFTs that can inherit properties from the parent NFTs. In particular, a first and second parent NFT can be combined to generate a third child NFT that can inherit properties from the first and second NFTs. Characteristics and/or scores associated with different NFTs can be used to determine whether NFTs can be combined. In many embodiments, tokens can evolve to unlock new content that was previously hidden based on an occurrence of triggering events.

NFT evolution platforms in accordance with many embodiments of the invention can evolve NFTs using peeling of the NFTs to reveal new content. In many embodiments, peeling can generate new NFTs and/or provide for the destruction of old NFTs. Accordingly, peeling can provide a series of NFTs and associated content representations providing an evolution of an NFT. In many embodiments of the NFT evolution platforms, a switch can be used to determine peelability of an NFT, where the switch can execute in a trusted execution environment (TEEE). A switch may be a computational entity external to the user wallet, e.g., operated by a content creator and/or a party designated by the content creator. In certain embodiments of the NFT evolution platforms, a switch may be a distributed party, e.g., an entity including multiple collaborating entities that make decisions based on consensus mechanisms. A switch can determine whether an NFT can be peeled. This determination may be made by accessing data associated with the NFT, whether stored in the NFT, referenced by the NFT and/or stored in a database with a record associated with the NFT. This data may express a policy that indicates whether the NFT may be peeled, what the outcome of a peeling request is, and any conditions specifying when peeling is allowed.

Many embodiments of the NFT evolution platforms can customize content generated for NFTs based on user profiles. In particular, NFT evolution platforms can generate a first NFT that includes a first content, detect a triggering event, and generate a second NFT that include a second content, where the second content is determined based on a user profile associated with the first NFT. In many embodiments of the NFT evolution platforms, a triggering event is a peeling of the first NFT. The user profile can include data obtained from various different sources that can provide data regarding users, including digital wallets associated with the user and/or data regarding transactions related user. Accordingly, by using user profile information, relevant content can be generated to be displayed to the user. In many embodiments of the NFT evolution platforms, user data can be protected and/or anonymized, including being encrypted/decrypted by an authorized entity, such that user profiles can be protected from unauthorized access.

NFT evolution platforms in accordance with many embodiments can provide simulation tools and various user interfaces (UIs) that can be used to forecast a performance of an NFT evolution strategy. In many embodiments, the simulations can use past performance of similar NFTs to provide simulations of a current strategy. In many embodiments of the NFT evolution platforms can provide user interfaces that allow users to generate a set of parameters that control evolution of NFTs. A user interface can be provided for a user to obtain information relating to simulation results, parameter choices, potential options to consider, and/or an identification of potential risks, e.g., a relative absence of comparable cases leading to a low statistical significance of assessments. NFT evolution platforms can provide users with the ability for a user to select a set of parameters based on making a selection among proposed options. In many embodiments, a user may also upload their own parameters and obtain feedback related to the assessed risks and benefits associated with such parameters, and then determine whether to make edits or not. A user may select parameter choices presented by the user interface, where these parameter choices correspond to commonly made choices, choices that have been assessed to have high benefits or low risks, or otherwise be suitable for the content associated with the NFT to be minted.

Non-Fungible Token (NFT) Platforms

Turning now to the drawings, systems and methods for implementing blockchain-based Non-Fungible Token (NFT) platforms in accordance with various embodiments of the invention are illustrated. In several embodiments, blockchain-based NFT platforms are platforms which enable content creators to issue, mint, and transfer Non-Fungible Tokens (NFTs) directed to content including, but not limited to, rich media content.

In a number of embodiments, content creators can issue NFTs to users within the NFT platform. NFTs can be created around a large range of real-world media content and intellectual property. Movie studios can mint digital collectibles for their movies, characters, notable scenes and/or notable objects. Record labels can mint digital collectibles for artists, bands, albums and/or songs. Similarly, official digital trading cards can be made from likeness of celebrities, cartoon characters and/or gaming avatars.

NFTs minted using NFT platforms in accordance with various embodiments of the invention can have multifunctional programmable use cases including rewards, private access to premium content and experiences, as discounts toward the purchase of goods, among many other value-added use cases.

In many embodiments, each NFT can have a set of attributes that define its unique properties. NFTs may therefore be classified based on which attributes are emphasized. Possible classifications may address, but are not limited to: NFTs as identifying entities, NFTs output by other NFTs, NFTs as content creation assets, and NFTs as evaluating entities. NFTs can be interpreted differently by various platforms in order to create platform-specific user experiences. The metadata associated with an NFT may also include digital media assets such as (but not limited to) images, videos about the specific NFT, and the context in which it was created (studio, film, band, company song etc.).

In many embodiments, NFT storage may be facilitated through mechanisms for the transfer of payment from users to one or more service providers. Through these mechanisms, a payment system for NFT maintenance can allow for incremental payment and ongoing asset protection. NFT storage may be additionally self-regulated through willing participants disclosing unsatisfactory NFT management in exchange for rewards.

In many embodiments, the NFT platform can include media wallet applications that enable users to securely store NFTs and/or other tokens on their devices. Furthermore, media wallets (also referred to as "digital wallets") can enable users to obtain NFTs that prove purchase of rights to access a particular piece of media content on one platform and use the NFT to gain access to the purchased content on another platform. The consumption of such content may be governed by content classification directed to visual user interface systems.

In several embodiments, users can download and install media wallet applications to store NFTs on the same computing devices used to consume streamed and/or downloaded content. Media wallet applications and NFTs can disseminate data concerning media consumption on the computing devices on which the media wallet applications are installed and/or based upon observations indicative of media consumption independently of the device. Media consumption data may include, but is not limited to, data reporting the occurrence of NFT transactions, data reporting the occurrence of NFT event interactions data reporting the content of NFT transactions, data reporting the content of media wallet interactions, and/or data reporting the occurrence of media wallet interactions.

While various aspects of NFT platforms, NFTs, media wallets, blockchain configurations, reporting structures, and maintenance systems are discussed above, NFT platforms and different components that can be utilized within NFT platforms in accordance with various embodiments of the invention are discussed further below.

NFT Platforms

An NFT platform in accordance with an embodiment of the invention is illustrated in FIG. 1. The NFT platform 100 utilizes one or more immutable ledgers (e.g. one or more blockchains) to enable a number of verified content creators 104 to access an NFT registry service to mint NFTs 106 in a variety of forms including (but not limited to) celebrity NFTs 122, character NFTs from games 126, NFTs that are redeemable within games 126, NFTs that contain and/or enable access to collectibles 124, and NFTs that have evolutionary capabilities representative of the change from one NFT state to another NFT state.

Issuance of NFTs 106 via the NFT platform 100 enables verification of the authenticity of NFTs independently of the content creator 104 by confirming that transactions written to one or more of the immutable ledgers are consistent with the smart contracts 108 underlying the NFTs.

As is discussed further below, content creators 104 can provide the NFTs 106 to users to reward and/or incentivize engagement with particular pieces of content and/or other user behavior including (but not limited to) the sharing of user personal information (e.g. contact information or user ID information on particular services), demographic information, and/or media consumption data with the content creator and/or other entities. In addition, the smart contracts 108 underlying the NFTs can cause payments of residual royalties 116 when users engage in specific transactions involving NFTs (e.g. transfer of ownership of the NFT).

In a number of embodiments, users utilize media wallet applications 110 on their devices to store NFTs 106 distributed using the NFT platform 100. Users can use media wallet applications 110 to obtain and/or transfer NFTs 106. In facilitating the retention or transfer of NFTs 106, media wallet applications may utilize wallet user interfaces that engage in transactional restrictions through either uniform or personalized settings. Media wallet applications 110 in accordance with some embodiments may incorporate NFT filtering systems to avoid unrequested NFT assignment. Methods for increased wallet privacy may also operate through multiple associated wallets with varying capabilities. As can readily be appreciated, NFTs 106 that are implemented using smart contracts 108 having interfaces that comply with open standards are not limited to being stored within media wallets and can be stored in any of a variety of wallet applications as appropriate to the requirements of a given application. Furthermore, a number of embodiments of the invention support movement of NFTs 106 between different immutable ledgers. Processes for moving NFTs between multiple immutable ledgers in accordance with various embodiments of the invention are discussed further below.

In several embodiments, content creators 104 can incentivize users to grant access to media consumption data using offers including (but not limited to) offers of fungible tokens 118 and/or NFTs 106. In this way, the ability of the content creators to mint NFTs enables consumers to engage directly with the content creators and can be utilized to incentivize users to share with content creators' data concerning user interactions with additional content. The permissions granted by individual users may enable the content creators 104 to directly access data written to an immutable ledger. In many embodiments, the permissions granted by individual users enable authorized computing systems to access data within an immutable ledger and content creators 104 can query the authorized computing systems to obtain aggregated information. Numerous other example functions for content creators 104 are possible, some of which are discussed below.

NFT blockchains in accordance with various embodiments of the invention enable issuance of NFTs by verified users. In many embodiments, the verified users can be content creators that are vetted by an administrator of networks that may be responsible for deploying and maintaining the NFT blockchain. Once the NFTs are minted, users can obtain and conduct transactions with the NFTs. In several embodiments, the NFTs may be redeemable for items or services in the real world such as (but not limited to) admission to movie screenings, concerts, and/or merchandise.

As illustrated in FIG. 1, users can install the media wallet application 110 onto their devices and use the media wallet application 110 to purchase fungible tokens. The media wallet application could also be provided by a browser, or by a dedicated hardware unit executing instructions provided by a wallet manufacturer. The different types of wallets may have slightly different security profiles and may offer different features, but would all be able to be used to initiate the change of ownership of tokens, such as NFTs. In many embodiments, the fungible tokens can be fully converted into fiat currency and/or other cryptocurrency. In several embodiments, the fungible tokens are implemented using split blockchain models in which the fungible tokens can be issued to multiple blockchains (e.g. Ethereum). As can readily be appreciated, the fungible tokens and/or NFTs utilized within an NFT platform in accordance with various embodiments of the invention are largely dependent upon the requirements of a given application.

In several embodiments, the media wallet application is capable of accessing multiple blockchains by deriving accounts from each of the various immutable ledgers used within an NFT platform. For each of these blockchains, the media wallet application can automatically provide simplified views whereby fungible tokens and NFTs across multiple accounts and/or multiple blockchains can be rendered as single user profiles and/or wallets. In many embodiments, the single view can be achieved using deep-indexing of the relevant blockchains and API services that can rapidly provide information to media wallet applications in response to user interactions. In certain embodiments, the accounts across the multiple blockchains can be derived using BIP32 deterministic wallet key. In other embodiments, any of a variety of techniques can be utilized by the media wallet application to access one or more immutable ledgers as appropriate to the requirements of a given application.

NFTs can be purchased by way of exchanges 130 and/or from other users. In addition, content creators can directly issue NFTs to the media wallets of specific users (e.g. by way of push download or AirDrop). In many embodiments, the NFTs are digital collectibles such as celebrity NFTs 122, character NFTs from games 126, NFTs that are redeemable within games 126, and/or NFTs that contain and/or enable access to collectibles 124. It should be appreciated that a variety of NFTs are described throughout the discussion of the various embodiments described herein and can be utilized in any NFT platform and/or with any media wallet application.

While the NFTs are shown as static in the illustrated embodiment, content creators can utilize users' ownership of NFTs to engage in additional interactions with the user. In this way, the relationship between users and particular pieces of content and/or particular content creators can evolve over time around interactions driven by NFTs. In a number of embodiments, collection of NFTs can be gamified to enable unlocking of additional NFTs. In addition, leaderboards can be established with respect to particular content and/or franchises based upon users' aggregation of NFTs. As is discussed further below, NFTs and/or fungible tokens can also be utilized by content creators to incentivize users to share data.

NFTs minted in accordance with several embodiments of the invention may incorporate a series of instances of digital content elements in order to represent the evolution of the digital content over time. Each one of these digital elements can have multiple numbered copies, just like a lithograph, and each such version can have a serial number associated with it, and/or digital signatures authenticating its validity. The digital signature can associate the corresponding image to an identity, such as the identity of the artist. The evolution of digital content may correspond to the transition from one representation to another representation. This evolution may be triggered by the artist, by an event associated with the owner of the artwork, by an external event measured by platforms associated with the content, and/or by specific combinations or sequences of event triggers. Some such NFTs may also have corresponding series of physical embodiments. These may be physical and numbered images that are identical to the digital instances described above. They may also be physical representations of another type, e.g., clay figures or statues, whereas the digital representations may be drawings. The physical embodiments may further be of different aspects that relate to the digital series. Evolution in compliance with some embodiments may also be used to spawn additional content, for example, one NFT directly creating one or more secondary NFTs.

When the user wishes to purchase an NFT using fungible tokens, media wallet applications can request authentication of the NFT directly based upon the public key of the content creator and/or indirectly based upon transaction records within the NFT blockchain. As discussed above, minted NFTs can be signed by content creators and administrators of the NFT blockchain. In addition, users can verify the authenticity of particular NFTs without the assistance of entities that minted the NFT by verifying that the transaction records involving the NFT within the NFT blockchain are consistent with the various royalty payment transactions required to occur in conjunction with transfer of ownership of the NFT by the smart contract underlying the NFT.

Applications and methods in accordance with various embodiments of the invention are not limited to media wallet applications or use within NFT platforms. Accordingly, it should be appreciated that the data collection capabilities of any media wallet application described herein can also be implemented outside the context of an NFT platform and/or in a dedicated application and/or in an application unrelated to the storage of fungible tokens and/or NFTs. Various systems and methods for implementing NFT platforms and media wallet applications in accordance with various embodiments of the invention are discussed further below.

NFT Platforms Network Architectures

NFT platforms in accordance with many embodiments of the invention utilize public blockchains and permissioned blockchains. In several embodiments, the public blockchain is decentralized and universally accessible. Additionally, in a number of embodiments, private/permissioned blockchains are closed systems that are limited to publicly inaccessible transactions. In many embodiments, the permissioned blockchain can be in the form of distributed ledgers, while the blockchain may alternatively be centralized in a single entity.

Figure 2:
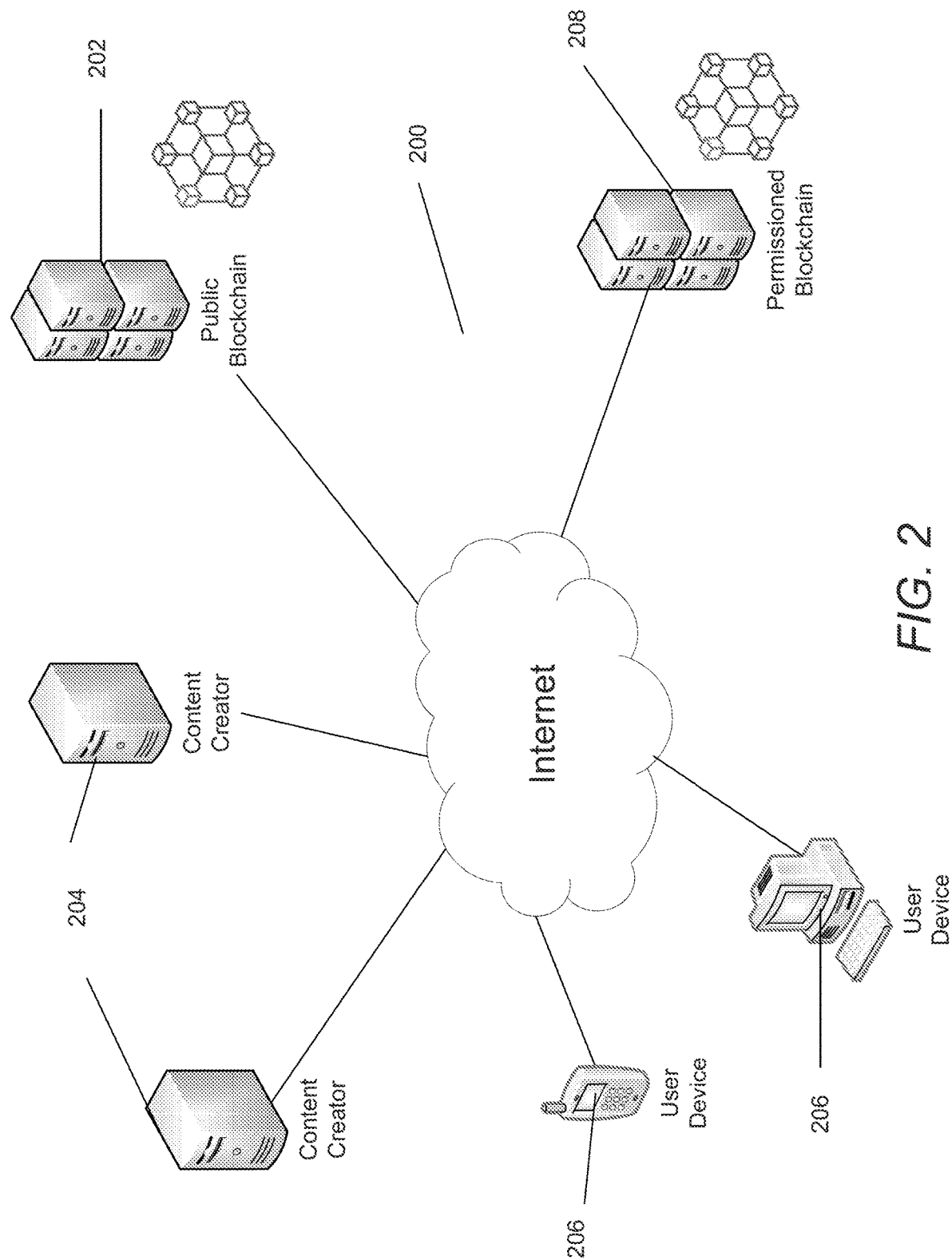
FIG. 2 is a network architecture diagram of an NFT platform in accordance with an embodiment of the invention.

An example of network architecture that can be utilized to implement an NFT platform including a public blockchain and a permissioned blockchain in accordance with several embodiments of the invention is illustrated in FIG. 2. The NFT platform 200 utilizes computer systems implementing a public blockchain 202 such as (but not limited to) Ethereum and Solana. A benefit of supporting interactions with public blockchains 202 is that the NFT platform 200 can support minting of standards based NFTs that can be utilized in an interchangeable manner with NFTs minted by sources outside of the NFT platform on the public blockchain. In this way, the NFT platform 200 and the NFTs minted within the NFT platform are not part of a walled garden, but are instead part of a broader blockchain-based ecosystem. The ability of holders of NFTs minted within the NFT platform 200 to transact via the public blockchain 202 increases the likelihood that individuals acquiring NFTs will become users of the NFT platform. Initial NFTs minted outside the NFT platform can also be developed through later minted NFTs, with the initial NFTs being used to further identify and interact with the user based upon their ownership of both NFTs. Various systems and methods for facilitating the relationships between NFTs, both outside and within the NFT platform are discussed further below.

Users can utilize user devices configured with appropriate applications including (but not limited to) media wallet applications to obtain NFTs. In many embodiments, media wallets are smart device enabled, front-end applications for fans and/or consumers, central to all user activity on an NFT platform. As is discussed in detail below, different embodiments of media wallet applications can provide any of a variety of functionality that can be determined as appropriate to the requirements of a given application. In the illustrated embodiment, the user devices 206 are shown as mobile phones and personal computers. As can readily be appreciated user devices can be implemented using any class of consumer electronics device including (but not limited to) tablet computers, laptop computers, televisions, game consoles, virtual reality headsets, mixed reality headsets, augmented reality headsets, media extenders, and/or set top boxes as appropriate to the requirements of a given application.

In many embodiments, NFT transaction data entries in the permissioned blockchain 208 are encrypted using users' public keys so that the NFT transaction data can be accessed by the media wallet application. In this way, users control access to entries in the permissioned blockchain 208 describing the user's NFT transaction. In several embodiments, users can authorize content creators 204 to access NFT transaction data recorded within the permissioned blockchain 208 using one of a number of appropriate mechanisms including (but not limited to) compound identities where the user is the owner of the data and the user can authorize other entities as guests that can also access the data. As can readily be appreciated, particular content creators' access to the data can be revoked by revoking their status as guests within the compound entity authorized to access the NFT transaction data within the permissioned blockchain 208. In certain embodiments, compound identities are implemented by writing authorized access records to the permissioned blockchain using the user's public key and the public keys of the other members of the compound entity.

When content creators wish to access particular pieces of data stored within the permissioned blockchain 208, they can make a request to a data access service. The data access service may grant access to data stored using the permissioned blockchain 208 when the content creators' public keys correspond to public keys of guests. In a number of embodiments, guests may be defined within a compound identity. The access record for the compound entity may also authorize the compound entity to access the particular piece of data. In this way, the user has complete control over access to their data at any time by admitting or revoking content creators to a compound entity, and/or modifying the access policies defined within the permissioned blockchain 208 for the compound entity. In several embodiments, the permissioned blockchain 208 supports access control lists and users can utilize a media wallet application to modify permissions granted by way of the access control list. In many embodiments, the manner in which access permissions are defined enables different restrictions to be placed on particular pieces of information within a particular NFT transaction data record within the permissioned blockchain 208. As can readily be appreciated, the manner in which NFT platforms and/or immutable ledgers provide fine-grained data access permissions largely depends upon the requirements of a given application.

In many embodiments, storage nodes within the permissioned blockchain 208 do not provide content creators with access to entire NFT transaction histories. Instead, the storage nodes simply provide access to encrypted records. In several embodiments, the hash of the collection of records from the permissioned blockchain is broadcast. Therefore, the record is verifiably immutable and each result includes the hash of the record and the previous/next hashes. As noted above, the use of compound identities and/or access control lists can enable users to grant permission to decrypt certain pieces of information or individual records within the permissioned blockchain. In several embodiments, the access to the data is determined by computer systems that implement permission-based data access services.

In many embodiments, the permissioned blockchain 208 can be implemented using any blockchain technology appropriate to the requirements of a given application. As noted above, the information and processes described herein are not limited to data written to permissioned blockchains 208, and NFT transaction data simply provides an example. Systems and methods in accordance with various embodiments of the invention can be utilized to enable applications to provide fine-grained permission to any of a variety of different types of data stored in an immutable ledger as appropriate to the requirements of a given application in accordance with various embodiments of the invention.

While various implementations of NFT platforms are described above with reference to FIG. 2, NFT platforms can be implemented using any number of immutable and pseudo-immutable ledgers as appropriate to the requirements of specific applications in accordance with various embodiments of the invention. Blockchain databases in accordance with various embodiments of the invention may be managed autonomously using peer-to-peer networks and distributed timestamping servers. In some embodiments, any of a variety of consensus mechanisms may be used by public blockchains, including but not limited to Proof of Space mechanisms, Proof of Work mechanisms, Proof of Stake mechanisms, and hybrid mechanisms.

NFT platforms in accordance with many embodiments of the invention may benefit from the oversight and increased security of private blockchains. As can readily be appreciated, a variety of approaches can be taken to the writing of data to permissioned blockchains and the particular approach is largely determined by the requirements of particular applications. As such, computer systems in accordance with various embodiments of the invention can have the capacity to create verified NFT entries written to permissioned blockchains.

Figure 3:
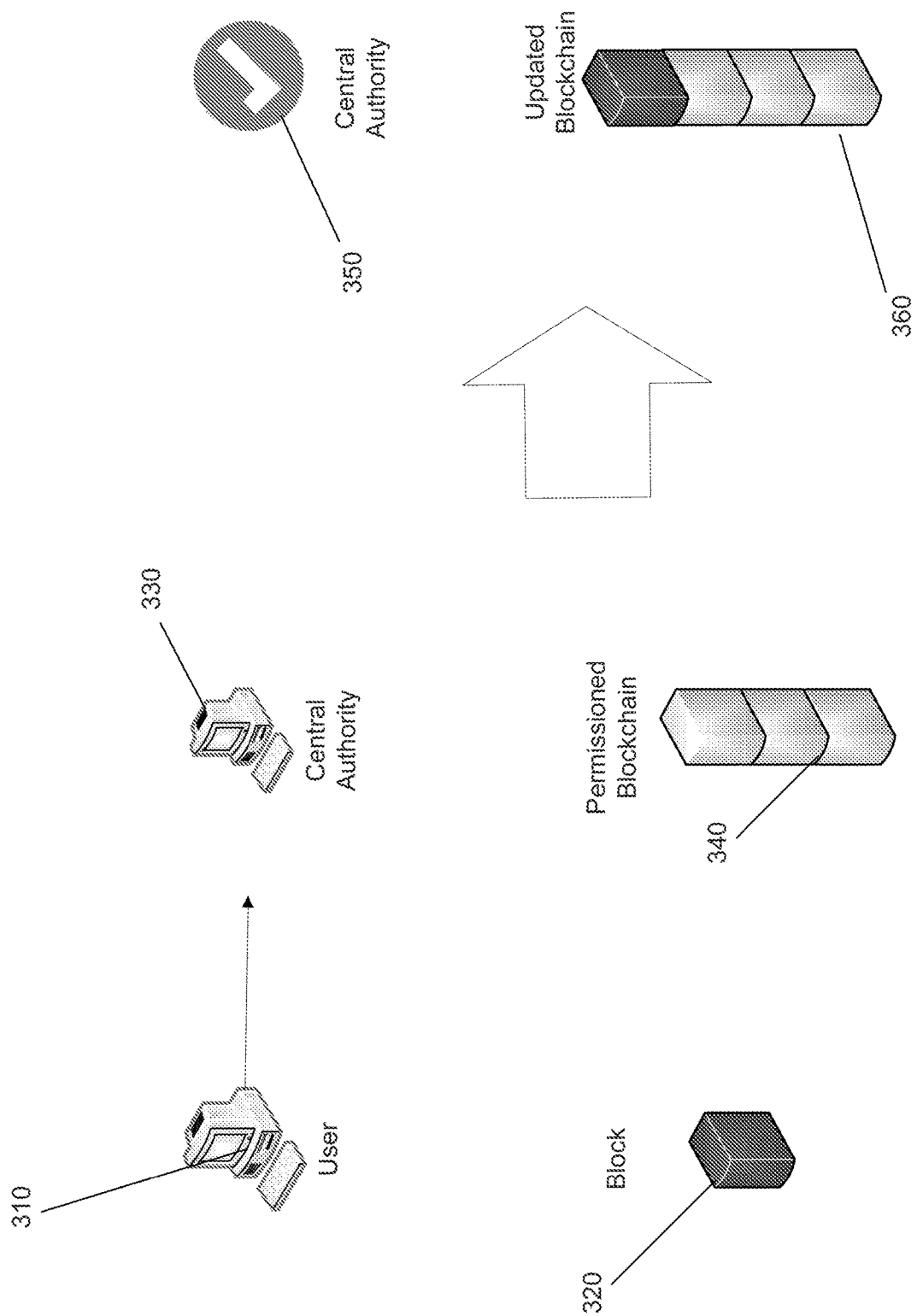
FIG. 3 is a conceptual diagram of a permissioned blockchain in accordance with an embodiment of the invention.

An implementation of permissioned (or private) blockchains in accordance with some embodiments of the invention is illustrated in FIG. 3. Permissioned blockchains 340 can typically function as closed computing systems in which each participant is well defined. In several embodiments, private blockchain networks may require invitations. In a number of embodiments, entries, or blocks 320, to private blockchains can be validated. In some embodiments, the validation may come from central authorities 330. Private blockchains can allow an organization or a consortium of organizations to efficiently exchange information and record transactions. Specifically, in a permissioned blockchain, a preapproved central authority 330 (which should be understood as potentially encompassing multiple distinct authorized authorities) can approve a change to the blockchain. In a number of embodiments, approval may come without the use of a consensus mechanism involving multiple authorities. As such, through a direct request from users 310 to the central authority 330, the determination of whether blocks 320 can be allowed access to the permissioned blockchain 340 can be determined. Blocks 320 needing to be added, eliminated, relocated, and/or prevented from access may be controlled through these means. In doing so the central authority 330 may manage accessing and controlling the network blocks incorporated into the permissioned blockchain 340. Upon the approval 350 of the central authority, the now updated blockchain 360 can reflect the added block 320.

NFT platforms in accordance with many embodiments of the invention may also benefit from the anonymity and accessibility of a public blockchain. Therefore, NFT platforms in accordance with many embodiments of the invention can have the capacity to create verified NFT entries written to a permissioned blockchain.

Figure 4:
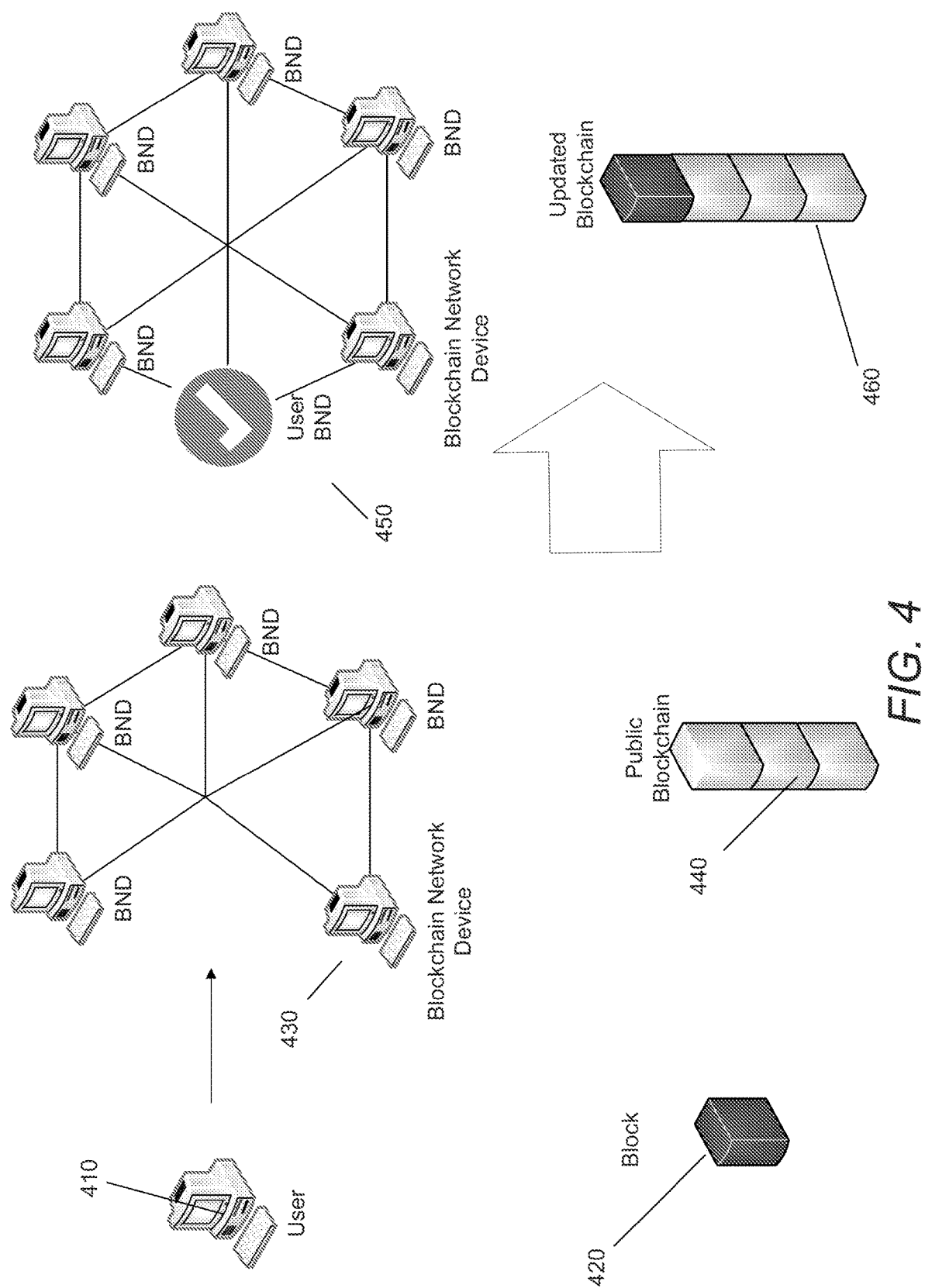
FIG. 4 is a conceptual diagram of a permissionless blockchain in accordance with an embodiment of the invention.

An implementation of a permissionless, decentralized, or public blockchain in accordance with an embodiment of the invention is illustrated in FIG. 4. In a permissionless blockchain, individual users 410 can directly participate in relevant networks and operate as blockchain network devices 430. As blockchain network devices 430, parties would have the capacity to participate in changes to the blockchain and participate in transaction verifications (via the mining mechanism). Transactions are broadcast over the computer network and data quality is maintained by massive database replication and computational trust. Despite being decentralized, an updated blockchain 460 cannot remove entries, even if anonymously made, making it immutable. In many decentralized blockchains, many blockchain network devices 430, in the decentralized system may have copies of the blockchain, allowing the ability to validate transactions. In many instances, the blockchain network device 430 can personally add transactions, in the form of blocks 420 appended to the public blockchain 440. To do so, the blockchain network device 430 would take steps to allow for the transactions to be validated 450 through various consensus mechanisms (Proof of Work, Proof of Stake, etc.). A number of consensus mechanisms in accordance with various embodiments of the invention are discussed further below.

Additionally, in the context of blockchain configurations, the term smart contract is often used to refer to software programs that run on blockchains. While a standard legal contract outlines the terms of a relationship (usually one enforceable by law), a smart contract enforces a set of rules using self-executing code within NFT platforms. As such, smart contracts may have the means to automatically enforce specific programmatic rules through platforms. Smart contracts are often developed as high-level programming abstractions that can be compiled down to bytecode. Said bytecode may be deployed to blockchains for execution by computer systems using any number of mechanisms deployed in conjunction with the blockchain. In many instances, smart contracts execute by leveraging the code of other smart contracts in a manner similar to calling upon a software library.

A number of existing decentralized blockchain technologies intentionally exclude or prevent rich media assets from existing within the blockchain, because they would need to address content that is not static (e.g., images, videos, music files). Therefore, NFT platforms in accordance with many embodiments of the invention may address this with blockchain mechanisms, that preclude general changes but account for updated content.

NFT platforms in accordance with many embodiments of the invention can therefore incorporate decentralized storage pseudo-immutable dual blockchains. In some embodiments, two or more blockchains may be interconnected such that traditional blockchain consensus algorithms support a first blockchain serving as an index to a second, or more, blockchains serving to contain and protect resources, such as the rich media content associated with NFTs.

In storing rich media using blockchain, several components may be utilized by an entity ("miner") adding transactions to said blockchain. References, such as URLs, may be stored in the blockchain to identify assets. Multiple URLs may also be stored when the asset is separated into pieces. An alternative or complementary option may be the use of APIs to return either the asset or a URL for the asset. In accordance with many embodiments of the invention, references can be stored by adding a ledger entry incorporating the reference enabling the entry to be timestamped. In doing so, the URL, which typically accounts for domain names, can be resolved to IP addresses. However, when only files of certain types are located on particular resources, or where small portions of individual assets are stored at different locations, users may require methods to locate assets stored on highly-splintered decentralized storage systems. To do so, systems may identify at least primary asset destinations and update those primary asset destinations as necessary when storage resources change. The mechanisms used to identify primary asset destinations may take a variety of forms including, but not limited to, smart contracts.

Figure 5A:
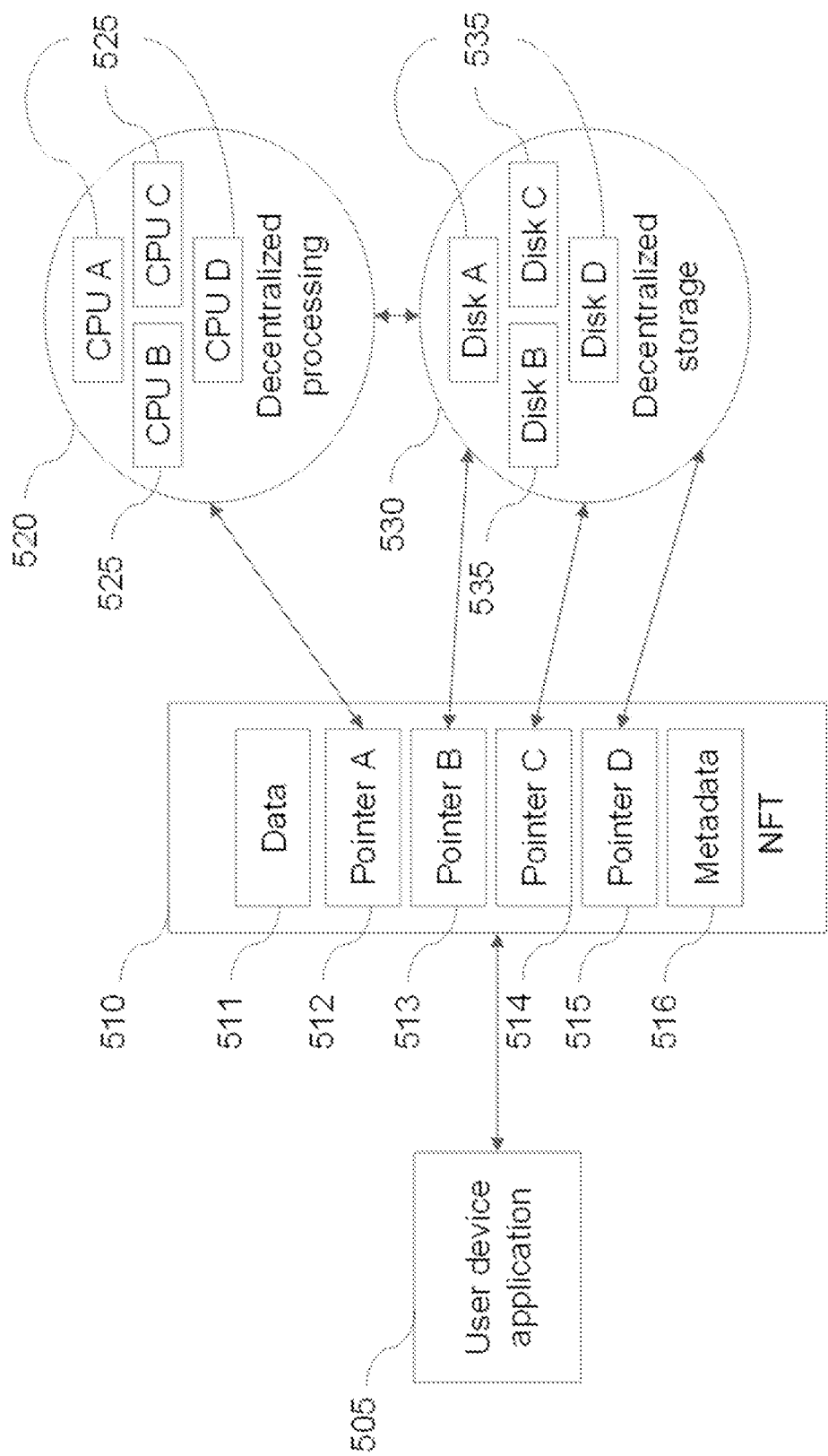
FIGS. 5A-5B are diagrams of a dual blockchain in accordance with a number of embodiments of the invention.

A dual blockchain, including decentralized processing 520 and decentralized storage 530 blockchains, in accordance with some embodiments of the invention is illustrated in FIG. 5A. Application running on devices 505, may interact with or make a request related to NFTs 510 interacting with such a blockchain. An NFT 510 in accordance with several embodiments of the invention may include many values including generalized data 511 (e.g. URLs), and pointers such as pointer A 512, pointer B 513, pointer C 514, and pointer D 515. In accordance with many embodiments of the invention, the generalized data 511 may be used to access corresponding rich media through the NFT 510. The NFT 510 may additionally have associated metadata 516.

Pointers within the NFT 510 may direct an inquiry toward a variety of on or off-ledger resources. In some embodiments of the invention, as illustrated FIG. 5A, pointer A 512 can direct the need for processing to the decentralized processing network 520. Processing systems are illustrated as CPU A, CPU B, CPU C, and CPU D 525. The CPUs 525 may be personal computers, server computers, mobile devices, edge IoT devices, etc. Pointer A may select one or more processors at random to perform the execution of a given smart contract. The code may be secure or nonsecure and the CPU may be a trusted execution environment (TEE), depending upon the needs of the request. In the example reflected in FIG. 5A, pointer B 513, pointer C 514, and pointer D 515 all point to a decentralized storage network 530 including remote off-ledger resources including storage systems illustrated as Disks A, B, C, and D 535.

The decentralized storage system may co-mingle with the decentralized processing system as the individual storage systems utilize CPU resources and connectivity to perform their function. From a functional perspective, the two decentralized systems may also be separate. Pointer B 513 may point to one or more decentralized storage networks 530 for the purposes of maintaining an off-chain log file of token activity and requests. Pointer C 514 may point to executable code within one or more decentralized storage networks 530. And Pointer D 515 may point to rights management data, security keys, and/or configuration data within one or more decentralized storage networks 530.

Figure 5B:
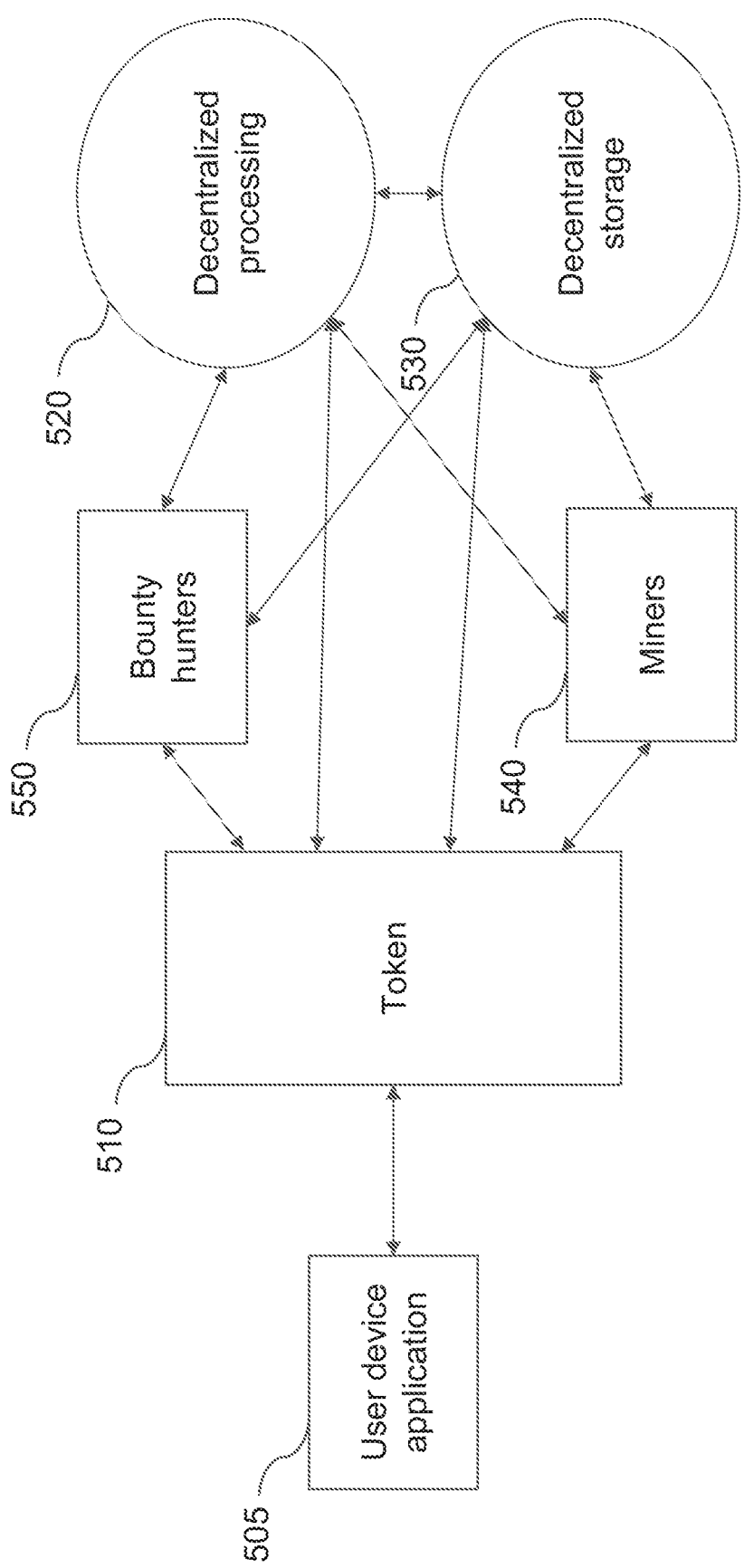

Dual blockchains may additionally incorporate methods for detection of abuse, essentially operating as a "bounty hunter" 550. FIG. 5B illustrates the inclusion of bounty hunters 550 within dual blockchain structures implemented in accordance with an embodiment of the invention. Bounty hunters 550 allow NFTs 510, which can point to networks that may include decentralized processing 520 and/or storage networks 530, to be monitored. The bounty hunter's 550 objective may be to locate incorrectly listed or missing data and executable code within the NFT 510 or associated networks. Additionally, the miner 540 can have the capacity to perform all necessary minting processes or any process within the architecture that involves a consensus mechanism.

Bounty hunters 550 may also choose to verify each step of a computation, and if they find an error, submit evidence of this in return for some reward. This can have the effect of invalidating the incorrect ledger entry and, potentially based on policies, all subsequent ledger entries. Such evidence can be submitted in a manner that is associated with a public key, in which the bounty hunter 550 proves knowledge of the error, thereby assigning value (namely the bounty) with the public key.

Assertions made by bounty hunters 550 may be provided directly to miners 540 by broadcasting the assertion. Assertions may be broadcast in a manner including, but not limited to posting it to a bulletin board. In some embodiments of the invention, assertions may be posted to ledgers of blockchains, for instance, the blockchain on which the miners 540 operate. If the evidence in question has not been submitted before, this can automatically invalidate the ledger entry that is proven wrong and provide the bounty hunter 550 with some benefit.

Applications and methods in accordance with various embodiments of the invention are not limited to use within NFT platforms. Accordingly, it should be appreciated that the capabilities of any blockchain configuration described herein can also be implemented outside the context of an NFT platform network architecture unrelated to the storage of fungible tokens and/or NFTs. A variety of components, mechanisms, and blockchain configurations that can be utilized within NFT platforms are discussed further below. Moreover, any of the blockchain configurations described herein with reference to FIGS. 3-5B (including permissioned, permissionless, and/or hybrid mechanisms) can be utilized within any of the networks implemented within the NFT platforms described above.

NFT Platforms Consensus Mechanisms

NFT platforms in accordance with many embodiments of the invention can depend on consensus mechanisms to achieve agreement on network state, through proof resolution, to validate transactions. In accordance with many embodiments of the invention, Proof of Work (PoW) mechanisms may be used as a means of demonstrating non-trivial allocations of processing power. Proof of Space (POS) mechanisms may be used as a means of demonstrating non-trivial allocations of memory or disk space. As a third possible approach, Proof of Stake mechanisms may be used as a means of demonstrating non-trivial allocations of fungible tokens and/or NFTs as a form of collateral. Numerous consensus mechanisms are possible in accordance with various embodiments of the invention, some of which are expounded on below.

Traditional mining schemes, such as Bitcoin, are based on Proof of Work, based on performing the aforementioned large computational tasks. The cost of such tasks may not only be computational effort, but also energy expenditure, a significant environmental concern. To address this problem, mining methods operating in accordance with many embodiments of the invention may instead operate using Proof of Space mechanisms to accomplish network consensus, wherein the distinguishing factor can be memory rather than processing power. Specifically, Proof of Space mechanisms can perform this through network optimization challenges. In several embodiments the network optimization challenge may be selected from any of a number of different challenges appropriate to the requirements of specific applications including graph pebbling. In some embodiments, graph pebbling may refer to a resource allocation game played on discrete mathematics graphs, ending with a labeled graph disclosing how a player might get at least one pebble to every vertex of the graph.

Figure 6:
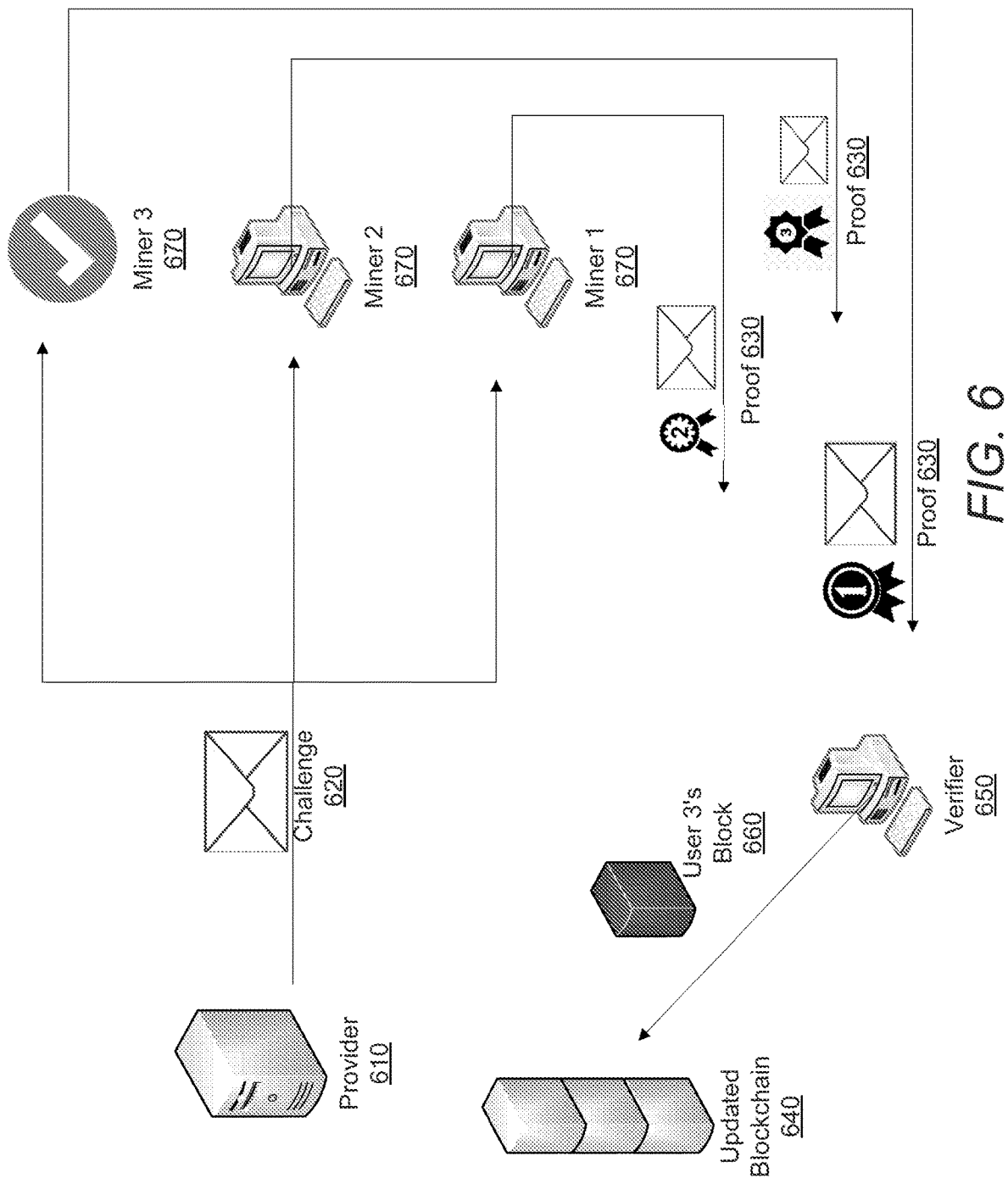
FIG. 6 conceptually illustrates a process followed by a Proof of Work consensus mechanism in accordance with an embodiment of the invention.

An example of Proof of Work consensus mechanisms that may be implemented in decentralized blockchains, in accordance with a number of embodiments of the invention, is conceptually illustrated in FIG. 6. The example disclosed in this figure is a challenge-response authentication, a protocol classification in which one party presents a complex problem ("challenge") 610 and another party must broadcast a valid answer ("proof") 620 to have clearance to add a block to the decentralized ledger that makes up the blockchain 630. As a number of miners may be competing to have this ability, there may be a need for determining factors for the addition to be added first, which in this case is processing power. Once an output is produced, verifiers 640 in the network can verify the proof, something which typically requires much less processing power, to determine the first device that would have the right to add the winning block 650 to the blockchain 630. As such, under a Proof of Work consensus mechanism, each miner involved can have a success probability proportional to the computational effort expended.

Figure 7:
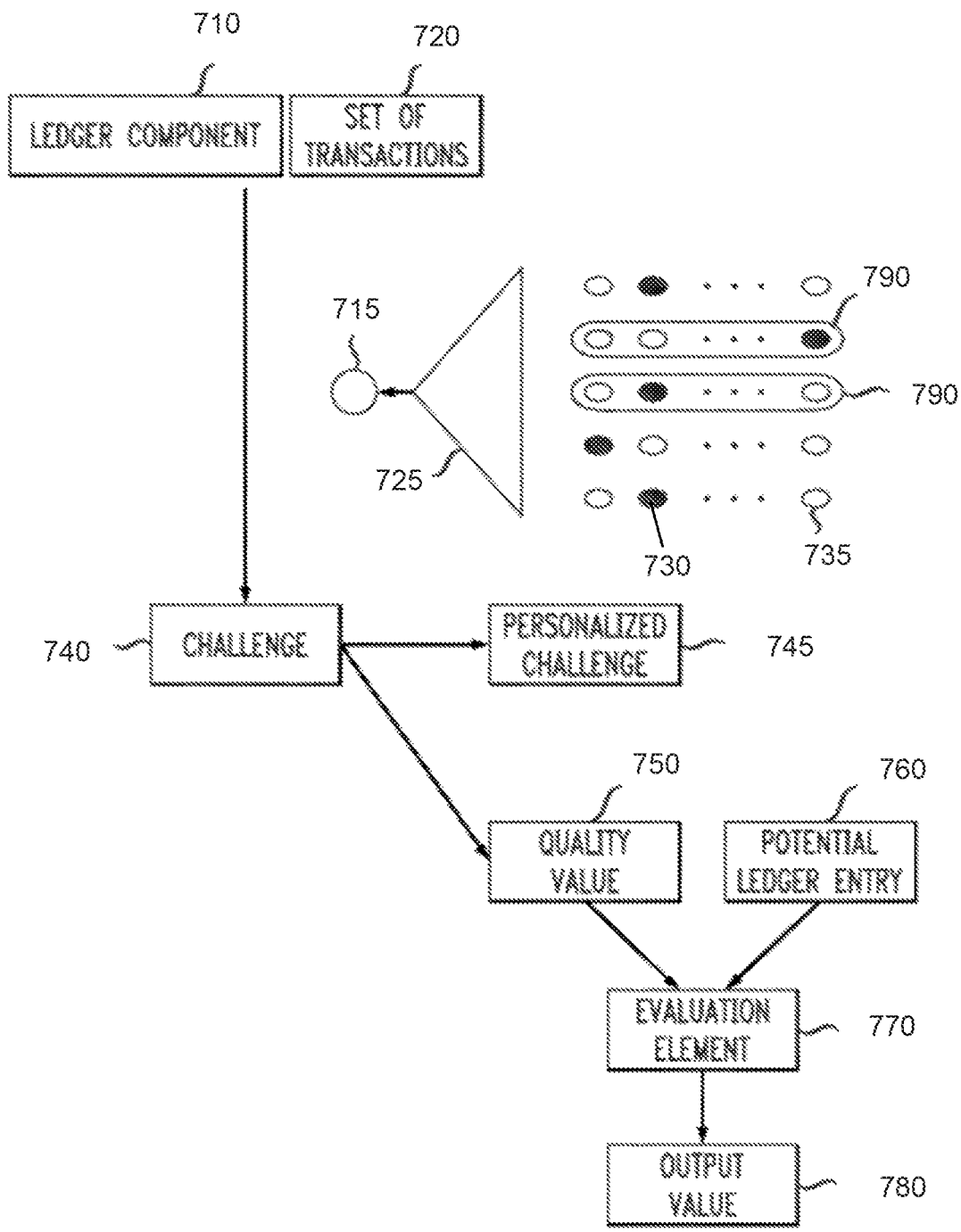
FIG. 7 conceptually illustrates a process followed by a Proof of Space consensus mechanism in accordance with an embodiment of the invention.

An example of Proof of Space implementations on devices in accordance with some embodiments of the invention is conceptually illustrated in FIG. 7. The implementation includes a ledger component 710, a set of transactions 720, and a challenge 740 computed from a portion of the ledger component 710. A representation 715 of a miner's state may also be recorded in the ledger component 710 and be publicly available.

In some embodiments, the material stored on the memory of the device includes a collection of nodes 730, 735, where nodes that depend on other nodes have values that are functions of the values of the associated nodes on which they depend. For example, functions may be one-way functions, such as cryptographic hash functions. In several embodiments the cryptographic hash function may be selected from any of a number of different cryptographic hash functions appropriate to the requirements of specific applications including (but not limited to) the SHA1 cryptographic hash function. In such an example, one node in the network may be a function of three other nodes. Moreover, the node may be computed by concatenating the values associated with these three nodes and applying the cryptographic hash function, assigning the result of the computation to the node depending on these three parent nodes. In this example, the nodes are arranged in rows, where two rows 790 are shown. The nodes are stored by the miner, and can be used to compute values at a setup time. This can be done using Merkle tree hash-based data structures 725, or another structure such as a compression function and/or a hash function.

Challenges 740 may be processed by the miner to obtain personalized challenges 745, made to the device according to the miner's storage capacity. The personalized challenge 745 can be the same or have a negligible change, but could also undergo an adjustment to account for the storage space accessible by the miner, as represented by the nodes the miner stores. For example, when the miner does not have a large amount of storage available or designated for use with the Proof of Space system, a personalized challenge 745 may adjust challenges 740 to take this into consideration, thereby making a personalized challenge 745 suitable for the miner's memory configuration.

In some embodiments, the personalized challenge 745 can indicate a selection of nodes 730, denoted in FIG. 7 by filled-in circles. In the FIG. 7 example specifically, the personalized challenge corresponds to one node per row. The collection of nodes selected as a result of computing the personalized challenge 745 can correspond to a valid potential ledger entry 760. However, here a quality value 750 (also referred to herein as a qualifying function value) can also be computed from the challenge 740, or from other public information that is preferably not under the control of any one miner.

A miner may perform matching evaluations 770 to determine whether the set of selected nodes 730 matches the quality value 750. This process can take into consideration what the memory constraints of the miner are, causing the evaluation 770 to succeed with a greater frequency for larger memory configurations than for smaller memory configurations. This can simultaneously level the playing field to make the likelihood of the evaluation 770 succeeding roughly proportional to the size of the memory used to store the nodes used by the miner. In some embodiments, non-proportional relationships may be created by modifying the function used to compute the quality value 750. When the evaluation 770 results in success, then the output value 780 may be used to confirm the suitability of the memory configuration and validate the corresponding transaction.

In many embodiments, nodes 730 and 735 can also correspond to public keys. The miner may submit valid ledger entries, corresponding to a challenge-response pair including one of these nodes. In that case, public key values can become associated with the obtained NFT. As such, miners can use a corresponding secret/private key to sign transaction requests, such as purchases. Additionally, any type of digital signature can be used in this context, such as RSA signatures, Merkle signatures, DSS signatures, etc. Further, the nodes 730 and 735 may correspond to different public keys or to the same public key, the latter preferably augmented with a counter and/or other location indicator such as a matrix position indicator, as described above. Location indicators in accordance with many embodiments of the invention may be applied to point to locations within a given ledger. In accordance with some embodiments of the invention, numerous Proof of Space consensus configurations are possible, some of which are discussed below.

Hybrid methods of evaluating Proof of Space problems can also be implemented in accordance with many embodiments of the invention. In many embodiments, hybrid methods can be utilized that conceptually correspond to modifications of Proof of Space protocols in which extra effort is expanded to increase the probability of success, or to compress the amount of space that may be applied to the challenge. Both come at a cost of computational effort, thereby allowing miners to improve their odds of winning by spending greater computational effort. Accordingly, in many embodiments of the invention dual proof-based systems may be used to reduce said computational effort. Such systems may be applied to Proof of Work and Proof of Space schemes, as well as to any other type of mining-based scheme.

When utilizing dual proofs in accordance with various embodiments of the invention, the constituent proofs may have varying structures. For example, one may be based on Proof of Work, another on Proof of Space, and a third may be a system that relies on a trusted organization for controlling the operation, as opposed to relying on mining for the closing of ledgers. Yet other proof structures can be combined in this way. The result of the combination will inherit properties of its components. In many embodiments, the hybrid mechanism may incorporate a first and a second consensus mechanism. In several embodiments, the hybrid mechanism includes a first, a second, and a third consensus mechanisms. In a number of embodiments, the hybrid mechanism includes more than three consensus mechanisms. Any of these embodiments can utilize consensus mechanisms selected from the group including (but not limited to) Proof of Work, Proof of Space, and Proof of Stake without departing from the scope of the invention. Depending on how each component system is parametrized, different aspects of the inherited properties will dominate over other aspects.

Figure 8:
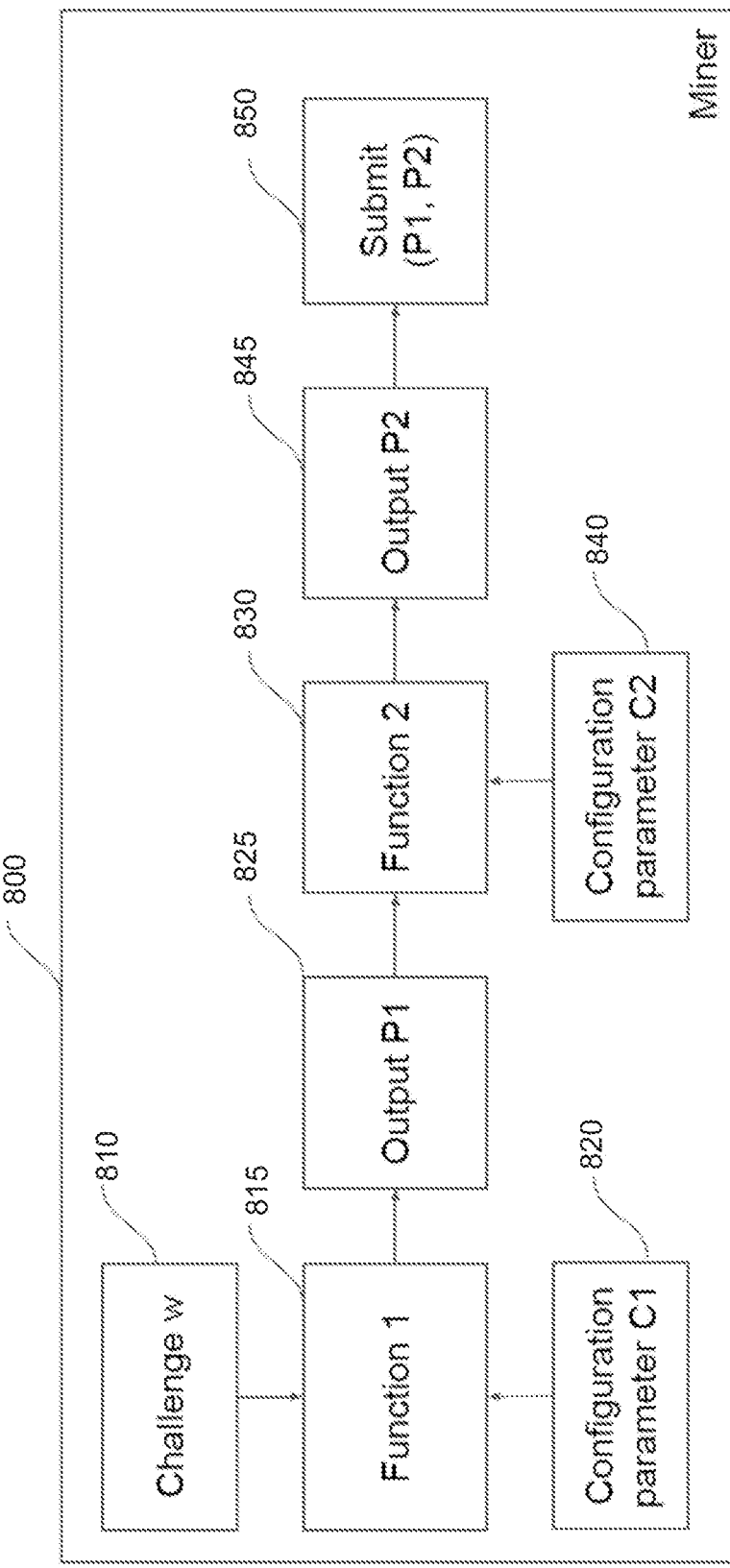
FIG. 8 illustrates a dual proof consensus mechanism configuration in accordance with an embodiment of the invention.

Dual proof configurations in accordance with a number of embodiments of the invention is illustrated in FIG. 8. A proof configuration in accordance with some embodiments of the invention may tend to use the notion of quality functions for tie-breaking among multiple competing correct proofs relative to a given challenge (w) 810. This classification of proof can be described as a qualitative proof, inclusive of proofs of work and proofs of space. In the example reflected in FIG. 8, proofs P1 and P2 are each one of a Proof of Work, Proof of Space, Proof of Stake, and/or any other proof related to a constrained resource, wherein P2 may be of a different type than P1, or may be of the same type.

Systems in accordance with many embodiments of the invention may introduce the notion of a qualifying proof, which, unlike qualitative proofs, are either valid or not valid, using no tie-breaking mechanism. Said systems may include a combination of one or more qualitative proofs and one or more qualifying proofs. For example, it may use one qualitative proof that is combined with one qualifying proof, where the qualifying proof is performed conditional on the successful creation of a qualitative proof. FIG. 8 illustrates challenge w 810, as described above, with a function 1 815, which is a qualitative function, and function 2 830, which is a qualifying function.

To stop miners from expending effort after a certain amount of effort has been spent, thereby reducing the environmental impact of mining, systems in accordance with a number of embodiments of the invention can constrain the search space for the mining effort. This can be done using a configuration parameter that controls the range of random or pseudo-random numbers that can be used in a proof. Upon challenge w 810 being issued to one or more miners 800, it can be input to Function 1 815 along with configuration parameter C1 820. Function 1 815 may output proof P1 825, in this example the qualifying proof to Function 2 830. Function 2 830 is also provided with configuration parameter C2 840 and computes qualifying proof P2 845. The miner 800 can then submit the combination of proofs (P1, P2) 850 to a verifier, in order to validate a ledger associated with challenge w 810. In some embodiments, miner 800 can also submit the proofs (P1, P2) 850 to be accessed by a 3rd-party verifier.

NFT platforms in accordance with many embodiments of the invention may additionally benefit from alternative energy-efficient consensus mechanisms. Therefore, computer systems in accordance with several embodiments of the invention may instead use consensus-based methods alongside or in place of proof-of-space and proof-of-space based mining. In particular, consensus mechanisms based instead on the existence of a Trusted Execution Environment (TEE), such as ARM TrustZone (™) or Intel SGX™ may provide assurances exist of integrity by virtue of incorporating private/isolated processing environments.

Figure 9:
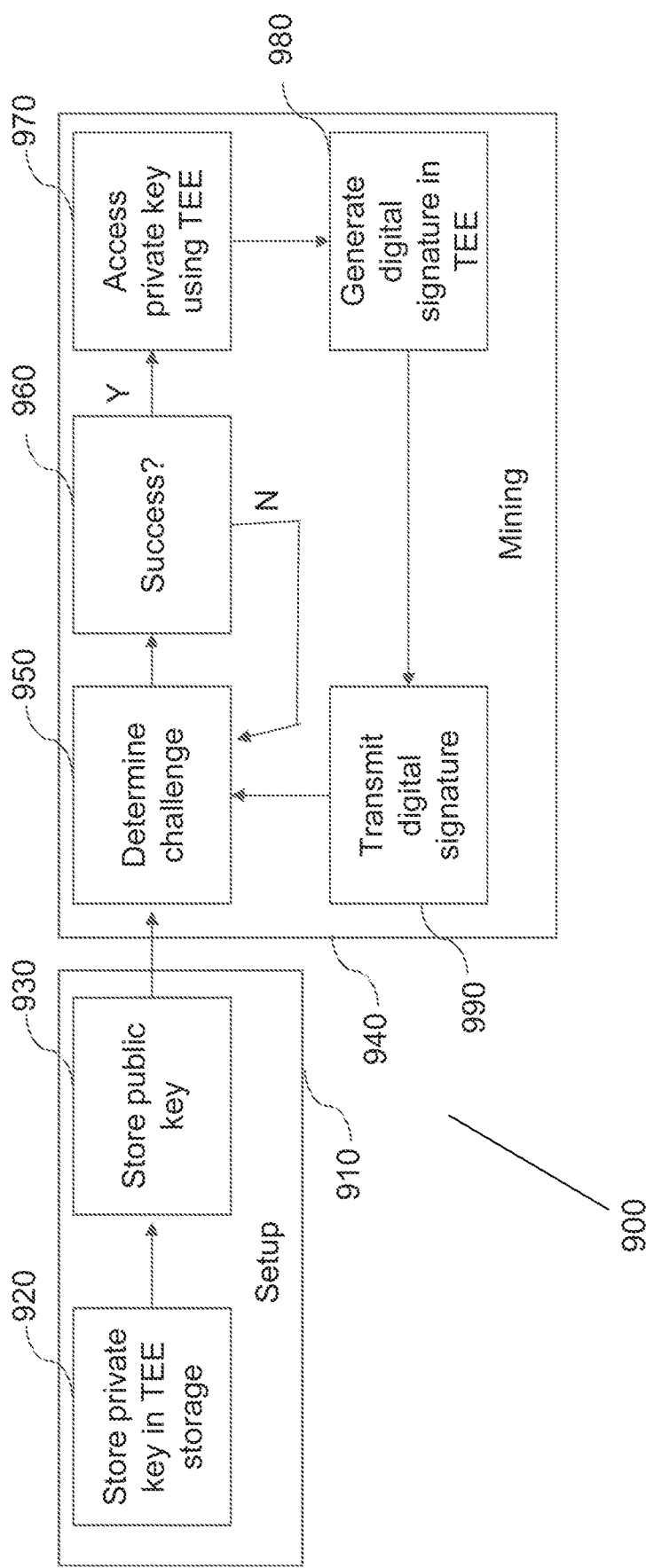
FIG. 9 illustrates a process followed by a Trusted Execution Environment-based consensus mechanism in accordance with some embodiments of the invention

An illustration of sample process 900 undergone by TEE-based consensus mechanisms in accordance with some embodiments of the invention is depicted in FIG. 9. In some such configurations, a setup 910 may be performed by an original equipment manufacturer (OEM) or a party performing configurations of equipment provided by an OEM. Once a private key/public key pair is generated in the secure environment, process 900 may store (920) the private key in TEE storage (i.e. storage associated with the Trusted Execution Environment). While storage may be accessible from the TEE, it can be shielded from applications running outside the TEE. Additionally, processes can store (930) the public key associated with the TEE in any storage associated with the device containing the TEE. Unlike the private key, the public key may also be accessible from applications outside the TEE. In a number of embodiments, the public key may also be certified. Certification may come from OEMs or trusted entities associated with the OEMs, wherein the certificate can be stored with the public key.

In many embodiments of the invention, mining-directed steps can also be influenced by the TEE. In the illustrated embodiment, the process 900 can determine (950) a challenge. For example, this may be by computing a hash of the contents of a ledger. In doing so, process 900 may also determine whether the challenge corresponds to success 960. In some embodiments of the invention, the determination of success may result from some pre-set portion of the challenge matching a pre-set portion of the public key, e.g. the last 20 bits of the two values matching. In several embodiments the success determination mechanism may be selected from any of a number of alternate approaches appropriate to the requirements of specific applications. The matching conditions may also be modified over time. For example, modification may result from an announcement from a trusted party or based on a determination of a number of participants having reached a threshold value.

When the challenge does not correspond to a success 960, process 900 can return to determine (950) a new challenge. In this context, process 900 can determine (950) a new challenge after the ledger contents have been updated and/or a time-based observation is performed. In several embodiments the determination of a new challenge may come from any of a number of approaches appropriate to the requirements of specific applications, including, but not limited to, the observation of as a second elapsing since the last challenge. If the challenge corresponds to a success 960, then the processing can continue on to access (970) the private key using the TEE.

When the private key is accessed, process can generate (980) a digital signature using the TEE. The digital signature may be on a message that includes the challenge and/or which otherwise references the ledger entry being closed.

Process 900 can also transmit (980) the digital signature to other participants implementing the consensus mechanism. In cases where multiple digital signatures are received and found to be valid, a tie-breaking mechanism can be used to evaluate the consensus. For example, one possible tie-breaking mechanism may be to select the winner as the party with the digital signature that represents the smallest numerical value when interpreted as a number. In several embodiments the tie-breaking mechanism may be selected from any of a number of alternate tie-breaking mechanisms appropriate to the requirements of specific applications.

Applications and methods in accordance with various embodiments of the invention are not limited to use within NFT platforms. Accordingly, it should be appreciated that consensus mechanisms described herein can also be implemented outside the context of an NFT platform network architecture unrelated to the storage of fungible tokens and/or NFTs. Moreover, any of the consensus mechanisms described herein with reference to FIGS. 6-9 (including Proof of Work, Proof of Space, Proof of Stake, and/or hybrid mechanisms) can be utilized within any of the blockchains implemented within the NFT platforms described above with reference to FIGS. 3-5B. Various systems and methods for implementing NFT platforms and applications in accordance with numerous embodiments of the invention are discussed further below.

NFT Platforms Constituent Devices and Applications

A variety of computer systems that can be utilized within NFT platforms and systems that utilize NFT blockchains in accordance with various embodiments of the invention are illustrated below. The computer systems in accordance with many embodiments of the invention may implement a processing system 1010, 1120, 1220 using one or more CPUs, GPUs, ASICs, FPGAs, and/or any of a variety of other devices and/or combinations of devices that are typically utilized to perform digital computations. As can readily be appreciated each of these computer systems can be implemented using one or more of any of a variety of classes of computing devices including (but not limited to) mobile phone handsets, tablet computers, laptop computers, personal computers, gaming consoles, televisions, set top boxes and/or other classes of computing device.

Figure 10:
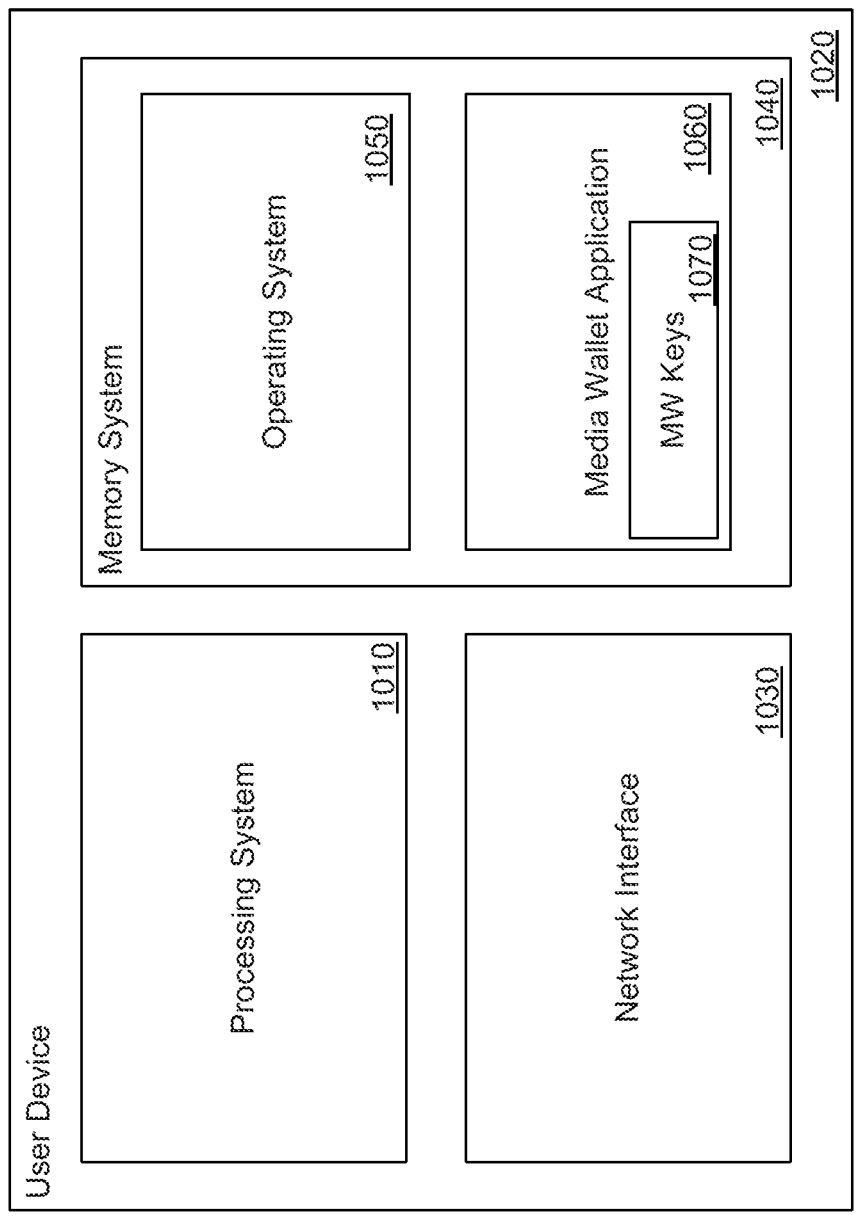
FIGS. 10-12 depicts various devices that can be utilized alongside an NFT platform in accordance with various embodiments of the invention.

A user device capable of communicating with an NFT platform in accordance with an embodiment of the invention is illustrated in FIG. 10. The memory system 1040 of particular user devices may include an operating system 1050 and media wallet applications 1060. Media wallet applications may include sets of media wallet (MW) keys 1070 that can include public key/private key pairs. The set of MW keys may be used by the media wallet application to perform a variety of actions including, but not limited to, encrypting and signing data. In many embodiments, the media wallet application enables the user device to obtain and conduct transactions with respect to NFTs by communicating with an NFT blockchain via the network interface 1030. In some embodiments, the media wallet applications are capable of enabling the purchase of NFTs using fungible tokens via at least one distributed exchange. User devices may implement some or all of the various functions described above with reference to media wallet applications as appropriate to the requirements of a given application in accordance with various embodiments of the invention.

Figure 11:
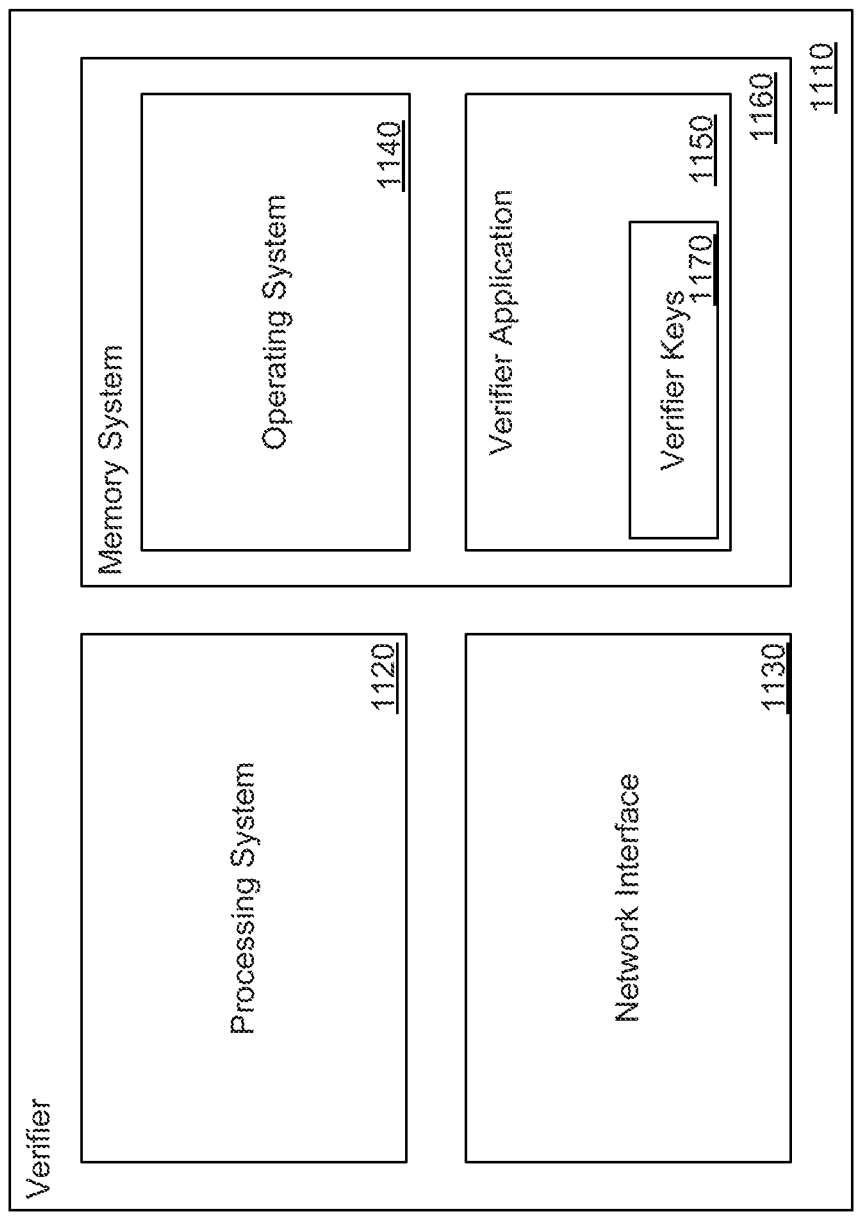

A verifier 1110 capable of verifying blockchain transactions in an NFT platform in accordance with many embodiments of the invention is illustrated in FIG. 11. The memory system 1160 of the verifier computer system includes an operating system 1140 and a verifier application 1150 that enables the verifier 1110 computer system to access a decentralized blockchain in accordance with various embodiments of the invention. Accordingly, the verifier application 1150 may utilize a set of verifier keys 1170 to affirm blockchain entries. When blockchain entries can be verified, the verifier application 1150 may transmit blocks to the corresponding blockchains. The verifier application 1150 can also implement some or all of the various functions described above with reference to verifiers as appropriate to the requirements of a given application in accordance with various embodiments of the invention.

Figure 12:
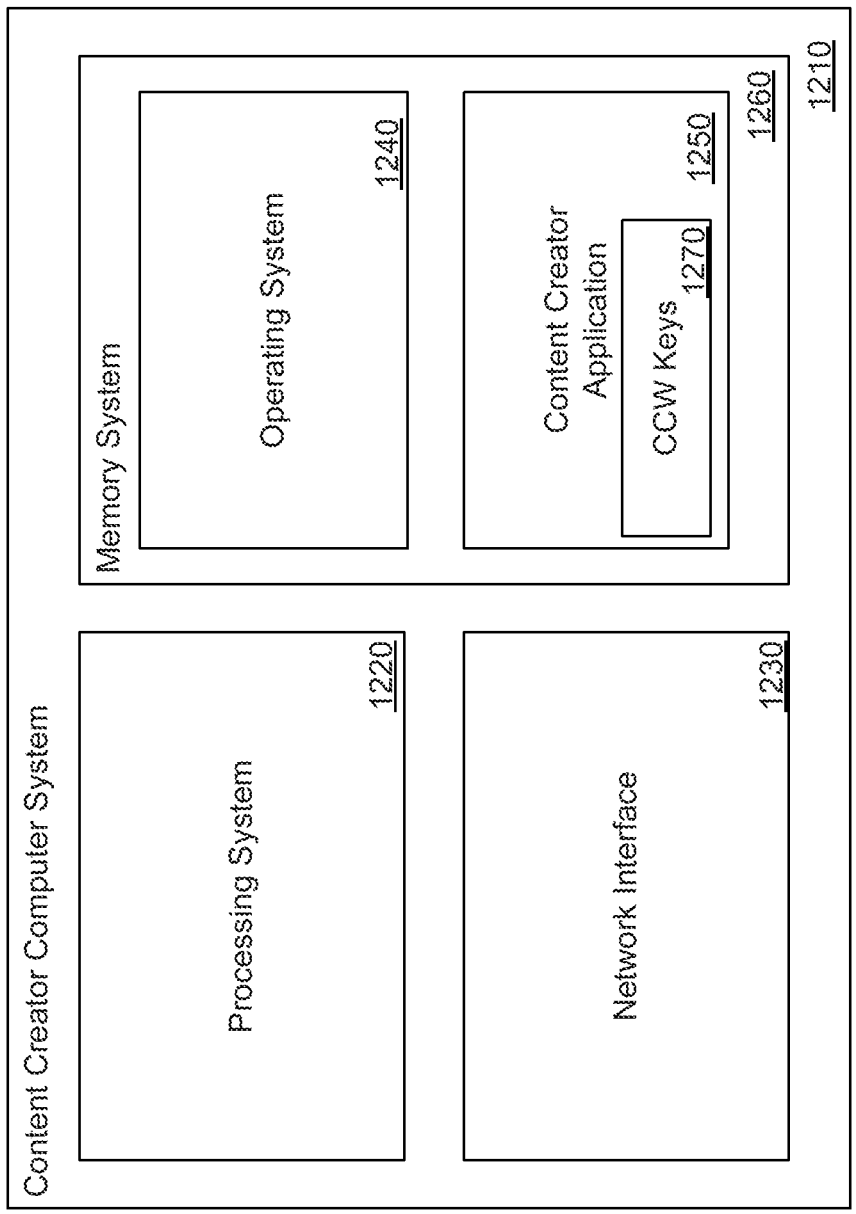

A content creator system 1210 capable of disseminating content in an NFT platform in accordance with an embodiment of the invention is illustrated in FIG. 12. The memory system 1260 of the content creator computer system may include an operating system 1240 and a content creator application 1250. The content creator application 1250 may enable the content creator computer system to mint NFTs by writing smart contracts to blockchains via the network interface 1230. The content creator application can include sets of content creator wallet (CCW) keys 1270 that can include a public key/private key pairs. Content creator applications may use these keys to sign NFTs minted by the content creator application. The content creator application can also implement some or all of the various functions described above with reference to content creators as appropriate to the requirements of a given application in accordance with various embodiments of the invention.

Computer systems in accordance with many embodiments of the invention incorporate digital wallets (herein also referred to as "wallets" or "media wallets") for NFT and/or fungible token storage. In several embodiments, the digital wallet may securely store rich media NFTs and/or other tokens. Additionally, in some embodiments, the digital wallet may display user interface through which user instructions concerning data access permissions can be received.

In a number of embodiments of the invention, digital wallets may be used to store at least one type of token-directed content. Example content types may include, but are not limited to crypto currencies of one or more sorts; non-fungible tokens; and user profile data.

Example user profile data may incorporate logs of user actions. In accordance with some embodiments of the invention, example anonymized user profile data may include redacted, encrypted, and/or otherwise obfuscated user data. User profile data in accordance with some embodiments may include, but are not limited to, information related to classifications of interests, determinations of a post-advertisement purchases, and/or characterizations of wallet contents.

Media wallets, when storing content, may store direct references to content. Media wallets may also reference content through keys to decrypt and/or access the content. Media wallets may use such keys to additionally access metadata associated with the content. Example metadata may include, but is not limited to, classifications of content. In a number of embodiments, the classification metadata may govern access rights of other parties related to the content.

Access governance rights may include, but are not limited to, whether a party can indicate their relationship with the wallet; whether they can read summary data associated with the content; whether they have access to peruse the content; whether they can place bids to purchase the content; whether they can borrow the content, and/or whether they are biometrically authenticated.

Figure 13:
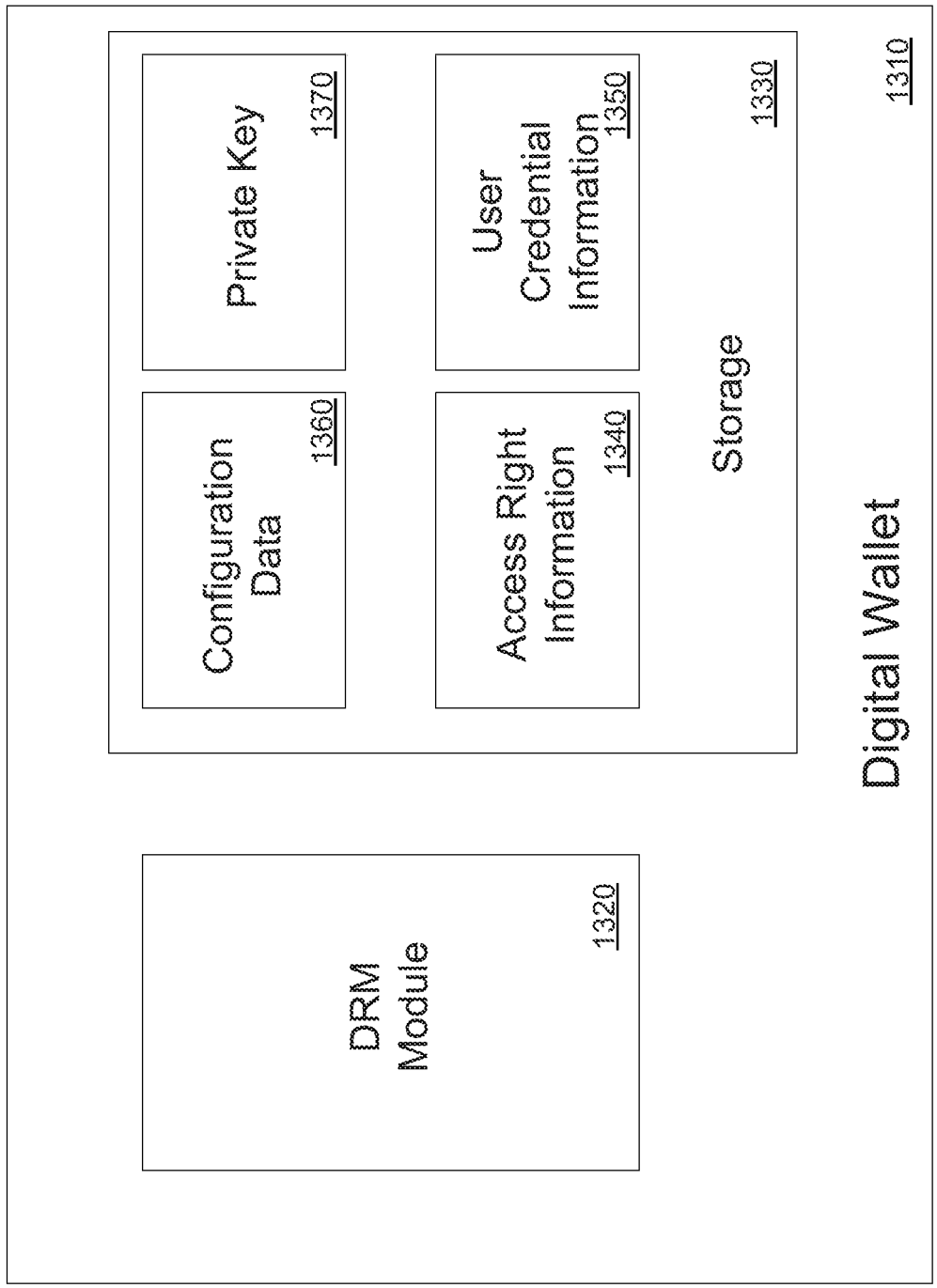
FIG. 13 depicts a media wallet application configuration in accordance with an embodiment of the invention.

An example of a media wallet 1310 capable of storing rich media NFTs in accordance with an embodiment of the invention is illustrated in FIG. 13. Media wallets 1310 may include a storage component 1330, including access right information 1340, user credential information 1350, token configuration data 1360, and/or at least one private key 1370. In accordance with many embodiments of the invention, a private key 1370 may be used to perform several actions on resources, including but not limited to decrypting NFT and/or fungible token content. Media wallets may also correspond to a public key, referred to as a wallet address. An action performed by private keys 1370 may be used to prove access rights to digital rights management modules. Additionally, private keys 1370 may be applied to initiating ownership transfers and granting NFT and/or fungible token access to alternate wallets. In accordance with some embodiments, access right information 1340 may include lists of elements that the wallet 1310 has access to. Access right information 1340 may also express the type of access provided to the wallet. Sample types of access include, but are not limited to, the right to transfer NFT and/or fungible ownership, the right to play rich media associated with a given NFT, and the right to use an NFT and/or fungible token. Different rights may be governed by different cryptographic keys. Additionally, the access right information 1340 associated with a given wallet 1310 may utilize user credential information 1350 from the party providing access.

In accordance with many embodiments of the invention, third parties initiating actions corresponding to requesting access to a given NFT may require user credential information 1350 of the party providing access to be verified. User credential information 1350 may be taken from the group including, but not limited to, a digital signature, hashed passwords, PINs, and biometric credentials. User credential information 1350 may be stored in a manner accessible only to approved devices. In accordance with some embodiments of the invention, user credential information 1350 may be encrypted using a decryption key held by trusted hardware, such as a trusted execution environment. Upon verification, user credential information 1350 may be used to authenticate wallet access.

Available access rights may be determined by digital rights management (DRM) modules 1320 of wallets 1310. In the context of rich media, encryption may be used to secure content. As such, DRM systems may refer to technologies that control the distribution and use of keys required to decrypt and access content. DRM systems in accordance with many embodiments of the invention may require a trusted execution zone. Additionally, said systems may require one or more keys (typically a certificate containing a public key/private key pair) that can be used to communicate with and register with DRM servers. DRM modules 1320 in some embodiments may also use one or more keys to communicate with a DRM server. In several embodiments, the DRM modules 1320 may include code used for performing sensitive transactions for wallets including, but not limited to, content access. In accordance with a number of embodiments of the invention, the DRM module 1320 may execute in a Trusted Execution Environment. In a number of embodiments, the DRM may be facilitated by an Operating System (OS) that enables separation of processes and processing storage from other processes and their processing storage.

Figure 14B:
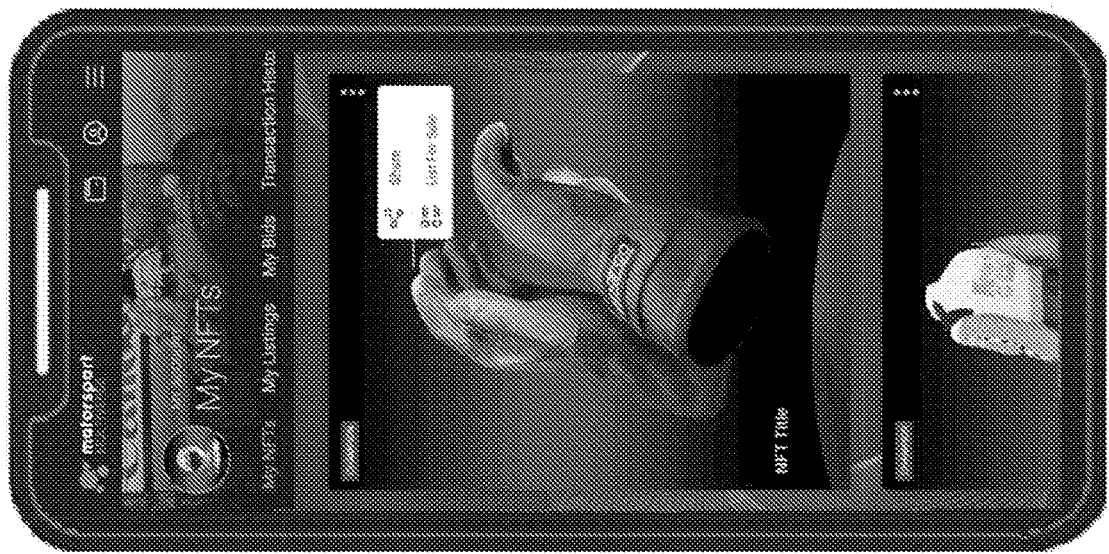
FIGS. 14A-14C depicts user interfaces of various media wallet applications in accordance with a number of embodiments of the invention.
Figure 14A:
Figure 14C:

Operation of media wallet applications implemented in accordance with some embodiments of the invention is conceptually illustrated by way of the user interfaces shown in FIGS. 14A-14C. In many embodiments, media wallet applications can refer to applications that are installed upon user devices such as (but not limited to) mobile phones and tablet computers running the IOS, Android and/or similar operating systems. Launching media wallet applications can provide a number of user interface contexts. In many embodiments, transitions between these user interface contexts can be initiated in response to gestures including (but not limited to) swipe gestures received via a touch user interface. As can readily be appreciated, the specific manner in which user interfaces operate through media wallet applications is largely dependent upon the user input capabilities of the underlying user device. In several embodiments, a first user interface context is a dashboard (see, FIGS. 14A, 14C) that can include a gallery view of NFTs owned by the user. In several embodiments, the NFT listings can be organized into category index cards. Category index cards may include, but are not limited to digital merchandise/collectibles, special event access/digital tickets, fan leaderboards. In certain embodiments, a second user interface context (see, for example, FIG. 14B) may display individual NFTs. In a number of embodiments, each NFT can be main-staged in said display with its status and relevant information shown. Users can swipe through each collectible and interacting with the user interface can launch a collectible user interface enabling greater interaction with a particular collectible in a manner that can be determined based upon the smart contract underlying the NFT.

A participant of an NFT platform may use a digital wallet to classify wallet content, including NFTs, fungible tokens, content that is not expressed as tokens such as content that has not yet been minted but for which the wallet can initiate minting, and other non-token content, including executable content, webpages, configuration data, history files and logs. This classification may be performed using a visual user interface. Users interface may enable users to create a visual partition of a space. In some embodiments of the invention, a visual partition may in turn be partitioned into sub-partitions. In some embodiments, a partition of content may separate wallet content into content that is not visible to the outside world ("invisible partition"), and content that is visible at least to some extent by the outside world ("visible partition"). Some of the wallet content may require the wallet use to have an access code such as a password or a biometric credential to access, view the existence of, or perform transactions on. A visible partition may be subdivided into two or more partitions, where the first one corresponds to content that can be seen by anybody, the second partition corresponds to content that can be seen by members of a first group, and/or the third partition corresponds to content that can be seen by members of a second group.

For example, the first group may be users with which the user has created a bond, and invited to be able to see content. The second group may be users who have a membership and/or ownership that may not be controlled by the user. An example membership may be users who own non-fungible tokens (NFTs) from a particular content creator. Content elements, through icons representing the elements, may be relocated into various partitions of the space representing the user wallet. By doing so, content elements may be associated with access rights governed by rules and policies of the given partition.

One additional type of visibility may be partial visibility. Partial visibility can correspond to a capability to access metadata associated with an item, such as an NFT and/or a quantity of crypto funds, but not carry the capacity to read the content, lend it out, or transfer ownership of it. As applied to a video NFT, an observer to a partition with partial visibility may not be able to render the video being encoded in the NFT but see a still image of it and a description indicating its source.

Similarly, a party may have access to a first anonymized profile which states that the user associated with the wallet is associated with a given demographic. The party with this access may also be able to determine that a second anonymized profile including additional data is available for purchase. This second anonymized profile may be kept in a sub-partition to which only people who pay a fee have access, thereby expressing a form of membership. Alternatively, only users that have agreed to share usage logs, aspects of usage logs or parts thereof may be allowed to access a given sub-partition. By agreeing to share usage log information with the wallet includes the sub-partition, this wallet learns of the profiles of users accessing various forms of content, allowing the wallet to customize content, including by incorporating advertisements, and to determine what content to acquire to attract users of certain demographics.

Another type of membership may be held by advertisers who have sent promotional content to the user. These advertisers may be allowed to access a partition that stores advertisement data. Such advertisement data may be encoded in the form of anonymized profiles. In a number of embodiments, a given sub-partition may be accessible only to the advertiser to whom the advertisement data pertains. Elements describing advertisement data may be automatically placed in their associated partitions, after permission has been given by the user. This partition may either be visible to the user. Visibility may also depend on a direct request to see "system partitions." A first partition may correspond to material associated with a first set of public keys, a second partition to material associated with a second set of public keys not overlapping with the first set of public keys, wherein such material may comprise tokens such as crypto coins and NFTs. A third partition may correspond to usage data associated with the wallet user, and a fourth partition may correspond to demographic data and/or preference data associated with the wallet user. Yet other partitions may correspond to classifications of content, e.g., child-friendly vs. adult; classifications of whether associated items are for sale or not, etc.

The placing of content in a given partition may be performed by a drag-and-drop action performed on a visual interface. By selecting items and clusters and performing a drag-and-drop to another partition and/or to a sub-partition, the visual interface may allow movement including, but not limited to, one item, a cluster of items, and a multiplicity of items and clusters of items. The selection of items can be performed using a lasso approach in which items and partitions are circled as they are displayed. The selection of items may also be performed by alternative methods for selecting multiple items in a visual interface, as will be appreciated by a person of skill in the art.

Some content classifications may be automated in part or full. For example, when user place ten artifacts, such as NFTs describing in-game capabilities, in a particular partition, they may be asked if additional content that are also in-game capabilities should be automatically placed in the same partition as they are acquired and associated with the wallet. When "yes" is selected, then this placement may be automated in the future. When "yes, but confirm for each NFT" is selected, then users can be asked, for each automatically classified element, to confirm its placement. Before the user confirms, the element may remain in a queue that corresponds to not being visible to the outside world.

When users decline given classifications, they may be asked whether alternative classifications should be automatically performed for such elements onwards. In some embodiments, the selection of alternative classifications may be based on manual user classification taking place subsequent to the refusal.

Automatic classification of elements may be used to perform associations with partitions and/or folders. The automatic classification may be based on machine learning (ML) techniques considering characteristics including, but not limited to, usage behaviors exhibited by the user relative to the content to be classified, labels associated with the content, usage statistics; and/or manual user classifications of related content.

Multiple views of wallets may also be accessible. One such view can correspond to the classifications described above, which indicates the actions and interactions others can perform relative to elements. Another view may correspond to a classification of content based on use, type, and/or users-specified criterion. For example, all game NFTs may be displayed in one collection view. The collection view may further subdivide the game NFTs into associations with different games or collections of games. Another collection may show all audio content, clustered based on genre. users-specified classification may be whether the content is for purposes of personal use, investment, or both. A content element may show up in multiple views. users can search the contents of his or her wallet by using search terms that result in potential matches.

Alternatively, the collection of content can be navigated based the described views of particular wallets, allowing access to content. Once a content element has been located, the content may be interacted with. For example, located content elements may be rendered. One view may be switched to another after a specific item is found. For example, this may occur through locating an item based on its genre and after the item is found, switching to the partitioned view described above. In some embodiments, wallet content may be rendered using two or more views in a simultaneous manner. They may also select items using one view.

Media wallet applications in accordance with various embodiments of the invention are not limited to use within NFT platforms. Accordingly, it should be appreciated that applications described herein can also be implemented outside the context of an NFT platform network architecture unrelated to the storage of fungible tokens and/or NFTs. Moreover, any of the computer systems described herein with reference to FIGS. 10-14C can be utilized within any of the NFT platforms described above.

NFT Platforms NFT Interactions

NFT platforms in accordance with many embodiments of the invention may incorporate a wide variety of rich media NFT configurations. The term "Rich Media Non-Fungible Tokens" can be used to refer to blockchain-based cryptographic tokens created with respect to a specific piece of rich media content and which incorporate programmatically defined digital rights management. In some embodiments of the invention, each NFT may have a unique serial number and be associated with a smart contract defining an interface that enables the NFT to be managed, owned and/or traded.

Under a rich media blockchain in accordance with many embodiments of the invention, a wide variety of NFT configurations may be implemented. Some NFTs may be referred to as anchored NFTs (or anchored tokens), used to tie some element, such as a physical entity, to an identifier. Of this classification, one sub-category may be used to tie users' real-world identities and/or identifiers to a system identifier, such as a public key. In this disclosure, this type of NFT applied to identifying users, may be called a social NFT, identity NFT, identity token, and a social token. In accordance with many embodiments of the invention, an individual's personally identifiable characteristics may be contained, maintained, and managed throughout their lifetime so as to connect new information and/or NFTs to the individual's identity. A social NFT's information may include, but are not limited to, personally identifiable characteristics such as name, place and date of birth, and/or biometrics.

An example social NFT may assign a DNA print to a newborn's identity. In accordance with a number of embodiments of the invention, this first social NFT might then be used in the assignment process of a social security number NFT from the federal government. In some embodiments, the first social NFT may then be associated with some rights and capabilities, which may be expressed in other NFTs. Additional rights and capabilities may also be directly encoded in a policy of the social security number NFT.

Figure 15:
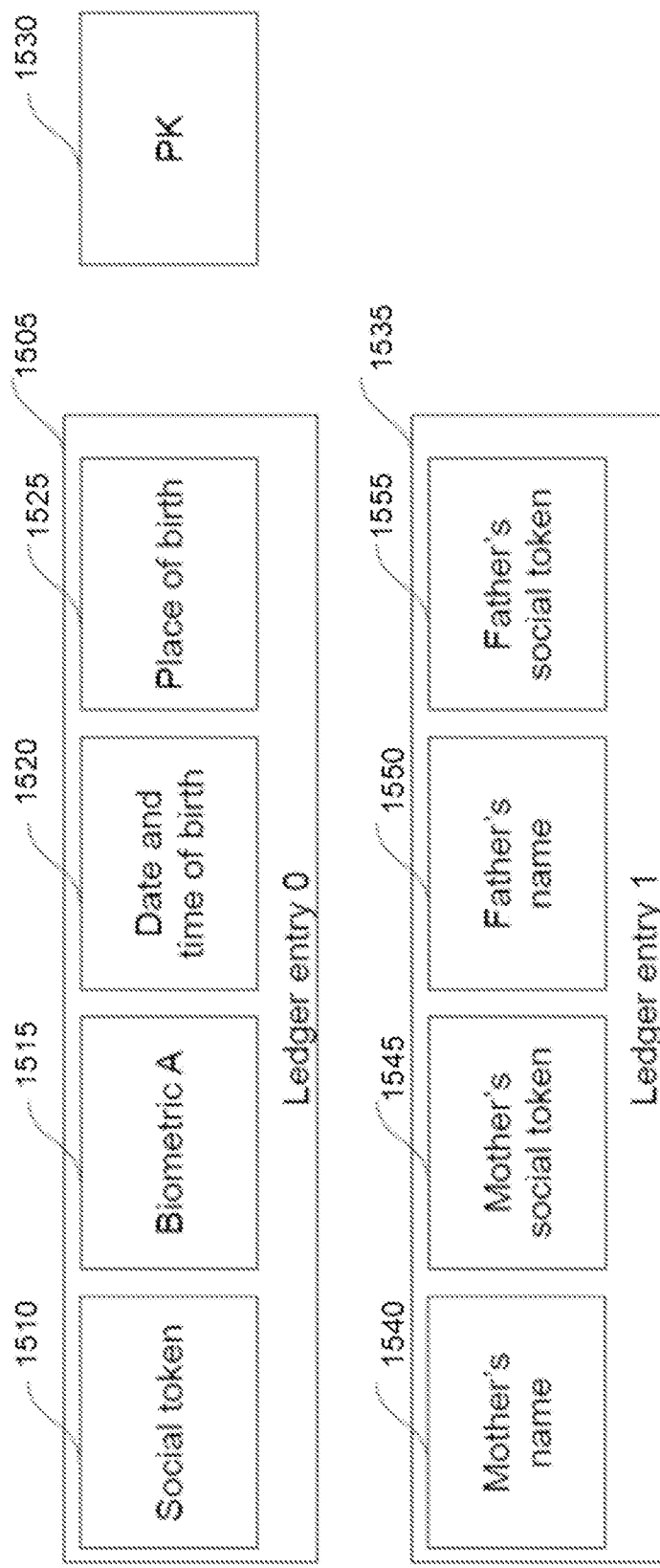
FIG. 15 illustrates an NFT ledger entry corresponding to an NFT identifier.

A social NFT may exist on a personalized branch of a centralized and/or decentralized blockchain. Ledger entries related to an individual's social NFT in accordance with several embodiments of the invention are depicted in FIG. 15. Ledger entries of this type may be used to build an immutable identity foundation whereby biometrics, birth and parental information are associated with an NFT. As such, this information may also be protected with encryption using a private key 1530. The initial entry in a ledger, "ledger entry 0" 1505, may represent a social token 1510 assignment to an individual with a biometric "A" 1515. In this embodiment, the biometric may include but is not limited to a footprint, a DNA print, and a fingerprint. The greater record may also include the individual's date and time of birth 1520 and place of birth 1525. A subsequent ledger entry 1 1535 may append parental information including but not limited to mothers' name 1540, mother's social token 1545, father's name 1550, and father's social token 1555.

In a number of embodiments, the various components that make up a social NFT may vary from situation to situation. In a number of embodiments, biometrics and/or parental information may be unavailable in a given situation and/or period of time. Other information including, but not limited to, race gender, and governmental number assignments such as social security numbers, may be desirable to include in the ledger. In a blockchain, future NFT creation may create a life-long ledger record of an individual's public and private activities. In accordance with some embodiments, the record may be associated with information including, but not limited to, identity, purchases, health and medical records, access NFTs, family records such as future offspring, marriages, familial history, photographs, videos, tax filings, and/or patent filings. The management and/or maintenance of an individual's biometrics throughout the individual's life may be immutably connected to the first social NFT given the use of a decentralized blockchain ledger.

In some embodiments, a certifying third party may generate an NFT associated with certain rights upon the occurrence of a specific event. In one such embodiment, the DMV may be the certifying party and generate an NFT associated with the right to drive a car upon issuing a traditional driver's license. In another embodiment, the certifying third party may be a bank that verifies a person's identity papers and generates an NFT in response to a successful verification. In a third embodiment, the certifying party may be a car manufacturer, who generates an NFT and associates it with the purchase and/or lease of a car.

In many embodiments, a rule may specify what types of policies the certifying party may associate with the NFT. Additionally, a non-certified entity may also generate an NFT and assert its validity. This may require putting up some form of security. In one example, security may come in the form of a conditional payment associated with the NFT generated by the non-certified entity. In this case, the conditional payment may be exchangeable for funds if abuse can be detected by a bounty hunter and/or some alternate entity. Non-certified entities may also relate to a publicly accessible reputation record describing the non-certified entity's reputability.

Anchored NFTs may additionally be applied to automatic enforcement of programming rules in resource transfers. NFTs of this type may be referred to as promise NFTs. A promise NFT may include an agreement expressed in a machine-readable form and/or in a human-accessible form. In a number of embodiments, the machine-readable and human-readable elements can be generated one from the other. In some embodiments, an agreement in a machine-readable form may include, but is not limited to, a policy and/or an executable script. In some embodiments, an agreement in a human-readable form may include, but is not limited to, a text and/or voice-based statement of the promise.

In some embodiments, regardless of whether the machine-readable and human-readable elements are generated from each other, one can be verified based on the other. Smart contracts including both machine-readable statements and human-accessible statements may also be used outside the implementation of promise NFTs. Moreover, promise NFTs may be used outside actions taken by individual NFTs and/or NFT-owners. In some embodiments, promise NFTs may relate to general conditions, and may be used as part of a marketplace.

In one such example, horse betting may be performed through generating a first promise NFT that offers a payment of $10 if a horse does not win. Payment may occur under the condition that the first promise NFT is matched with a second promise NFT that causes a transfer of funds to a public key specified with the first promise NFT if horse X wins.

A promise NFT may be associated with actions that cause the execution of a policy and/or rule indicated by the promise NFT. In some embodiments of the invention, a promise of paying a charity may be associated with the sharing of an NFT. In this embodiment, the associated promise NFT may identify a situation that satisfies the rule associated with the promise NFT, thereby causing the transfer of funds when the condition is satisfied (as described above). One method of implementation may be embedding in and/or associating a conditional payment with the promise NFT. A conditional payment NFT may induce a contract causing the transfer of funds by performing a match. In some such methods, the match may be between the promise NFT and inputs that identify that the conditions are satisfied, where said input can take the form of another NFT. In a number of embodiments, one or more NFTs may also relate to investment opportunities.

For example, a first NFT may represent a deed to a first building, and a second NFT a deed to a second building. Moreover, the deed represented by the first NFT may indicate that a first party owns the first property. The deed represented by the second NFT may indicate that a second party owns the second property. A third NFT may represent one or more valuations of the first building. The third NFT may in turn be associated with a fourth NFT that may represent credentials of a party performing such a valuation. A fifth NFT may represent one or more valuations of the second building. A sixth may represent the credentials of one of the parties performing a valuation. The fourth and sixth NFTs may be associated with one or more insurance policies, asserting that if the parties performing the valuation are mistaken beyond a specified error tolerance, then the insurer would pay up to a specified amount.

A seventh NFT may then represent a contract that relates to the planned acquisition of the second building by the first party, from the second party, at a specified price. The seventh NFT may make the contract conditional provided a sufficient investment and/or verification by a third party. A third party may evaluate the contract of the seventh NFT, and determine whether the terms are reasonable. After the evaluation, the third party may then verify the other NFTs to ensure that the terms stated in the contract of the seventh NFT agree. If the third party determines that the contract exceeds a threshold in terms of value to risk, as assessed in the seventh NFT, then executable elements of the seventh NFT may cause transfers of funds to an escrow party specified in the contract of the sixth NFT.

Alternatively, the first party may initiate the commitment of funds, conditional on the remaining funds being raised within a specified time interval. The commitment of funds may occur through posting the commitment to a ledger. Committing funds may produce smart contracts that are conditional on other events, namely the payments needed to complete the real estate transaction. The smart contract also may have one or more additional conditions associated with it. For example, an additional condition may be the reversal of the payment if, after a specified amount of time, the other funds have not been raised. Another condition may be related to the satisfactory completion of an inspection and/or additional valuation.

NFTs may also be used to assert ownership of virtual property. Virtual property in this instance may include, but is not limited to, rights associated with an NFT, rights associated with patents, and rights associated with pending patents. In a number of embodiments, the entities involved in property ownership may be engaged in fractional ownership. In some such embodiments, two parties may wish to purchase an expensive work of digital artwork represented by an NFT. The parties can enter into smart contracts to fund and purchase valuable works. After a purchase, an additional NFT may represent each party's contribution to the purchase and equivalent fractional share of ownership.

Another type of NFTs that may relate to anchored NFTs may be called "relative NFTs." This may refer to NFTs that relate two or more NFTs to each other. Relative NFTs associated with social NFTs may include digital signatures that is verified using a public key of a specific social NFT. In some embodiments, an example of a relative NFT may be an assertion of presence in a specific location, by a person corresponding to the social NFT. This type of relative NFT may also be referred to as a location NFT and a presence NFT. Conversely, a signature verified using a public key embedded in a location NFT may be used as proof that an entity sensed by the location NFT is present. Relative NFTs are derived from other NFTs, namely those they relate to, and therefore may also be referred to as derived NFTs. An anchored NFT may tie to another NFT, which may make it both anchored and relative. An example of such may be called pseudonym NFTs.

Pseudonym NFTs may be a kind of relative NFT acting as a pseudonym identifier associated with a given social NFT. In some embodiments, pseudonym NFTs may, after a limited time and/or a limited number of transactions, be replaced by a newly derived NFTs expressing new pseudonym identifiers. This may disassociate users from a series of recorded events, each one of which may be associated with different pseudonym identifiers. A pseudonym NFT may include an identifier that is accessible to biometric verification NFTs. Biometric verification NFTs may be associated with a TEE and/or DRM which is associated with one or more biometric sensors. Pseudonym NFTs may be output by social NFTs and/or pseudonym NFTs.

Inheritance NFTs may be another form of relative NFTs, that transfers rights associated with a first NFT to a second NFT. For example, computers, represented by an anchored NFT that is related to a physical entity (the hardware), may have access rights to WiFi networks. When computers are replaced with newer models, users may want to maintain all old relationships, for the new computer. For example, users may want to retain WiFi hotspots. For this to be facilitated, a new computer can be represented by an inheritance NFT, inheriting rights from the anchored NFT related to the old computer. An inheritance NFT may acquire some or all pre-existing rights associated with the NFT of the old computer, and associate those with the NFT associated with the new computer.

More generally, multiple inheritance NFTs can be used to selectively transfer rights associated with one NFT to one or more NFTs, where such NFTs may correspond to users, devices, and/or other entities, when such assignments of rights are applicable. Inheritance NFTs can also be used to transfer property. One way to implement the transfer of property can be to create digital signatures using private keys. These private keys may be associated with NFTs associated with the rights. In accordance with a number of embodiments, transfer information may include the assignment of included rights, under what conditions the transfer may happen, and to what NFT(s) the transfer may happen. In this transfer, the assigned NFTs may be represented by identifies unique to these, such as public keys. The digital signature and message may then be in the form of an inheritance NFT, or part of an inheritance NFT. As rights are assigned, they may be transferred away from previous owners to new owners through respective NFTs. Access to financial resources is one such example.

However, sometimes rights may be assigned to new parties without taking the same rights away from the party (i.e., NFT) from which the rights come. One example of this may be the right to listen to a song, when a license to the song is sold by the artist to consumers. However, if the seller sells exclusive rights, this causes the seller not to have the rights anymore.

In accordance with many embodiments of the invention, multiple alternative NFT configurations may be implemented. One classification of NFT may be an employee NFT or employee token. Employee NFTs may be used by entities including, but not limited to, business employees, students, and organization members. Employee NFTs may operate in a manner analogous to key card photo identifications. In a number of embodiments, employee NFTs may reference information including, but not limited to, company information, employee identity information and/or individual identity NFTs.

Additionally, employee NFTs may include associated access NFT information including but not limited to, what portions of a building employees may access, and what computer system employees may utilize. In several embodiments, employee NFTs may incorporate their owner's biometrics, such as a face image. In a number of embodiments, employee NFTs may operate as a form of promise NFT. In some embodiments, employee NFT may comprise policies or rules of employing organization. In a number of embodiments, the employee NFT may reference a collection of other NFTs.

Another type of NFT may be referred to as the promotional NFT or promotional token. Promotional NFTs may be used to provide verification that promoters provide promotion winners with promised goods. In some embodiments, promotional NFTs may operate through decentralized applications for which access restricted to those using an identity NFT. The use of a smart contract with a promotional NFT may be used to allow for a verifiable release of winnings. These winnings may include, but are not limited to, cryptocurrency, money, and gift card NFTs useful to purchase specified goods. Smart contracts used alongside promotional NFTs may be constructed for winners selected through random number generation.

Another type of NFT may be called the script NFT or script token. Script tokens may incorporate script elements including, but not limited to, story scripts, plotlines, scene details, image elements, avatar models, sound profiles, and voice data for avatars. Script tokens may also utilize rules and policies that describe how script elements are combined. Script tokens may also include rightsholder information, including but not limited to, licensing and copyright information. Executable elements of script tokens may include instructions for how to process inputs; how to configure other elements associated with the script tokens; and how to process information from other tokens used in combination with script tokens.

Script tokens may be applied to generate presentations of information. In accordance with some embodiments, these presentations may be developed on devices including but not limited to traditional computers, mobile computers, and virtual reality display devices. Script tokens may be used to provide the content for game avatars, digital assistant avatars, and/or instructor avatars. Script tokens may comprise audio-visual information describing how input text is presented, along with the input text that provides the material to be presented. It may also comprise what may be thought of as the personality of the avatar, including how the avatar may react to various types of input from an associated user.

In some embodiments, script NFTs may be applied to govern behavior within an organization. For example, this may be done through digital signatures asserting the provenance of the scripts. Script NFTs may also, in full and/or in part, be generated by freelancers. For example, a text script related to a movie, an interactive experience, a tutorial, and/or other material, may be created by an individual content creator. This information may then be combined with a voice model or avatar model created by an established content producer. The information may then be combined with a background created by additional parties. Various content producers can generate parts of the content, allowing for large-scale content collaboration.

Features of other NFTs can be incorporated in a new NFT using techniques related to inheritance NFTs, and/or by making references to other NFTs. As script NFTs may consist of multiple elements, creators with special skills related to one particular element may generate and combine elements. This may be used to democratize not only the writing of storylines for content, but also outsourcing for content production. For each such element, an identifier establishing the origin or provenance of the element may be included. Policy elements can also be incorporated that identify the conditions under which a given script element may be used. Conditions may be related to, but are not limited to execution environments, trusts, licenses, logging, financial terms for use, and various requirements for the script NFTs. Requirements may concern, but are not limited to, what other types of elements the given element are compatible with, what is allowed to be combined with according the terms of service, and/or local copyright laws that must be obeyed.

Evaluation units may be used with various NFT classifications to collect information on their use. Evaluation units may take a graph representing subsets of existing NFTs and make inferences from the observed graph component. From this, valuable insights into NFT value may be derived. For example, evaluation units may be used to identify NFTs whose popularity is increasing or waning. In that context, popularity may be expressed as, but not limited to, the number of derivations of the NFT that are made; the number of renderings, executions or other uses are made; and the total revenue that is generated to one or more parties based on renderings, executions or other uses.

Evaluation units may make their determination through specific windows of time and/or specific collections of end-users associated with the consumption of NFT data in the NFTs. Evaluation units may limit assessments to specific NFTs (e.g. script NFTs). This may be applied to identify NFTs that are likely to be of interest to various users. In addition, the system may use rule-based approaches to identify NFTs of importance, wherein importance may be ascribed to, but is not limited to, the origination of the NFTs, the use of the NFTs, the velocity of content creation of identified clusters or classes, the actions taken by consumers of NFT, including reuse of NFTs, the lack of reuse of NFTs, and the increased or decreased use of NFTs in selected social networks.

Evaluations may be repurposed through recommendation mechanisms for individual content consumers and/or as content originators. Another example may address the identification of potential combination opportunities, by allowing ranking based on compatibility. Accordingly, content creators such as artists, musicians and programmers can identify how to make their content more desirable to intended target groups.

The generation of evaluations can be supported by methods including, but not limited to machine learning (ML) methods, artificial intelligence (AI) methods, and/or statistical methods. Anomaly detection methods developed to identify fraud can be repurposed to identify outliers. This can be done to flag abuse risks or to improve the evaluation effort.

Multiple competing evaluation units can make competing predictions using alternative and proprietary algorithms. Thus, different evaluation units may be created to identify different types of events to different types of subscribers, monetizing their insights related to the data they access.

In a number of embodiments, evaluation units may be a form of NFTs that derive insights from massive amounts of input data. Input data may correspond, but is not limited to the graph component being analyzed. Such NFTs may be referred to as evaluation unit NFTs.

The minting of NFTs may associate rights with first owners and/or with an optional one or more policies and protection modes. An example policy and/or protection mode directed to financial information may express royalty requirements. An example policy and/or protection mode directed to non-financial requirements may express restrictions on access and/or reproduction. An example policy directed to data collection may express listings of user information that may be collected and disseminated to other participants of the NFT platform.

Figure 16A:
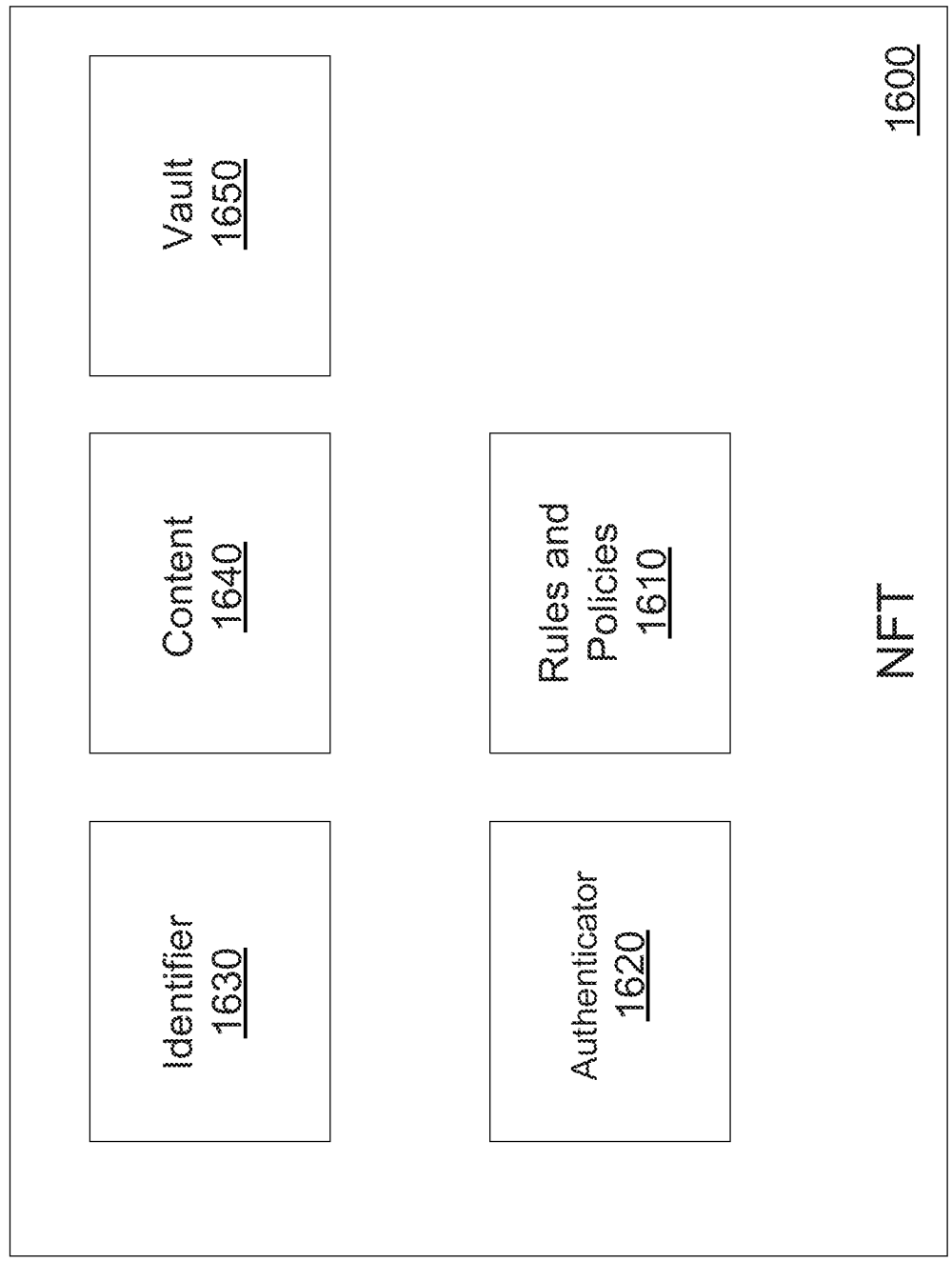
FIGS. 16A-16B illustrate an NFT arrangement relationship with corresponding physical content in accordance with an embodiment of the invention.
Figure 16B:
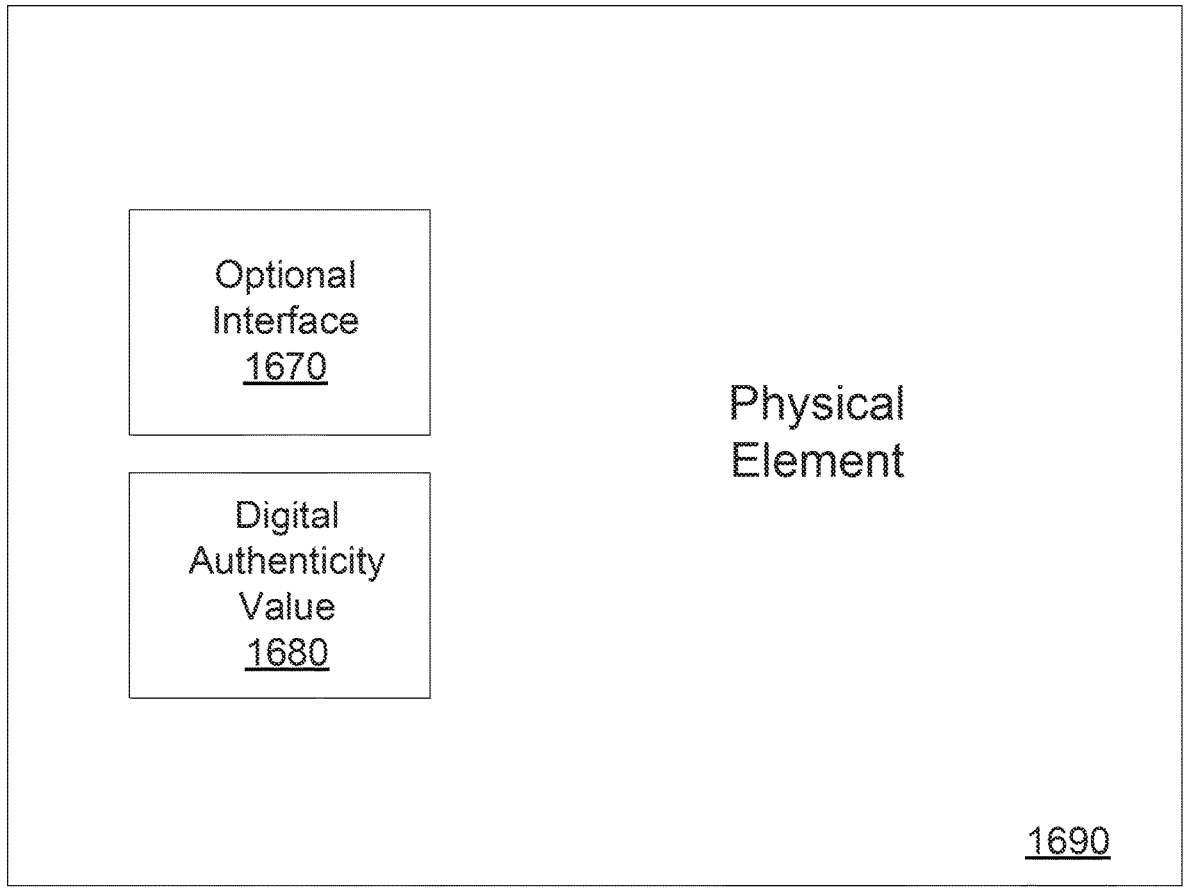

An example NFT which may be associated with specific content in accordance with several embodiments of the invention is illustrated in FIG. 16. In some embodiments, an NFT 1600 may utilize a vault 1650, which may control access to external data storage areas. Methods of controlling access may include, but are not limited to, user credential information 1350. In accordance with a number of embodiments of the invention, control access may be managed through encrypting content 1640. As such, NFTs 1600 can incorporate content 1640, which may be encrypted, not encrypted, yet otherwise accessible, or encrypted in part. In accordance with some embodiments, an NFT 1600 may be associated with one or more content 1640 elements, which may be contained in or referenced by the NFT. A content 1640 element may include, but is not limited to, an image, an audio file, a script, a biometric user identifier, and/or data derived from an alternative source. An example alternative source may be a hash of biometric information). An NFT 1600 may also include an authenticator 1620 capable of affirming that specific NFTs are valid.

In accordance with many embodiments of the invention, NFTs may include a number of rules and policies 1610. Rules and policies 1610 may include, but are not limited to access rights information 1340. In some embodiments, rules and policies 1610 may also state terms of usage, royalty requirements, and/or transfer restrictions. An NFT 1600 may also include an identifier 1630 to affirm ownership status. In accordance with many embodiments of the invention, ownership status may be expressed by linking the identifier 1630 to an address associated with a blockchain entry.

In accordance with a number of embodiments of the invention, NFTs may represent static creative content. NFTs may also be representative of dynamic creative content, which changes over time. In accordance with many examples of the invention, the content associated with an NFT may be a digital content element.

One example of a digital content element in accordance with some embodiments may be a set of five images of a mouse. In this example, the first image may be an image of the mouse being alive. The second may be an image of the mouse eating poison. The third may be an image of the mouse not feeling well. The fourth image may be of the mouse, dead. The fifth image may be of a decaying mouse.

The user credential information 1350 of an NFT may associate each image to an identity, such as of the artist. In accordance with a number of embodiments of the invention, NFT digital content can correspond to transitions from one representation (e.g., an image of the mouse, being alive) to another representation (e.g., of the mouse eating poison). In this disclosure, digital content transitioning from one representation to another may be referred to as a state change and/or an evolution. In a number of embodiments, an evolution may be triggered by the artist, by an event associated with the owner of the artwork, randomly, and/or by an external event.

When NFTs representing digital content are acquired in accordance with some embodiments of the invention, they may also be associated with the transfer of corresponding physical artwork, and/or the rights to said artwork. The first ownership records for NFTs may correspond to when the NFT was minted, at which time its ownership can be assigned to the content creator. Additionally, in the case of "lazy" minting, rights may be directly assigned to a buyer.

In some embodiments, as a piece of digital content evolves, it may also change its representation. The change in NFTs may also send a signal to an owner after it has evolved. In doing so, a signal may indicate that the owner has the right to acquire the physical content corresponding to the new state of the digital content. Under an earlier example, buying a live mouse artwork, as an NFT, may also carry the corresponding painting, and/or the rights to it. A physical embodiment of an artwork that corresponds to that same NFT may also be able to replace the physical artwork when the digital content of the NFT evolves. For example, should the live mouse artwork NFT change states to a decaying mouse, an exchange may be performed of the corresponding painting for a painting of a decaying mouse.

The validity of one of the elements, such as the physical element, can be governed by conditions related to an item with which it is associated. For example, a physical painting may have a digital authenticity value that attests to the identity of the content creator associated with the physical painting.

An example of a physical element 1690 corresponding to an NFT, in accordance with some embodiments of the invention is illustrated in FIG. 16. A physical element 1690 may be a physical artwork including, but not limited to, a drawing, a statue, and/or another physical representation of art. In a number of embodiments, physical representations of the content (which may correspond to a series of paintings) may each be embedded with a digital authenticity value (or a validator value) value. In accordance with many embodiments of the invention, a digital authenticity value (DAV) 1680 may be therefore be associated with a physical element 1690 and a digital element. A digital authenticity value may be a value that includes an identifier and a digital signature on the identifier. In some embodiments the identifier may specify information related to the creation of the content. This information may include the name of the artist, the identifier 1630 of the digital element corresponding to the physical content, a serial number, information such as when it was created, and/or a reference to a database in which sales data for the content is maintained. A digital signature element affirming the physical element may be made by the content creator and/or by an authority associating the content with the content creator.

In some embodiments, the digital authenticity value 1680 of the physical element 1690 can be expressed using a visible representation. The visible representation may be an optional physical interface 1670 taken from a group including, but not limited to, a barcode and a quick response (QR) code encoding the digital authenticity value. In some embodiments, the encoded value may also be represented in an authenticity database. Moreover, the physical interface 1670 may be physically associated with the physical element. One example of such may be a QR tag being glued to or printed on the back of a canvas. In some embodiments of the invention, the physical interface 1670 may be possible to physically disassociate from the physical item it is attached to. However, if a DAV 1680 is used to express authenticity of two or more physical items, the authenticity database may detect and block a new entry during the registration of the second of the two physical items. For example, if a very believable forgery is made of a painting the forged painting may not be considered authentic without the QR code associated with the digital element.

In a number of embodiments, the verification of the validity of a physical item, such as a piece of artwork, may be determined by scanning the DAV. In some embodiments, scanning the DAV may be used to determine whether ownership has already been assigned. Using techniques like this, each physical item can be associated with a control that prevents forgeries to be registered as legitimate, and therefore, makes them not valid. In the context of a content creator receiving a physical element from an owner, the content creator can deregister the physical element 1690 by causing its representation to be erased from the authenticity database used to track ownership. Alternatively, in the case of an immutable blockchain record, the ownership blockchain may be appended with new information. Additionally, in instances where the owner returns a physical element, such as a painting, to a content creator in order for the content creator to replace it with an "evolved" version, the owner may be required to transfer the ownership of the initial physical element to the content creator, and/or place the physical element in a stage of being evolved.

Figure 17:
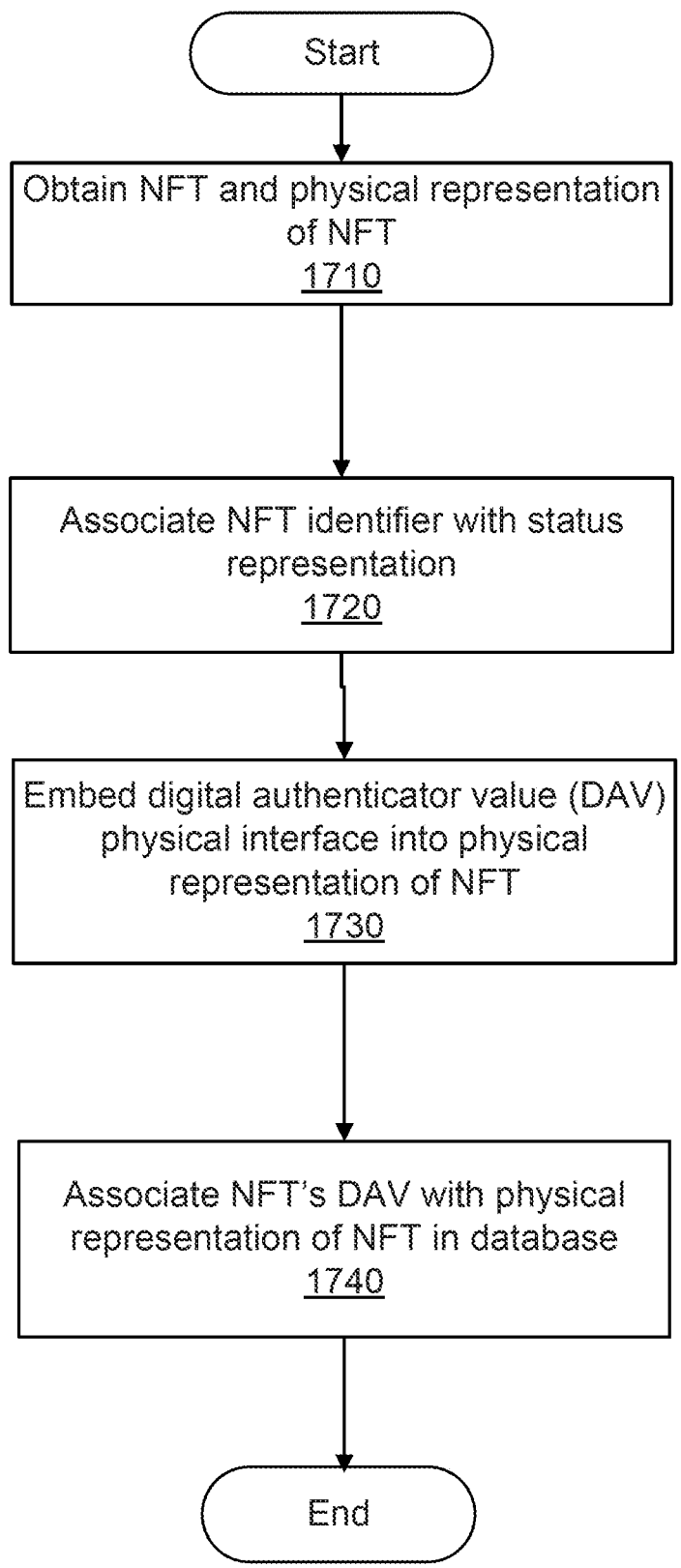
FIG. 17 illustrates a process for establishing a relationship between an NFT and corresponding physical content.

An example of a process for connecting an NFT digital element to physical content in accordance with some embodiments of the invention is illustrated in FIG. 17. Process 1700 may obtain (1710) an NFT and a physical representation of the NFT in connection with an NFT transaction. Under the earlier example, this may be a painting of a living mouse and an NFT of a living mouse. By virtue of establishing ownership of the NFT, the process 1700 may associate (1720) an NFT identifier with a status representation of the NFT. The NFT identifier may specify attributes including, but not limited to, the creator of the mouse painting and NFT ("Artist"), the blockchain the NFT is on ("NFT-Chain"), and an identifying value for the digital element ("no. 0001"). Meanwhile, the status representation may clarify the present state of the NFT ("alive mouse"). Process 1700 may also embed (1730) a DAV physical interface into the physical representation of the NFT. In a number of embodiments of the invention, this may be done by implanting a QR code into the back of the mouse painting. In affirming the connection between the NFT and painting, Process 1700 can associate (1740) the NFT's DAV with the physical representation of the NFT in a database. In some embodiments, the association can be performed through making note of the transaction and clarifying that it encapsulates both the mouse painting and the mouse NFT.

While specific processes are described above with reference to FIGS. 15-17, NFTs can be implemented in any of a number of different ways to enable as appropriate to the requirements of specific applications in accordance with various embodiments of the invention. Additionally, the specific manner in which NFTs can be utilized within NFT platforms in accordance with various embodiments of the invention is largely dependent upon the requirements of a given application.

Evolution of Tokenized Content

NFT evolution platforms in accordance with many embodiments of the invention allow for transactions of dynamic "evolving" NFT assets (e.g., artwork, media, among many other types of NFT assets), that evolve and/or self-modifies and/or which can be augmented by a user (e.g., artist, NFT author, among others). NFTs can include NFTs for cards, music, podcasts, video, novels, scripts, documents, and/or advertisements among many other types of NFTs. In particular, current marketplaces may only allow purchases of static artwork and thus do not address the potential for dynamic assets (e.g., artwork, among others) that evolve, self-modifies and/or which can be augmented by an artist.

NFT evolution platforms in accordance with many embodiments of the invention support the ability of NFT assets to be affected and/or personalized by user input. In particular, prior systems may not support the ability to be affected or personalized by user input. NFT evolution platforms in accordance with many embodiments of the invention can support NFT assets that evolve.

In many embodiments, NFT evolution platforms can track NFT assets that evolve based on a variety of factors, including based on triggering events e.g., based on a number of sales and/or any aspect of an NFT asset trading history, among various other factors. NFT evolution platforms in accordance with many embodiments of the invention provide solutions to many important issues to enable more types of NFT assets to be traded. NFT evolution platforms in accordance with many embodiments of the invention can use protocols and/or policies that directly connect one or more a smart-contracts associated with an NFT asset and the content of this asset. For example, an NFT asset of an artwork can provide information that can help evolve the content of the NFT asset (e.g., artwork) itself.

Figure 18:
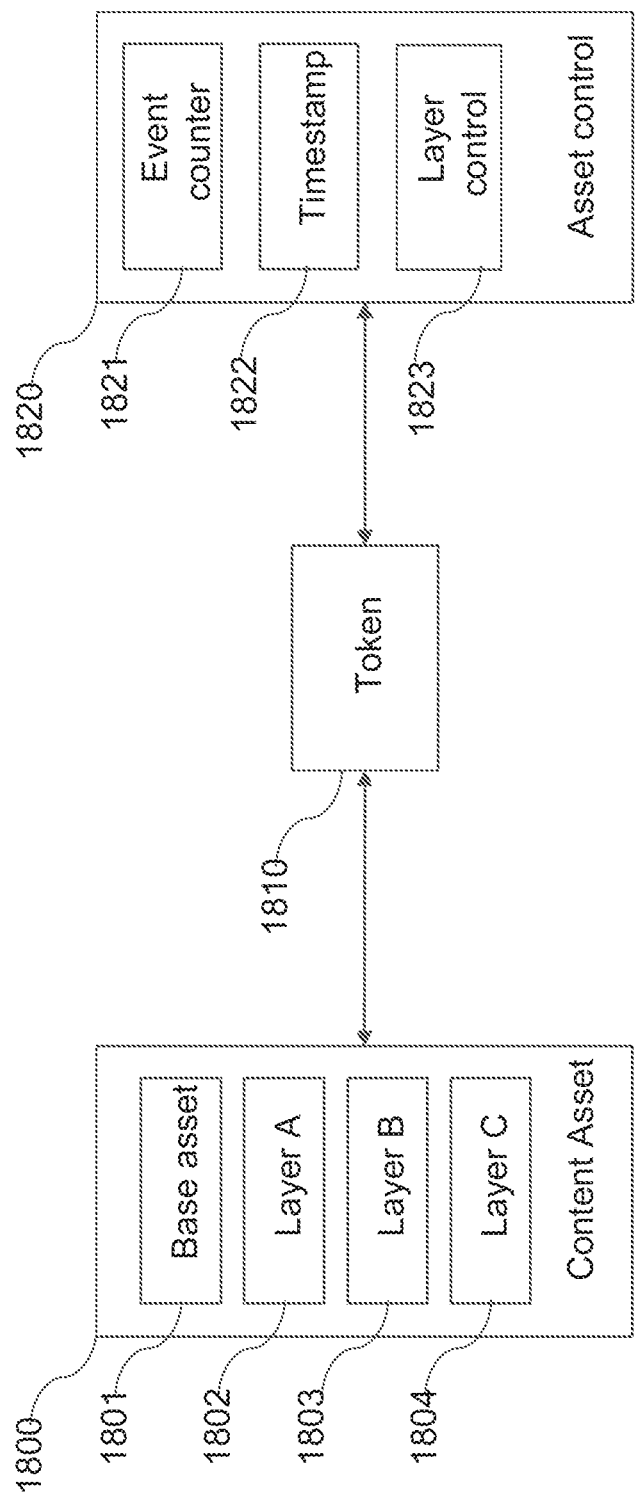
FIG. 18 illustrates a token configuration whereby an asset, such as an artwork content that includes layers, interfaces with a token and an asset control that determines which artwork layers are active at a given time in accordance with an embodiment of the invention.

NFT evolution platforms in accordance with many embodiments of the invention can generate NFT assets that can include content that includes different layers and the content can interface with the NFT asset and an asset control that can determine which content layers can be active (e.g., public vs. private, visible vs. hidden from a user, e.g., enabled vs. disabled, among various other settings) at a given time. A token configuration whereby an asset, (e.g., such as an artwork content that includes layers) interfaces with a token and an asset control that determines which layers are active at a given time in accordance with an embodiment of the invention is illustrated in FIG. 18.

A content asset 1800 (e.g., such as an artwork, media, among various other types of assets) can be minted into an NFT asset 1810. Content asset 1800 can include a base asset 1801 that may be available upon minting. An asset can include one or more layers, including several layers that includes layers A 1802, B 1803, and C 1804. Layers can be associated with different accessibilities. In particular, certain layers may be accessible (e.g., public) at a certain time while certain other layers may not be accessible (e.g., private) at that time. NFT asset 1810 can include embedded policies that can require the NFT to access asset control 1820. Asset control 1820 may include different types of asset control policies, including event counters 1821 (e.g., such as a number of resales counter and/or price threshold counters), timestamp capability 1822, and asset layer control logic 1823 that can allow the NFT to evolve, in layers, as events unfold. In many embodiments, an NFT, content, and asset control may include encryption to help protect the NFT from unauthorized use and inappropriate layer reveals. Although FIG. 18 illustrates a particular configuration of an NFT asset that includes layers associated with an asset control, any of a variety of NFT configurations can be utilized to embed asset control policies as appropriate to the requirements of specific applications in accordance with embodiments of the invention.

NFT evolution platforms in accordance with many embodiments of the invention can include NFT assets that are based on generative processes, where a specific NFT token may start with a particular element, and each time the NFT asset is involved in a transaction (e.g., traded, licensed, purchased, among various other events), information can be used directly into the NFT asset and the NFT asset can evolve, adding and/or removing one or more elements for each transaction. For example, in a work that is based on generative art processes, a specific visual digital art piece may start with one element, but each time the NFT is traded, information can be delivered and/or enabled directly into the art piece and it evolves adding, or removing, at least one new element every trade.

Figure 19:
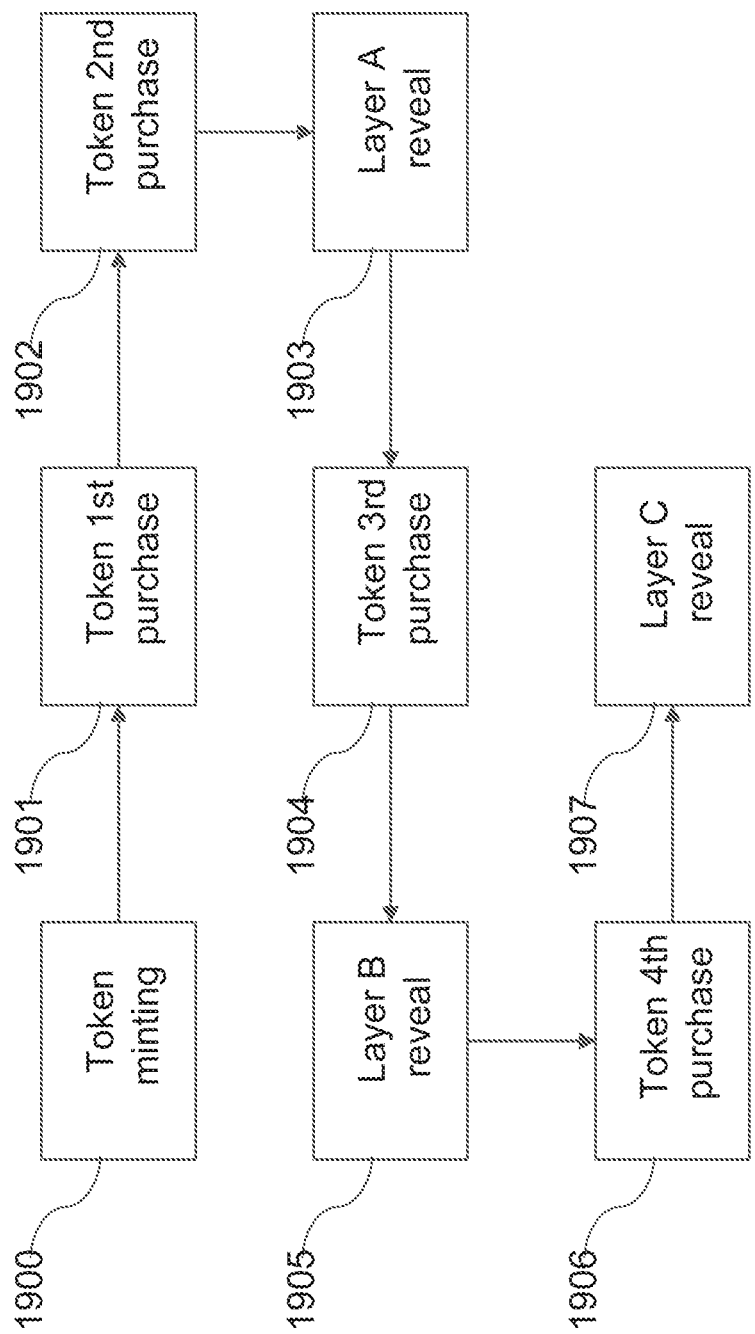
FIG. 19 illustrates a process illustrating evolution of an NFT asset (e.g., an artwork background) based upon subsequent NFT resales in accordance with an embodiment of the invention.

NFT evolution platforms in accordance with many embodiments of the invention can generate NFT assets that can evolve based upon different types of data and/or events, including events associated with transactions such as sales and/or resales among other types of transactions of the NFT asset. A process illustrating evolution of an NFT asset (e.g., an artwork background) based upon subsequent NFT resales in accordance with an embodiment of the invention is illustrated in FIG. 19. An NFT evolution platform can generate an original multi-layered NFT asset minted by a creator of the asset. The original NFT asset can include a base content and one or more layers. Different layers of an NFT can be associated with different accessibilities (e.g., private, public, hidden, revealed, among others). The original NFT asset can be transferred 1901 (e.g., by purchase, licensee, among other types of transactions) to a first owner. Upon resale, corresponding to a second transaction (e.g., purchase) of the NFT 1902, an additional layer of content (e.g., artwork), layer A 1903 can be set to public and revealed 1903 and the NFT may be more valuable to the second owner. Upon a third transaction 1904 (e.g., a sale), a second new layer B 1905 can be set to public and thus revealed to a user. And, upon a fourth transaction 1906 (e.g., sale), a third new layer C 1907 can be set to public and revealed. Accordingly, each time an event such as a transaction is detected, a new layer of the NFT can have an accessibility control changed e.g., set to public and revealed based on a policy associated with the NFT. NFT evolution platforms in accordance with several embodiments of the invention can include NFT assets that can reveal layers for certain types of transactions which may qualify to trigger the revealing of additional layers. In many embodiments, a triggering event, (e.g., such as access to a new virtual room, level, and/or tool in a game environment), may be triggered by inputs from users and can generate outputs that are based on these inputs. Although FIG. 19 illustrates revealing layers of an NFT based on triggering events associated with transactions such as sales of an NFT, any of a variety of events can be utilized to determine accessibility to different layers of NFTs as appropriate to the requirements of specific applications in accordance with embodiments of the invention.

NFT evolution platforms in accordance with many embodiments of the invention can include a storage element that includes one or more policies (e.g., smart contracts, among others) associated with the NFT to enable the dynamic evolution of the NFT assets, as described here. NFT evolution platforms in accordance with many embodiments of the invention can be used for dynamic NFT assets that can be for visual and/or audio works, and can dynamically modify visual and/or audio works using input data from a variety of sources, including from a smart contract associated with the work. NFT evolution platforms in accordance with many embodiments of the invention can be used in an audio-driven generative process, such as a generative grammar process.

Figure 20:
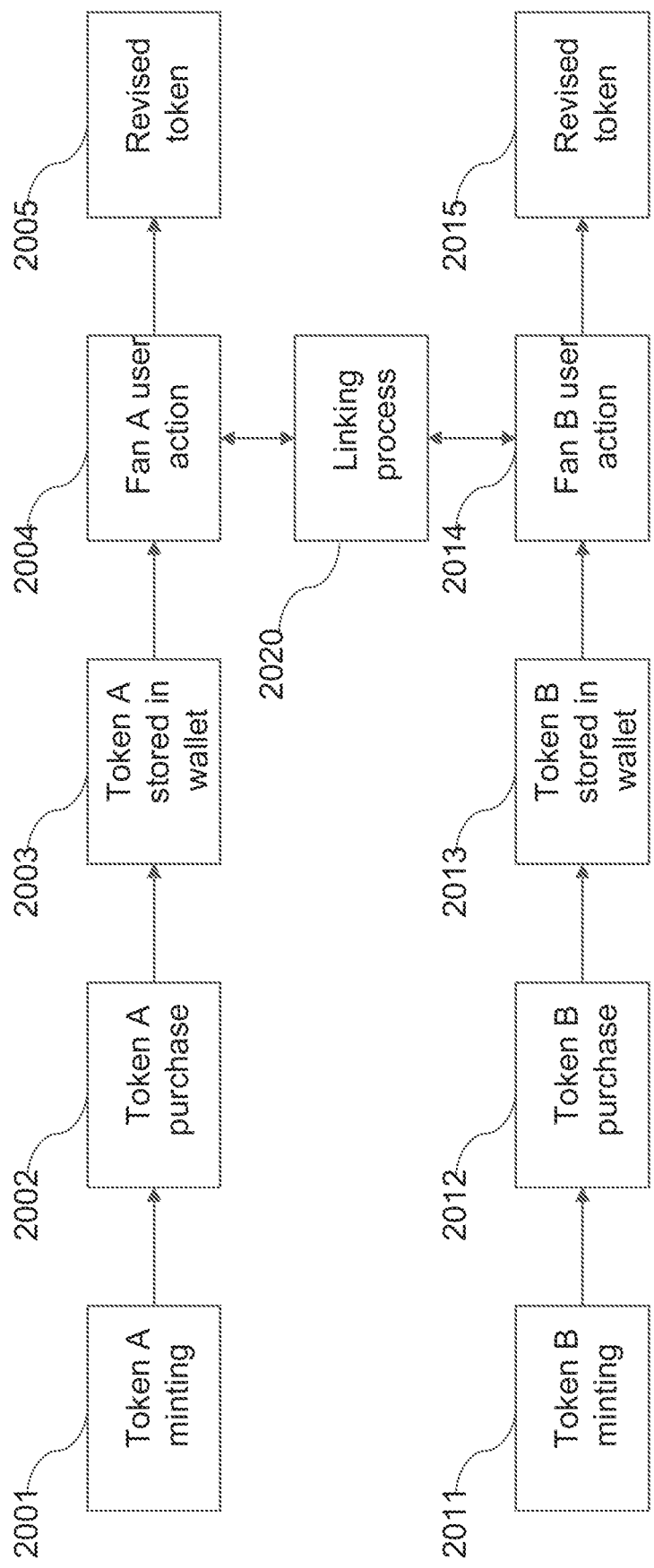
FIG. 20 illustrates an NFT evolution platform that includes a linking process performed by several users in accordance with an embodiment of the invention.

NFT evolution platforms in accordance with many embodiments of the invention can include features that provide linking capabilities to link NFTs associated with different users. An NFT evolution platform that includes a linking process performed by several users in accordance with an embodiment of the invention is illustrated in FIG. 20. In step 2001 an author (e.g., artist) generates, using an NFT platform, an NFT representing an asset (e.g., a digital image). The same author and/or a different author can generate, using an NFT platform, an NFT 2011 representing a different asset, (e.g., another digital image). The NFTs can be transferred (e.g., purchased, licensed, among others) to different users. A first user can obtain rights (e.g., purchases) to NFT 2002 and stores the NFT in a digital wallet 2003. A second user can obtain rights (e.g., purchases) to NFT 2012 and can store the NFT in a wallet 2013. The wallets 2004 and 2014 can include features provided by an NFT platform that allow users to link their NFTs. Accordingly, an NFT evolution platform can perform a linking process 2020 which may be an automated process that can use one or more smart contracts with associated linking policies and that can occur within a blockchain network with a resulting revised NFT 2005 for the first user and a revised NFT 2015 for the second user. In many embodiments, NFT evolution platforms can generate a single NFT for one user, a shared NFT for several users, and/or several revised NFTs for several users, as defined upon linking policies set forth for the NFTs. Although FIG. 20 illustrates an NFT evolution platform that includes a linking process performed by several users, any of a variety of linking processes can be utilized as appropriate to the requirements of specific applications in accordance with embodiments of the invention.

NFT evolution platforms in accordance with many embodiments of the invention can, for example, use generative grammar process that can build layers and/or sections of an NFT asset (e.g., such as a musical song) using input data from a smart contract, and could be implemented using the programming language (e.g., Chuck programming language, among many others), using multi-threaded programming techniques with open sound control. For example, an NFT evolution platforms in accordance with many embodiments of the invention for an audio-driven generative process may start with an NFT asset for a song that is a one or more sets of notes, and each time the NFT asset of the song is traded, the NFT asset can be modified (e.g., adding notes and/or modifying the song) to make the NFT asset of the content (e.g., song) more sonically rich and complex. For example, an NFT asset of a song can have a note C, meaning that the song starts out very sparse and simple. Each time the NFT asset of the song is traded, the song can evolve adding for example an E then a G and continue to get more sonically rich and complex. As a result, after having been traded multiple times, the NFT asset of the song can get more complex and thus more valuable overtime. Accordingly, an NFT asset can be modified to add and/or modify layers of content based on triggering events (e.g., transactions).

NFT evolution platforms in accordance with many embodiments of the invention can include security mechanisms to prevent and/or minimize bad actors that can engage in trades being used to manipulate valuation and/or trading protocols of an NFT asset. In particular, not all trades can be qualifying trades for purposes of evolutionary modifications of NFT assets. NFT evolution platforms in accordance with many embodiments of the invention can specify different policies regarding trading and restrictions on NFT assets. For example, a policy associated with an NFT asset may specify that a circular trade in which two or more users repeatedly purchase the same NFT asset from each other, and/or where two associated users transfer an NFT asset between each other may not meet the requirement of a qualifying trade.

NFT evolution platforms in accordance with many embodiments of the invention can allow users to set one more policies regarding an NFT asset. Policies can be selected from a collection of available policies among various other techniques for specifying policies as appropriate for the particular type of NFT asset (e.g., artwork, audio, visual, among others) as appropriate to the requirements of specific applications in accordance with embodiments of the invention.

Figure 21:
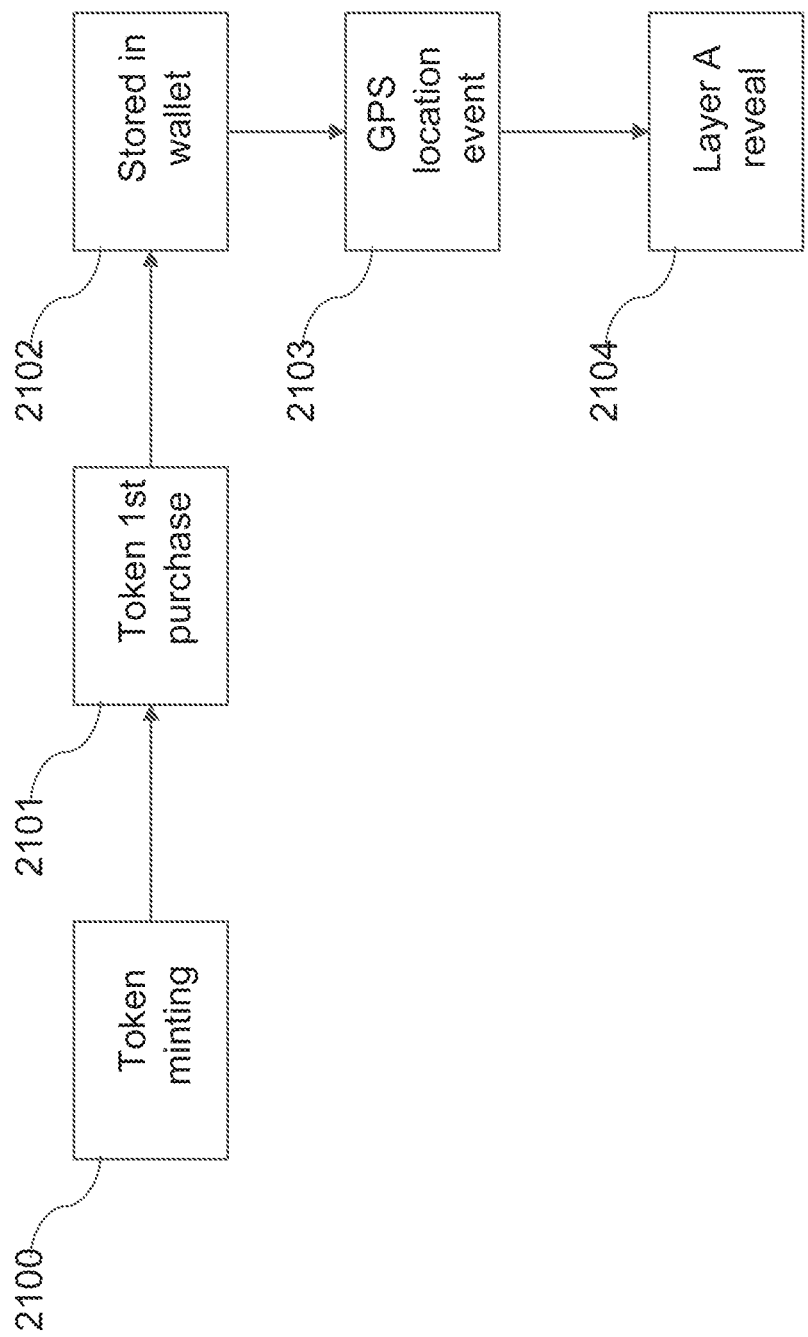
FIG. 21 illustrates a triggering of an NFT evolution based upon a wallet event on a smartphone in accordance with an embodiment of the invention.

NFT evolution platforms in accordance with many embodiments of the invention can generate NFTs that evolve based upon triggering events received from different sources for data, including a wallet event from a digital wallet on a user device (e.g., smartphone), data obtained from different sensors on a user device (e.g., GPS location data), among various other sources of data as appropriate to the requirements of specific applications in accordance with embodiments of the invention. A process of detecting a triggering event for an NFT evolution based upon a wallet event from a user device in accordance with an embodiment of the invention is illustrated in FIG. 21. As illustrated, an author (e.g., artist) using an NFT platform can generate and mints an NFT 2100 that includes several layers, each layer including a content (e.g., an artwork), where a set of layers can be set to visible and a different set of layers can be hidden. The NFT platform can set access control for different layers of the NFT based on user input received from a user. In many embodiments, transparency (e.g., public vs. private, visible/hidden, among other settings) of different layers can be modified by an NFT platform based on detecting different triggering events that can be set in one or more policies (e.g., digital smart contracts) associated with an NFT, where triggering events can use different types of data, including a GPS location of a user and/or NFT, timestamp data, transaction activity, among many other types of data. As illustrated in FIG. 21, an NFT platform can set to public a previously hidden layer when it detects that a user (e.g., licensee) is within a particular location (e.g., GPS geofence that represents one of the authors performance venues) as specified for example within a policy associated with the NFT.

The process can track 2101 a transaction associated with the NFT (e.g., a first purchase of NFT) and the process can store 2102 the NFT in a digital wallet on the user device 2103. The process can also obtain various data from the user device, including location information (e.g., GPS location from different sources including a user's device) and information regarding an author's location (e.g., performance venues and/or schedule), and the process can trigger an event 2103 when a user of the NFT is also at a particular location (e.g., at a venue), and/or at a particular time (e.g., during a performance schedule), such that the NFT can be set to reveal additional layers A 2104 for the user. In many embodiments, the NFT evolution platform can receive user data and determine an occurrence of a triggering event based on a policy associated with an NFT. In certain embodiments, a user device can communicate with the NFT platform to detect triggering events and update transparency settings of the several layers of an NFT. Although FIG. 21 illustrates a particular policy for triggering different layers of an NFT, different policies can be specified for different types of NFTs as appropriate to the requirements of specific applications in accordance with embodiments of the invention.

NFT evolution platforms in accordance with many embodiments of the invention can include policies that can define qualifying trades that can be used in conjunction with a detection of types of trades that are performed to determine changes that are to be made with respect to an NFT asset's content, access, and/or functionality of one or more NFTs. Similar policies may govern other types of events, distinguishing qualifying events from non-qualifying events. For example, an event can be a move of an NFT asset being displayed in a particular geographic location.

For example, an event may only be qualifying if an NFT display unit has been associated with an owner for a threshold amount of time, to avoid "virtual" visits of physical locations by a temporary addition of display units to a user profile. NFT evolution platforms in accordance with many embodiments of the invention can include security features that set out rules/policies that can be associated with an NFT asset and can govern the evolution of the NFT asset (e.g., change of functionality, content, among various other changes to an NFT asset).

Figure 22:
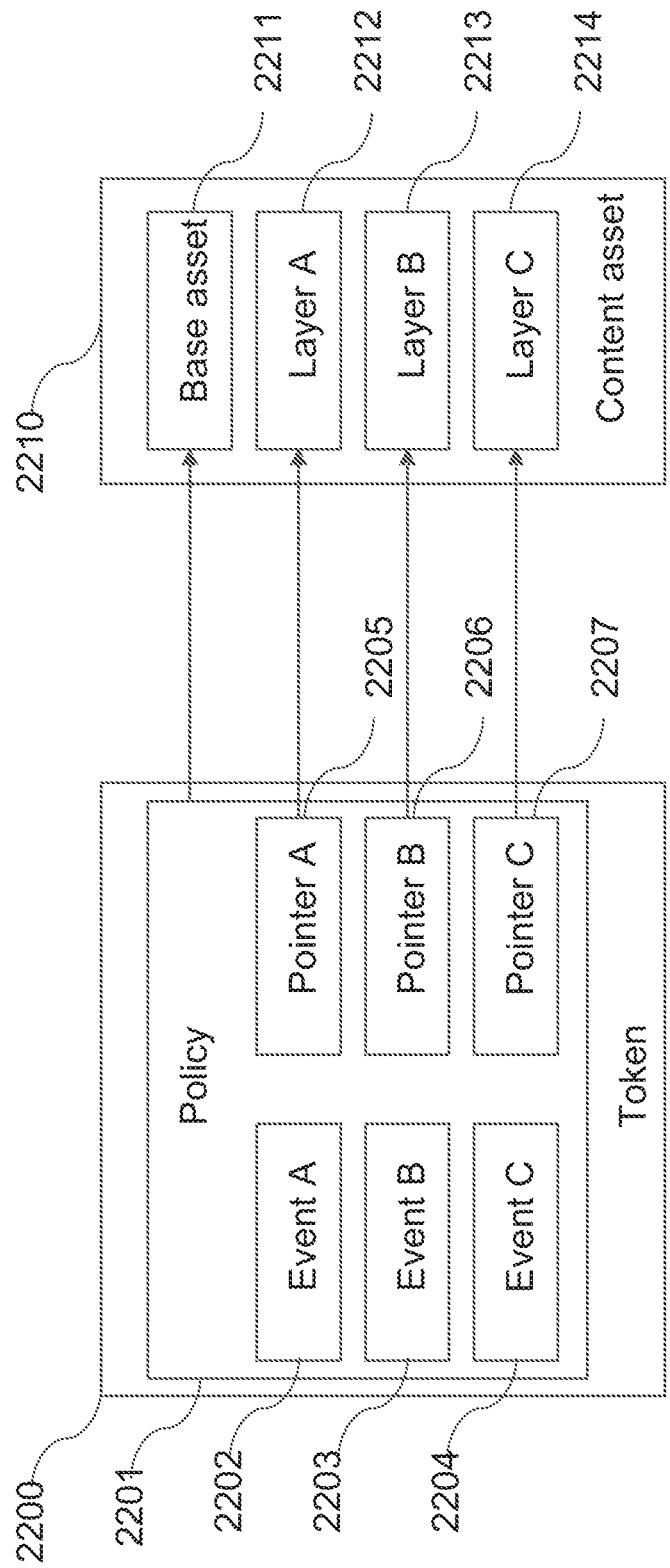
FIG. 22 illustrates an NFT that includes several layers and asset control policies in accordance with an embodiment of the invention.

NFT evolution platforms in accordance with several embodiments of the invention can generate and/or use NFTs that can include one or more layers and associated asset control policies for different layers, which can control an evolution of the NFTs. An NFT that includes several layers and asset control policies in accordance with an embodiment of the invention is illustrated in FIG. 22. As illustrated in FIG. 22, an NFT 2200 can include several elements including a digital policy 2201 that can describe allowable use and/or any restrictions on the NFT, including on a content asset 2210 (e.g., artwork, media, video, rich media, among other types of NFT content) of the NFT. An NFT can include a policy 2201 that includes different triggering events (e.g., event A 2202, event B 2203, event C 2204) and each triggering event can be associated with a link (e.g., pointer) that provides a location to a particular layer (e.g., Layer A 2212, Layer B 2213, Layer C 2214 . . . up to Layer N) of a content asset 2210 to which a particular triggering event corresponds. Based on the occurrence of a triggering event, a new layer can be revealed for the token. As illustrated, a policy 2201 can be associated with a base asset 2211 that, upon recognition of a triggering event A 2202 can apply a pointer A 2205 that reveals content asset 2210 Layer A 2212 which can corresponds to new content associated with the content asset 2210. Event A 2202 may be, for example, a location dependent reveal of the layer. Event B 2203 may be a related to a transaction such as a purchase and/or upgrade to NFT 2200 that can enable pointer B 2206 and reveals layer B 2213. Event C 2204 may be, for example, a time lapse event that enables pointer C 2207 and reveals layer C 2214. The events as described in this example are in order and may be implemented out of sequence and/or as defined in a policy 2201. The events may be reversible, for example, if a related purchase that reveals a layer (e.g., layer B 2213) is refunded or reversed. Although FIG. 22 illustrates a configuration of a particular NFT asset that includes several layers and a policy that can control the transparency of different layers, any of a variety of configurations can be utilized to control access to different layers of NFTs based on triggering events as appropriate to the requirements of specific applications in accordance with embodiments of the invention.

NFT evolution platforms in accordance with many embodiments of the invention can be used for NFT assets for animated characters that can be built using creative coding techniques (e.g., p5.js, unity, among other coding platforms). NFT evolution platforms in accordance with many embodiments of the invention can store NFT assets (e.g., animated characters, among others) in a stored layer format.

For example, an NFT evolution platform in accordance with certain embodiments of the invention can generate an NFT asset of animated character of a donkey, which is located on earth. As this NFT asset is traded, the donkey can get on a spaceship, and begin to travel through space by changing the background of the character. In certain embodiments, the more an NFT is traded, the further away the character can travel. A path of travel can depend on a variety of factors, including: being predetermined by an originator of the NFT asset. In certain embodiments, a path of travel may depend on observed actions, such as an identity of owners, a price of sale, an amount of bidding activity, changes (e.g., increases/decreases) in valuation, data from oracles, such as real world space travel events and/or winning sports teams in an effort to add a jersey to the donkey, among many other factors. Use of 3rd-party content incorporated into NFT assets, (e.g. a sports team jersey), is described in U.S. patent application Ser. No. 17/811,321 field Jul. 11, 2022, entitled "Systems and Methods for Token Management in Augmented and Virtual Environments", by Markus Jakobsson et al., which is herein incorporated by reference in its entirety.

NFT evolution platforms in accordance with many embodiments of the invention can provide tools to allow a user (e.g., buyer, seller, owner, NFT asset originator, among other type of users) to determine details regarding an expected evolution of an NFT asset. In certain embodiments of the NFT evolution platforms, certain aspects of an NFT asset may be protected from being accessed and may be stored in an encrypted area of the NFT. NFT evolution platforms in accordance with many embodiments of the invention can integrate relevant information in the NFT asset using a smart contract associated with the NFT asset accessing a service that can determine whether updates are available, and provide such updates to a device processing the NFT asset, when available.

NFT evolution platforms in accordance with many embodiments of the invention can generate NFT assets that include process files and/or asset control files associated with the NFT asset as part of the NFT in a blockchain and/or mediachain. Examples of NFTs that include process files as part of an NFT in a blockchain is described in U.S. patent application Ser. No. 17/810,085 filed Jun. 30, 2022 titled "Distributed Ledgers with Ledger Entries Containing Redactable Payloads", by Markus Jakobsson et al., which is herein incorporated by reference in its entirety.

NFT evolution platforms in accordance with many embodiments of the invention can use different storage mechanisms for different types of NFT assets. For example, if an NFT asset is an artwork that is a still visual piece, layer information, including evolving layer data, can be stored within a layered image file format (e.g., Adobe Photoshop, Illustrator File, among various other types of layered image file formats).

For example, if an NFT asset uses generative creative coding elements, the code that generated the NFT asset (e.g., artwork) may also be stored in a mediachain. NFT evolution platforms in accordance with many embodiments of the invention can use generative creative coding element that can be produced by different tools (e.g., produced by Deep Dream Generator™, p5js's Bouncy Bubbles demo, among various other tools).

NFT evolution platforms in accordance with many embodiments of the invention can use scripting processes for NFT assets, including NFT assets of audio files (e.g., The Pro Tools file, Abelton Live file, a creative code file including Chuck file, among others), that can be able to evolve the NFT asset content itself, such as by a triggering of a creative code program script to evolve the off-chain asset, as described in U.S. patent application Ser. No. 17/806,728 filed Jun. 13, 2022, titled "Systems and Methods for Encrypting and Controlling Access to Encrypted Data Based Upon Immutable Ledgers" by Markus Jakobsson et al., which is herein incorporated by reference in its entirety.

NFT evolution platforms in accordance with many embodiments of the invention can provide flexibility in that general rules can be set to evolve a set or collection of NFT assets and/or NFT assets can have a set of truly random and/or unpredictable behavior that evolves by data from a variety of sources, including one or more smart contracts. In many embodiments, rules can be part of a smart contract and/or stored in a storage element associated with an NFT, among various other techniques. A storage element may be encrypted to enable access by authorized processes, e.g., processes running in a trusted execution environment (TEE) with a particular minimum certification level, a digital rights management (DRM) environment with a required level of security, among various other environment. In many embodiments, a storage element may be placed on a blockchain. Portions of the storage element may be protected (e.g., encrypted). Portions may include control data indicating a type of data and what an NFT it is associated with. In many embodiments of the NFT evolution platforms, storage elements on a blockchain may be linked, with a more recent element referencing a prior element and adding data that augments the prior element. In several embodiments, storage elements may be stored in private databases that can be accessed by only certain users (e.g., a database managed by a user who originated NFT, among various other types of users including buyers, sellers, among others).

NFT evolution platforms in accordance with many embodiments of the invention can generate and/or utilize NFTs that evolve and can be combined with other NFTs in order to provide different functionality, including providing access control settings for transparency (e.g., public vs. private, hidden vs. revealed, among others) of a particular set of layers of an NFT based on policies associated with the NFTs. A process to detect qualifying events for NFT evaluations including the "unlocking" and/or revelation of previously hidden layers in accordance with an embodiment of the invention is illustrated in FIG. 23. The process can include minting 2301 an NFT (e.g., artwork) based on a user input from an author (e.g., artist) and the NFT can be subject to a transaction (e.g., a purchase) by a user 2302. The process can specify a particular set of layers of the NFT that can be visible 2303 and a different set of layers that can be hidden and exist within a user's wallet. The process can mint 2304 a second NFT of a particular type (e.g., music) authored by a user (e.g., minted by a same and/or different artist) and the NFT can be subject to a transaction 2305 (e.g., purchased 2305 by a user). The process can analyze policies associated with each NFT and can determine whether a triggering event has occurred. The process can determine 2307 that one or more NFTs are contained in a same wallet 2307 and provide an different enhanced 2308 functionality associated with the one or more NFTs, such as combining functionalities of a first NFT with functionalities of a second NFT, including combining content such as audio with video/images (e.g., enhanced artwork and music played simultaneously). In many embodiments, the process can determine the occurrence of a qualifying triggering event using smart contracts on a network (e.g., determining that two NFTs are licensed by a same user and/or with a same wallet address). The process can enable different functionalities, including revealing previously hidden layers and/or adding new layers to an NFT, based on a determination of one or more qualifying events.

NFT evolution platforms in accordance with many embodiments of the invention can provide NFT assets that include layers of different content that can evolve based on various types of data, including data regarding timestamps, location (e.g., GPS, among others) that can be used to influence the NFT asset. For example, an NFT that is being kept within a user's wallet on a device that is taken to a given physical and/or virtual location may be influenced by this location, whether temporarily or persistently. This change may, for example, involve the enablement of access to some aspects of the NFT asset (e.g., artwork), where these aspects are determined by the location. For example, a user traveling to the hometown of an artist, or the artist's show venue, with a device holding or being associated with the NFT may be able to access aspects of the NFT that were previously not accessible. Accordingly, an NFT evolution platform can use user data obtained from a user device to determine an evolution of an NFT, including determining access control settings to different layers of the NFT.

NFT evolution platforms in accordance with many embodiments of the invention can generate and/or use an NFT asset that may be associated with policies that determine types of changes that can be enabled, and under what conditions. NFT evolution platforms in accordance with many embodiments of the invention can enable users (e.g., artists) to create intricate games that can use the location of users associated with the NFT asset. Such changes may also be a function of actions of the user having access or ownership, and an inventory of what this user owns or has access rights to. Thus, an NFT may be associated with a functionality that depends on contextual information of the NFT and/or users, such as location, inventory, such as an NFT entrance ticket to a venue, and/or user action, such as an action in a gaming environment.

NFT evolution platforms in accordance with many embodiments of the invention can enhance NFT capabilities by digital wallet technologies as described. A digital wallet, in combination with features of a device, can be able to evolve, and/or trigger an evolution of an NFT asset.

NFT evolution platforms in accordance with many embodiments of the invention can use a user's device (e.g., smartphone) that includes a digital wallet with an NFT asset in its inventory, and also a standard location service (e.g., GPS system) available on the user device. A wallet application may have access to a variety of features existing on a user device and/or connected devices nearby the user device, such as a nearby Bluetooth™ beacon or augmented reality glasses. The on-board features that the digital wallet may access can include the GPS, microphones, cameras, among others. NFT evolution platforms in accordance with many embodiments can use a wallet application housing a licensed NFT that may be able to detect various types of information, including location, sounds, specific voices, specific individuals via biometrics, music, images, codes, such as QR-codes, among many others. NFT policies may allow evolution of the NFT based upon input from one or more different types of data from various different sources including sensors on a user device. For example when a user eats lunch at a specific restaurant and/or attends a specific venue as defined within an NFT policy, an NFT platform can associate this with a triggering event to evolve an NFT such as providing access to new content associated with the NFT. In certain embodiments, a digital wallet can be represented by a separate hardware unit, such as an auxiliary device that can be used to protect against malware and/or a secure execution environment within a device. In many embodiments, a secure execution environment can be created using a trusted execution environment (TEE) such as ARM Trust-Zone, and/or in combination with a digital rights management (DRM) unit running on the TEE. Wallet technology may also be included in device applications that are primarily non-wallet applications, such as social media applications that include wallet functionality. Wallet applications can also be social media applications that store and manage licensed NFT inventories that can access and/or store NFT assets.

NFT evolution platforms in accordance with many embodiments of the invention can generate and/or use NFT assets that incorporate functionality that enable evolution of functionality based on user contexts, including, for example, rights (e.g., ownership, licensee etc.) to other NFTs. For example, an artist may create a series of cat NFTs, where each such NFT is associated with one or more images, movies or visual models used for generation of representation of the associated cat. The artist may also encode rules specifying what NFT cats will enjoy each other's company, whether they can mate, and if so, what their associated characteristics are, where such characteristics are combined using a combination model when a new NFT cat is generated in response to two NFT cats being owned by the same user for a period of time and the NFT cats decide, per the token policies, to mate during this time. This determination can be governed by encoded personalities of the NFT cats, and by other environmental aspects. For example, some cat NFTs may only decide to reproduce if they are in a given geographic location, as determined by the GPS coordinates of a device used to carry or access the NFTs. This enables the artist to create an entirely new form of art. The form of art may include a genetic library, or DNA, for such a cat, in an effort to enable cat reproduction that mimics nature. This can be facilitated by an application running on a user device, such as a wallet used to store tokens, where this wallet could record or register conditions, policies, rules, state signals of relevance, and inventory data, and periodically perform actions. These actions may also be performed in response to a trigger signal, which may be the activation of a token by a user, or a signal sent from the originator of a token. When a triggering action is identified, an application such as a wallet may evaluate rules and policies associated with one or more NFTs and determine modifications to be made. Such modifications may be made to the NFTs and/or in the form of auxiliary data stored with the NFTs.

NFT evolution platforms in accordance with many embodiments of the invention can include auxiliary data that includes data stored in a wallet registry, such as the policies, state signals of relevance, and/or inventory data among others. State signals of relevance may relate to contents of policies, e.g., correspond to parts of these. Auxiliary data can be a derived NFT asset that references one or more NFT assets in a wallet. In some embodiments, derived NFT assets may reference external conditions, including outputs from oracles, and/or NFTs that are not stored in a wallet. When multiple users collaborate by linking their wallets to each other, for example, the NFT assets in these two or more linked wallets may take as inputs data related to the other NFT assets. Such information can then be registered in a wallet registry of each linked wallet, and be optionally associated with references indicating a location of an associated NFT corresponding to the registered information. When a wallet detects a change of an inventory, the registry of the wallet and associated linked wallets is can be updated to reflect the change.

NFT evolution platforms in accordance with many embodiments of the invention can allow users with the ability to create environments with a new type of species, governed by policies that may not necessarily be known to others users, but discoverable by the performing of actions, where such actions include, for example, purchasing other associated NFT elements, taking pre-determined actions, being exposed to predetermined environments, whether physical or virtual, among various other actions. NFT evolution platforms in accordance with many embodiments of the invention can mint NFTs that can evolve based on user actions, where an evolution of an NFT may be hidden until a particular action occurs, providing discoverable functionalities.

Accordingly, NFT evolution platforms in accordance with many embodiments of the invention can enable generation of entire new creative worlds. Associated NFTs may include and/or be associated with executable elements (e.g., scripts among others), that determine sets of available actions a user can take relative to NFTs, actions that the NFTs can take independent of user actions, and/or actions NFTs can take in the absence of pre-specified actions taken by a user. In certain embodiments of the NFT evolution platforms, the taking of actions may be performed by executable elements, which may be smart contracts and/or separate from smart contracts. For example, one artist may create a set of worlds including planets, solar systems and various life forms inhabiting these, and encode the physical laws and character types and behaviors as rules and policies. Some of these aspects may be locked and not provided access until a user with ownership and/or access satisfies some conditions encoded by the rules and policies, after which functionality and access may be changed.

NFT evolution platforms in accordance with many embodiments of the invention can mint and/or use NFTs that may be augmented and/or modified by being associated with a derivative NFT, where an original NFT provides a set of functionality, and the derivative NFT can augment these functionality. In certain embodiments, a derived NFT may have as inputs several (e.g., two) separate NFTs (e.g., a "mother" NFT and a "father" NFT). A derived NFT, which can be referred to as the "child" NFT, may refer to aspects of the mother NFT and father NFT. A child NFT may have properties (e.g., associated rights and/or functionality) that are not dependent on the mother NFT and/or the father NFT. Ownership can be a property, where a child NFT may be assigned to a different user than the mother and/or father NFTs. In many embodiments, properties such as functionality, similarly, may be independent. Some properties may depend on a context of the mother and/or father NFT. A child NFT may inherit some of its provenance characteristics from a mother NFT and father NFT. A child NFT can have more than two parents. A child NFT may, more generally, have one or more parents on which at least some of its properties depend and/or are derived. A child NFT may be produced by collaboration between multiple owners of NFTs, parties with access rights to NFTs, and more. In certain embodiments, the existence of a child NFT and/or some of its properties can depend on the ownership of the one or more parents being the same as for the child NFT.

NFT evolution platforms in accordance with many embodiments of the invention can provide linking processes that allow multiple users to collaborate by linking two or more NFTs. In certain embodiments, NFTs can be linked by an NFT evolution platform based on a condition that the NFTs enable such actions. In many embodiments, two or more users can link, using an NFT evolution platform, NFTs to each other by linking their wallets, whereby an NFT platform can cause the NFTs therein to be linked, to the extent that this may be allowed by the associated NFT policies. Two or more users can link selected directories and/or subdirectories including NFTs. When users link NFTs, they may specify a type of linking that is desired. Some NFTs may be selected to be co-owned, which may mean that either of the now-identified owners may perform transactions on the NFTs as they would for NFTs they have acquired. Some NFTs may share access rights. Some NFTs may be identified to enable interaction between the NFTs, such as for purposes of cat breeding, as described herein. NFTs may be linked to cause one NFT to provide an output that is taken as input for another NFT. Thus, linking of NFTs may be associated with directionality, which may be in one direction and/or in both directions.

Figures 24A, 24B:
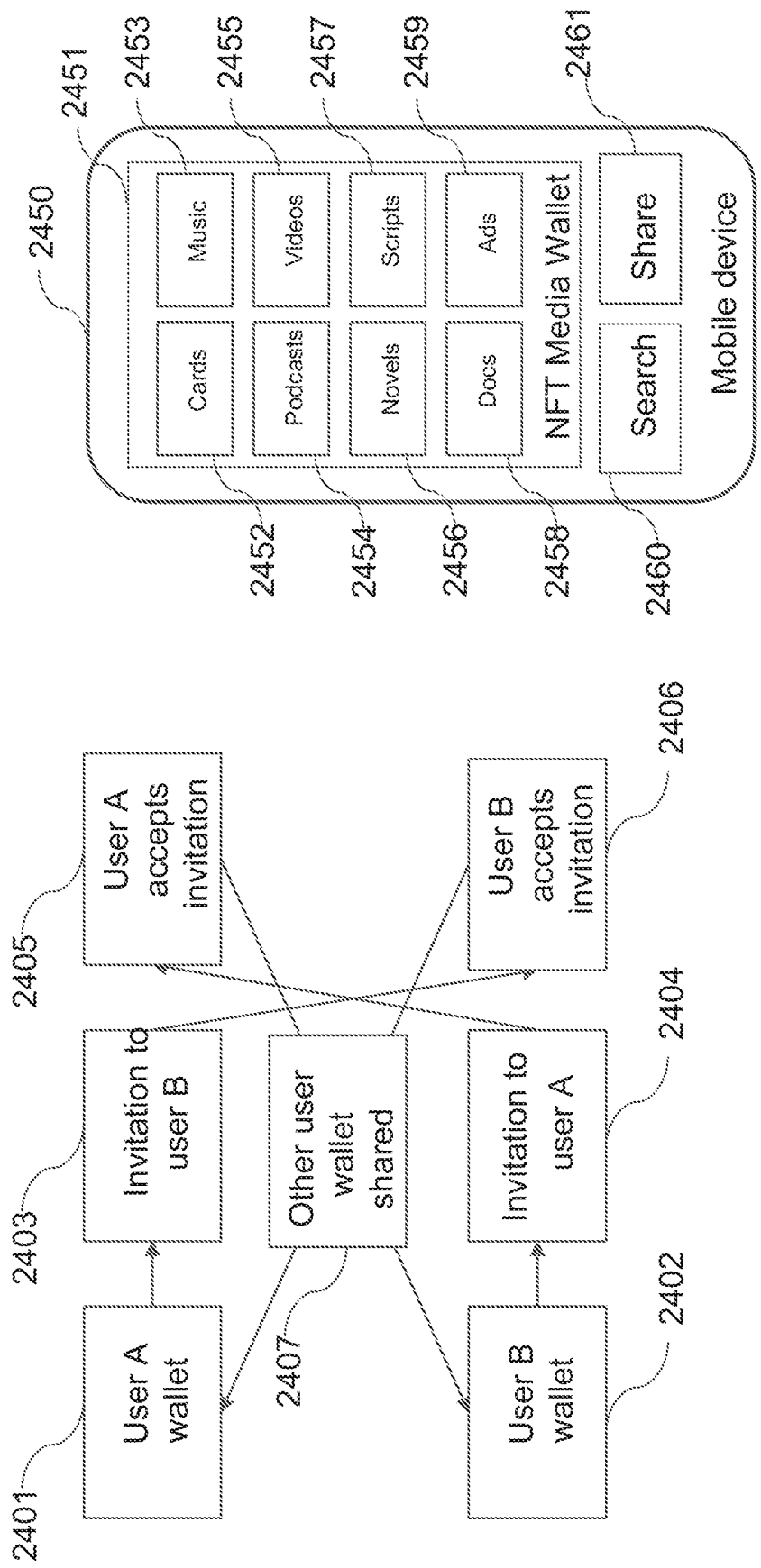
FIG. 24A illustrates a linking process for several digital wallets in accordance with an embodiment of the invention.
FIG. 24B illustrates a configuration of an NFT media wallet functionalities within a mobile application system in accordance with an embodiment of the invention.

NFT evolution platforms in accordance with many embodiments of the invention can provide functionalities to link different digital wallets of different user to provide various functionalities with respect to NFTs associated with the users. A linking process for linking several digital wallets in accordance with an embodiment of the invention is illustrated in FIG. 24A. A user A wallet 2401 and a user B wallet 2402 can exist and both users may wish to share and/or link their wallet contents with the other user. User A can issue, using an NFT evolution platform, an invitation to user B 2403 and user B issues an invitation to user A 2404. Assuming both user A and B accept the invitation to share their wallets, 2405 and 2406 respectively, the NFT evolution platform can link the two wallets, which can be shared 2407 and NFTs may interact across user wallets. NFT evolution platforms can provide different fine-grained sharing capabilities, including sharing particular NFTs, directories and/or subdirectories of wallets as appropriate to the requirements of specific applications in accordance with embodiments of the invention. Although FIG. 24*a* illustrates a process for linking several digital wallets for sharing NFTs, any of a variety of processes can be utilized as appropriate to the requirements of specific applications in accordance with embodiments of the invention.

NFT evolution platforms in accordance with many embodiments of the invention can be configured for many different application environments, including mobile devices. An example configuration of an NFT evolution platform for an NFT media wallet 2451 functionalities within a mobile application system in accordance with an embodiment of the invention is illustrated in FIG. 24*b*. An application running on a mobile device 2450 can include a media wallet 2451 housing references to NFTs presently associated (e.g., owned, licensed, rented for a time period, among others) to a user device. NFTs can include NFTs for cards 2452, music 2453, podcasts 2454, video 2455, novels 2456, scripts 2457, documents 2458, and/or advertisements 2459 among many other types of NFTs. To assist a user, an application can include a search capability 2460 and an ability to share and/or link information 2461 with other applications, users, family members, colleagues, and/or organizations. The sharing and/or linking may be of one or more NFTs in a wallet. Although FIG. 24*b* illustrates an example configuration of an NFT media wallet on a mobile application system, any of a variety of configurations can be utilized as appropriate to the requirements of specific applications in accordance with embodiments of the invention.

NFT evolution platforms in accordance with many embodiments of the invention can associate linking with policies selected by users performing the linking. For example, a user may specify conditional rights, for example, that ownership rights are shared (e.g., renting an NFT for a time period), except that the rights to sell an NFT is not granted unless it can be demonstrated that an actual NFT owner is no longer alive. In many embodiments, an NFT can be rented for a time period based on the sharing capability.

Figure 26:
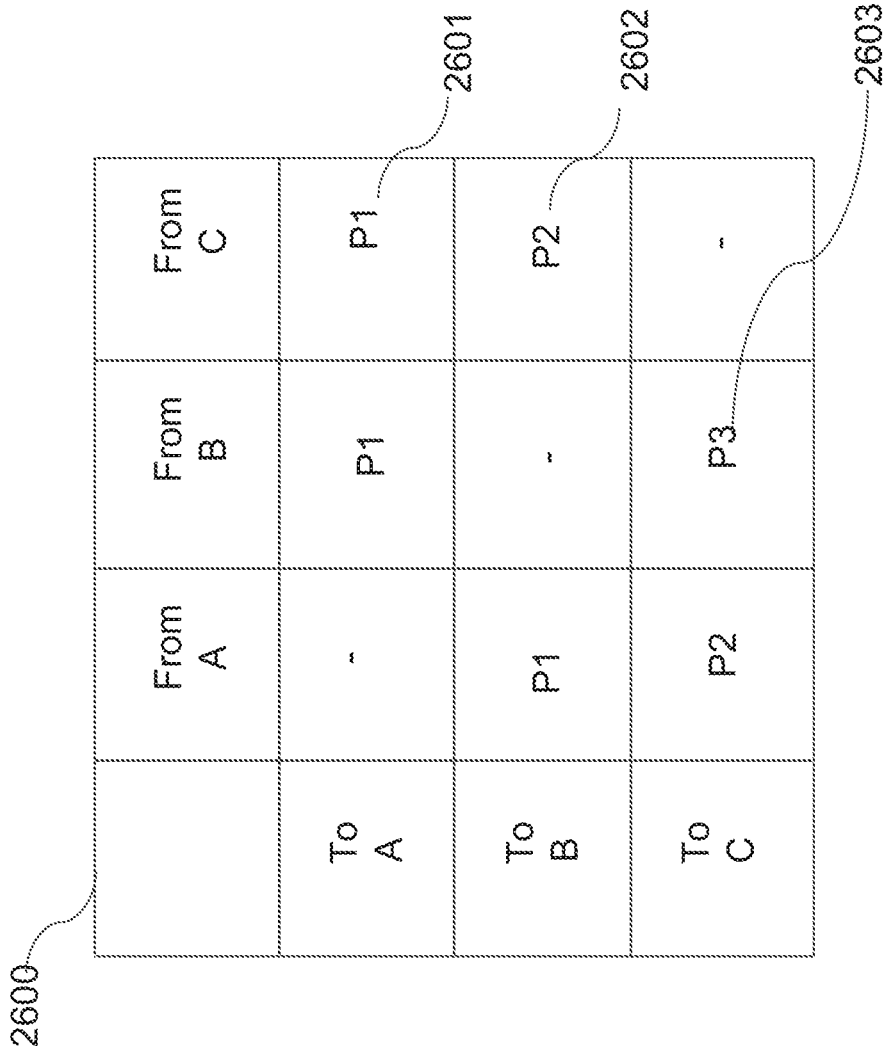
FIG. 26 illustrates a permission matrix that sets out policies for one or more NFTs in accordance with an embodiment of the invention.

NFT evolution platforms in accordance with many embodiments of the invention can utilize user provided policies associated with NFTs to control the evolution and functionality of the NFTs. NFT evolution platforms can use permission matrices to set out asset control policies. An example permission matrix that sets out policies for one or more NFTs in accordance with an embodiment of the invention is illustrated in FIG. 26. As illustrate in FIG. 26, Cell 2601 indicates that token C can provide data to token A according to policy P1, and cell 2602 indicates that token C can provide data to token B using policy P2, and cell 2603 that token B can provide data to token C according to policy P3. Here, P1 may correspond to a policy stating that the "from" entity may provide any of its output data to the "to" entity to operate on, but that the "to" entity or associated accounts may not make any modifications to the "from" entity. P2 may correspond to a right for the "to" party to make changes to the token of the "from" entity and its associated data. P3 may correspond to that the "to" entity is allowed to change the ownership status of an item owned by the entity indicated in the "from" column. Many other policies can be defined, such as P1, P2, and P3 can be used, as will be appreciated by a person of skill in the art, and these are simply illustrative examples. Although FIG. 26 illustrates a particular a permission matrix to specify policies for NFTs, any of a variety of configuration and different policies can be utilized as appropriate to the requirements of specific applications in accordance with embodiments of the invention.

NFT evolution platforms in accordance with many embodiments of the invention can associate a social network account with an NFT storage, where one or more NFTs are stored, and/or in which references to one or more NFTs are stored. From a social network account, a user with sufficient access privileges can perform actions related to NFTs. For example, Alice may be the owner of token A. Alice grants read access to token A to Bob, and associates the pair (Bob, token A) with a policy stating that Bob can read token information and render associated content on one out of up to three personal devices. Alice's ability to share the NFT in this manner may be restricted by the NFT policies set by the originator. Additionally, Alice might choose to enable all unrestricted NFTs in a wallet to be accessible publicly to further benefit her social profile. This access right can be rescinded by Alice at any time. Bob owns a token B and has full access rights, including the right to sell the token. Bob grants Alice conditional access to token B, and associate a policy with (Alice, token B) stating that Alice can use the token B content, where token B may be an NFT, in combination with any tokens that are owned by Alice, but that Alice only has that right as long as Bob has access rights to token A. Bob can access token A and token B from a social media account. A token, such as token A or token B, may utilize the communication path between connected users on the social network to convey information. Token A may initiate the transmission of a message to all of Alice's contacts, where the message may be a control message requesting whether any of Alice's contacts has a compatible token (such as Charlie's token C) that is marked as "visible" by its owner to their contacts within the social network. The message may also be a message that includes information to be displayed to one or more recipients, where the display of the information may be conditional on an evaluation that may take as input such a user's inventory list of owned and accessible tokens.

Figure 25:
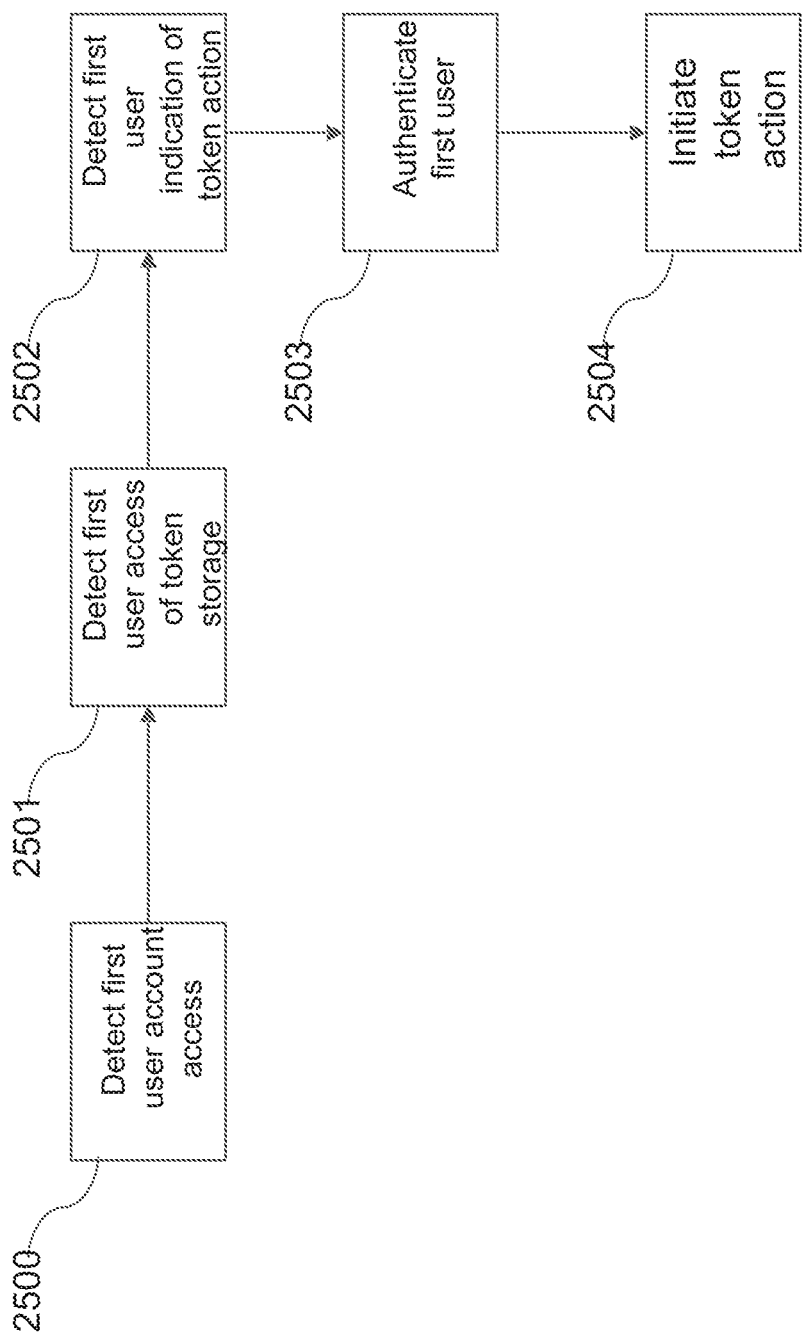
FIG. 25 illustrates a linking process using several social networking accounts with associated NFT storage capabilities in accordance with an embodiment of the invention.

NFT evolution platforms in accordance with many embodiments of the invention can link social networking accounts associated with NFTs. A linking process using several social networking accounts with associated NFT storage capabilities in accordance with an embodiment of the invention is illustrated in FIG. 25. The process can detect 2500 the access to a first user account, (e.g., a social media account). This may include a user accessing an app on a phone, where this app and/or phone is associated with the first user account. Such association may be made during an installation and configuration phase of the app, during which the user has to prove access to a user account associated with the first user, and where such proof may comprise entering credentials, answering security questions, and/or entering of a code received using SMS or from a second factor service such as SecurID. In many embodiments, access of a user account can be made using a browser that has been previously associated with a user account. The process can detect 2501 a user access to a token storage associated with the first user's account; this access may be performed using a social media application, a browser, and/or an equivalent access interface technology. The process can receive 2502 an indication from a user accessing an NFT storage associated with the first user account, of an action to be taken relative to one or more NFTs. Example actions include linking the one or more NFT tokens to another social media account, another wallet, and/or another user identifier.

An example user identifier can be an email address, a phone number and/or another unique identifier. The indication of the action may include information about the duration of the linking, the directionality of the linking and/or conditions associated with the linking. Actions related to NFT tokens can include lending out one or more NFT tokens, enabling access rights to one or more NFT tokens, requesting to borrow one or more NFT tokens, requesting to buy one or more NFT tokens, requesting to rent one or more NFT tokens, and/or transferring ownership of one or more NFT tokens to another user. The process can authenticate 2503 the first user cam. Different types of authentication can be performed for different types of actions.

For example, no authentication may be required if the action is a request to borrow one or more tokens, and/or if an authenticated user of the first user account has configured his settings to indicate that no authentication is needed, and/or no authentication is needed for the type of action that was requested. The process can perform different types of authentication, including for example, receiving and verifying a credential, such as a PIN or a password; verifying a biometric credential, such as using a fingerprint scanner, using face biometric technology, and/or other biometric techniques. In many embodiments, authentication may include several different types of verification (e.g., multi-factor authentication) e.g., both a PIN and a fingerprint, based on a configuration associated with the first user account. The process can initiate 2504 an NFT action. The action may involve one or more other users receiving a notification and performing a selection in response to the notification, and optionally, performing additional authentication. Although FIG. 25 illustrates a linking process any of a variety of linking processes can be utilized as appropriate to the requirements of specific applications in accordance with embodiments of the invention.

NFT evolution platforms in accordance with many embodiments of the invention can generate NFTs that can be owned by different users and can operate together using each other's outputs as inputs. For example, token A owned by Alice may be a virtual cat, and token B owned by Bob may be a virtual island owned by Bob. By linking token A and token B, Alice's cat can live on Bob's island, where it may get to mate with Charlie's cat, creating a litter that is co-owned by Alice, Bob and Charlie, or to which ownership is determined according to a policy, where such policy may take random values as inputs, and random values may be obtained from oracles, or the policy may take into consideration that Bob has seven dog NFTs in his collection.

NFT evolution platforms in accordance with many embodiments of the invention can generated NFTs that can interact with each other if the policies associated with them permit interaction. In many embodiments, tokens may for example belong to families of tokens, where such families of tokens may interact with each other. A family identifier can be encoded in a token, e.g., as part of a policy, and can be used to determine what other tokens are compatible. In many embodiments, a compatibility matrix can be provided whereby a token creator may explicitly state in the compatibility matrix, which can be a form of rule, NFTs that may be compatible, and the manner in which they can interact.

In many embodiments of the NFT evolution platforms, a complex structure of social tokens may exist, as described in U.S. patent application Ser. No. 17/808,264, filed Jun. 22, 2022, titled "Systems and Methods for Token Creation and Management", by Markus Jakobsson et al., which is herein incorporated by reference in its entirety.

In many embodiments of the NFT evolution platforms, different types of NFTs can be minted and/or used that may include identity tokens, biometric tokens, and/or membership tokens, among various other types of tokens. NFT evolution platforms can issue membership tokens for different groups, including on a social network to identify members of specific groups and/or organizations, whether virtual and/or real-world. For example, a university cohort from 1992 may elect to issue social network NFTs to only those members that can prove they earned a specific degree at that university in that year. Similarly, a social media user may elect to apply a social network NFT to a previous employment, such as one might list on a social network site that enables users to track employment history. NFT evolution platforms in accordance with many embodiments of the invention can issue tokens using an authority, depending on a level of control desired, whether by the authority or the individual. NFT evolution platforms in accordance with many embodiments of the invention can mint NFTs to represent a social network of an individual and/or group. Such a token may reflect a snapshot of a user's network, or reflect dynamically changing aspects of a network, who they follow, and who follows the user.

NFT evolution platforms in accordance with many embodiments of the invention can mint alias tokens that may be useful in a social network environment whereby a real individual makes use of an alias token tied to their identity token to assist the system in identifying real users from bots. Similarly, a desirable bot may itself have a token describing its identity to the social network, while undesirable bots would not. The social tokens may also be utilized for advertising purposes on the social network to assist the system in improving targeted advertisements. Related concepts are disclosed in U.S. Patent Application 63/235,682 titled "Transaction Reporting Infrastructure" by Markus Jakobsson which is herein incorporated by reference in its entirety. Additionally, social tokens may assist the system and advertisers in identifying true products sales influencers within a network. An individual's complete social token wallet, as described in U.S. patent application Ser. No. 17/808,264, filed Jun. 22, 2022, titled "Systems and Methods for Token Creation and Management", by Markus Jakobsson et al., which is herein incorporated by reference in its entirety, intended to be accessible and managed within the wallet or social media application. In many embodiments, tokens may have interaction with other tokens with either the same user and/or different users. For example, an interactive network of NFTs may be used by a social media service that constructs a user's family tree based upon identity NFTs, or a company or organizations employee tree based upon identity and employment NFTs.

In several embodiments of the NFT evolution platforms, different elements and/or layers of an NFT (e.g., artwork) can be generated and/or stored using AI to generate content (e.g., the art piece) as described U.S. patent application Ser. No. 17/810,085 filed Jun. 30, 2022, titled "Distributed Ledgers with Ledger Entries Containing Redactable Payloads" by Markus Jakobsson et al., which is herein incorporated by reference in its entirety. For example, a visual artwork can use a deep dream AI process to generate an image. Inputs to an AI process can be data from a smart contract that can help evolve the rendition of the AI generated artwork.

Figure 27:
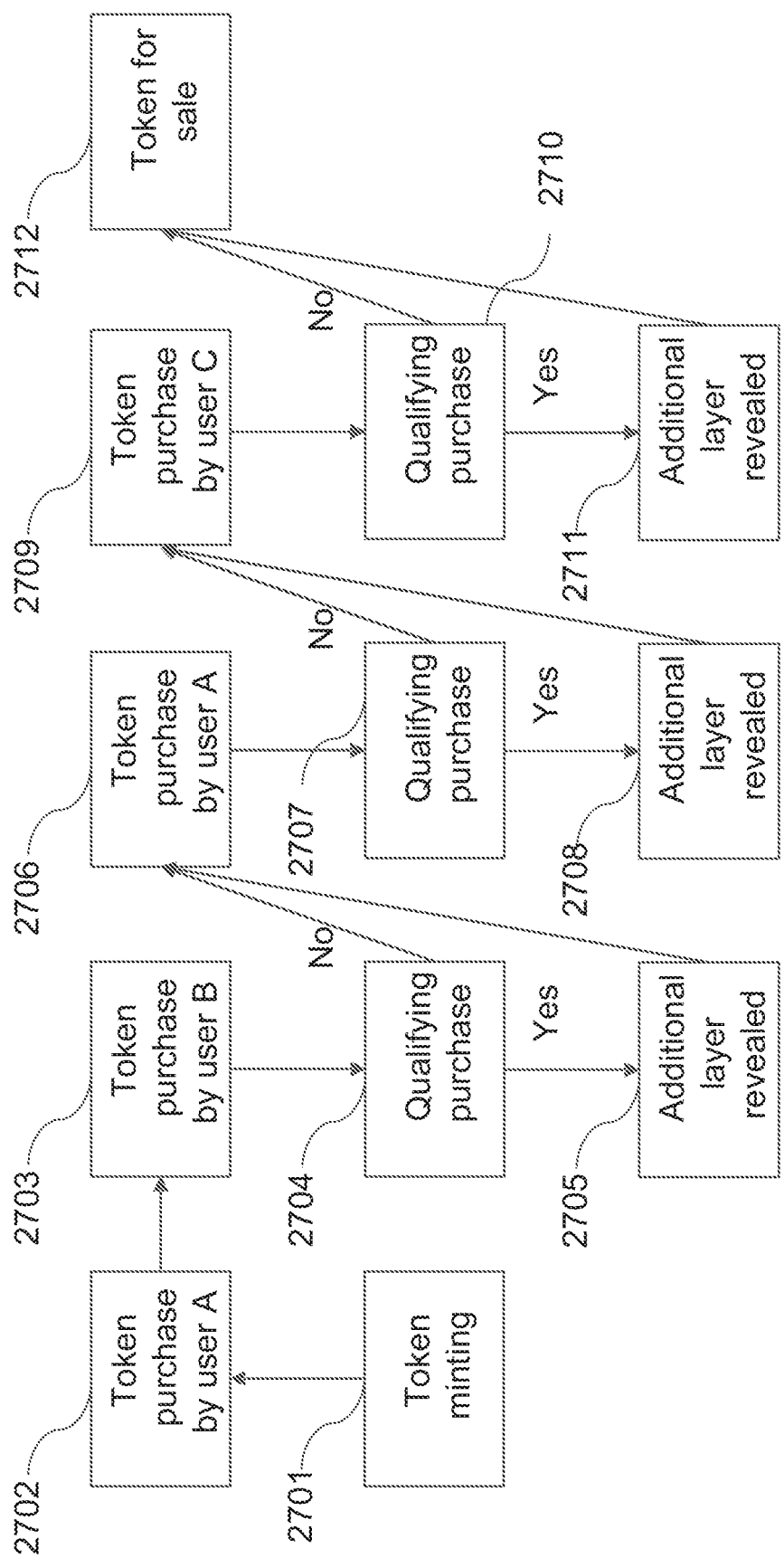
FIG. 27 illustrates a process for detecting events in accordance with an embodiment of the invention.

NFT evolution platforms in accordance with many embodiments of the invention can mint NFTs that can evolve based on triggering events. A process for detecting triggering events in accordance with an embodiment of the invention is illustrated in FIG. 27. In particular, FIG. 27 illustrates an NFT evolution platform that can monitor transactions related to an NFT (e.g., an ownership transfer transaction), an occurrence of which can be a qualifying triggering event. An author (e.g., artist) can mint, using an NFT evolution platform, an NFT token 2701 that can include several layers, with different layers having different content with associated transparency settings (e.g., certain layers can be revealed while other layers can be kept hidden till occurrence of a triggering event, certain layers can be public while other layers private, among other settings) based on one or more policies associated with the NFT (e.g., when a purchase and/or ownership transfer transaction qualifies).

In many embodiments, policies can be specified that can minimize trading abuses. In particular, a policy may restrict users from repeatedly trading an NFT in order to reveal its more valuable content. An NFT 2701 can be purchased by user A. The same NFT can be resold 2703 to user B. In many embodiments of the NFT evolution platforms, a smart contract can be used to determine transparency settings of the different layers of an NFT. In many embodiments, transactions related to an NFT can be monitored and triggering events can be triggered based on a detection of a transaction (e.g., sale to a new owner, license, rental, among others). NFT evolution platforms can include policies that restrict potential trading abuses, including, for example, requiring transactions to be between different users (e.g., potential trading abuse can occur when a user A sells to a user B and the user B again sells to user A in a circular manner). Accordingly, for example, the revealing of additional layers of an NFT can be determined based on whether a purchase meets a qualified purchase requirement 2704 (e.g., such as each new sale must be to a new owner). If yes, an additional layer of the NFT can be revealed in 2705. If no, the NFT can remain static and can be available for future transactions (e.g., purchase). As illustrated in the example of FIG. 27, since user B is a new owner, the decision in qualifying purchase 2704 would be yes, and the additional layer would be revealed in 2705. Subsequently, in this example, user A re-purchases the token in step 2706. This would be deemed a non-qualifying purchase in step 2707 and the additional layer would not be revealed in step 2708, rather, the token would remain static and available for purchase by user C in step 2709. This is again a qualifying purchase 2710 and an additional layer is revealed in step 2711. The token is again available for sale in step 2712. Although FIG. 27 illustrates a particular example of using transactions to reveal additional layers of an NFT, any of a variety of factors can be utilized as appropriate to the requirements of specific applications in accordance with embodiments of the invention.

Figure 28:
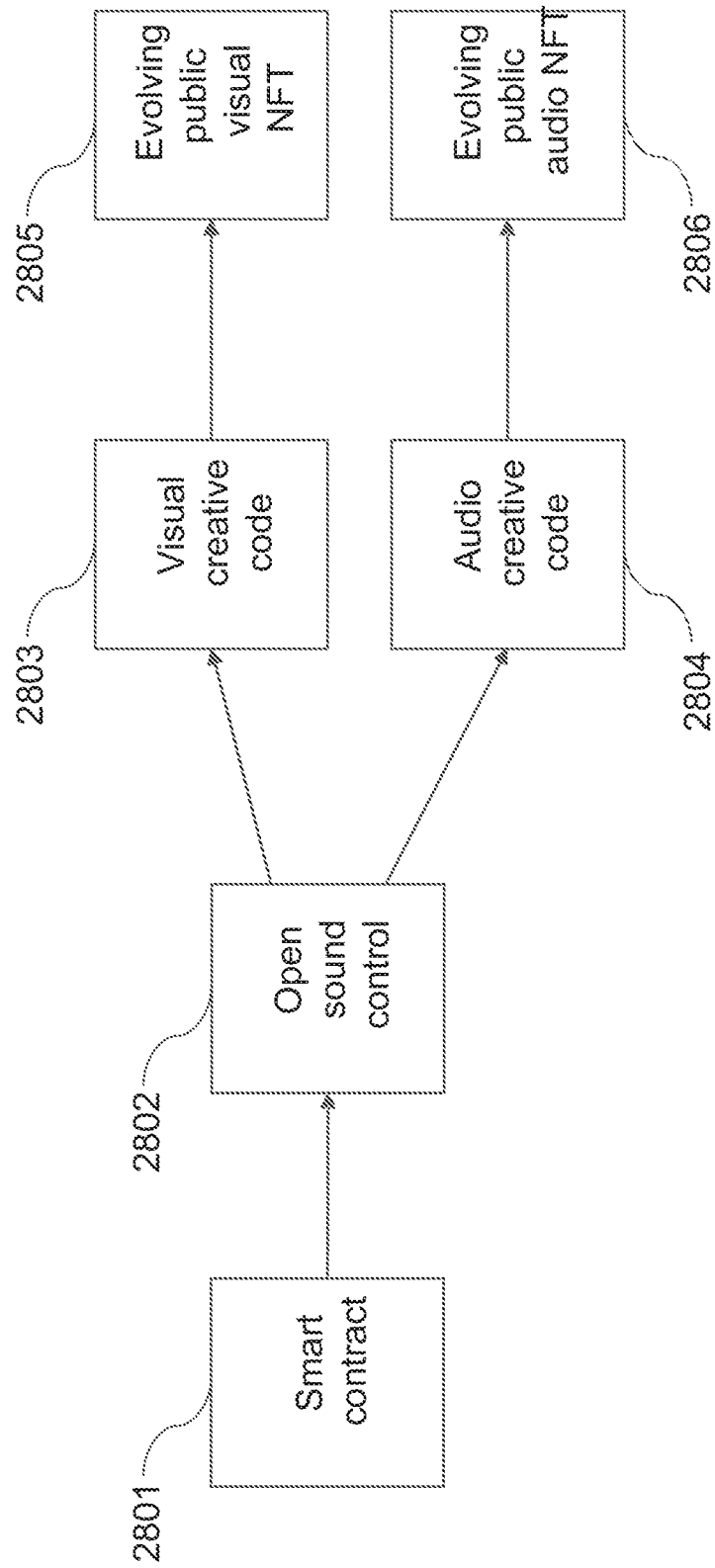
FIG. 28 illustrates a process for using a smart contract to enable NFT functionality in accordance with an embodiment of the invention.

NFT evolution platforms in accordance with many embodiments of the invention can use one or more smart contracts to determine NFT functionality. A process for using a smart contract by an NFT evolution platform to determine NFT functionality in accordance with an embodiment of the invention is illustrated in FIG. 28. As illustrated in FIG. 28, smart contract 2801 may reference and/or be associated with an NFT (e.g., a visual artwork). Aspects of the NFT can include different layers, each layer associated with a particular content (e.g., artwork can include open sound controls 2802, and visual and audio creative code 2803 and 2804, respectively). NFT evolution platforms in accordance with many embodiments of the invention can make publicly visible different aspects of NFT 2805 and NFT 2806 with publicly available audio may be played simultaneously based upon policies associated with the NFTs 2805 and 2806 (e.g., NFTs 2805 and 2806 be in a particular wallet, location, among numerous other factors as described herein). Although FIG. 28 illustrates a process that can use smart contracts to enable NFT functionality, any of a variety of process can be utilized as appropriate to the requirements of specific applications in accordance with embodiments of the invention.

Content Evolution Techniques

NFT evolution platforms in accordance with many embodiments of the invention can generate and/or utilize one or more scores including fitness scores for NFTs and/or scores to content associated with NFTs. NFT evolution platforms in accordance with many embodiments of the invention can determine scores based on various factors, including actions and/or transactions related to NFTs. Actions can include various types of measures, including number of renderings, number of end-user feedback items received, distribution of end-user feedback items received (e.g., a popularity rating based on user feedback), and/or popularity as determined by other sources of information including e.g., top-10 lists, among others. Transactions related to an NFT can include various types of transactions, including purchases, rentals, a number of bids leading up to a transfer of ownership, a value of the bids, a purchase cost, a number of lease requests, a value associated with lease requests, and/or a demographics of users making bids and/or lease requests, rental costs, rental time periods, among many other types of transactions. NFT evolution platforms in accordance with many embodiments of the invention can generate scores that may include a rating score and/or an accuracy score, where an accuracy score may be a variance associated with the inputs from which a rating can be determined.

NFT evolution platforms in accordance with many embodiments of the invention can associate one or more families to NFTs. NFT evolution platforms in accordance with many embodiments of the invention can allow a user to associate NFTs to a family based on being associated (e.g., owner) with the family, to an NFT content originator (e.g., author) being invited to associate content of the owner of the family, and/or being invited by one or more users who have been permitted to associate NFTs with a family. A user may also qualify to associate NFTs by having purchased an NFT that is part of the family, or being invited by a certain number of people (e.g., at least ten people) who have purchased NFTs of the family. An NFT may be associated with one or more families of NFTs. When an association is made, an NFT can be associated with a family and can be associated with one or more other NFTs of the family. When several NFTs are associated with each other, they can be combined with each other to create new and/or different NFTs.

NFT evolution platforms in accordance with many embodiments of the invention can combine several NFTs based on scores associated the NFTs. For example, token A and token B may be used to create a third token, token C, using a recombination process that can take aspects of tokens A and B based on the relative scores of token A and B. NFT evolution platforms can perform a recombination process based on various scores (e.g., fitness score). In many embodiments of the NFT evolution platforms, inputs to a recombination process can be parent NFTs, and a resulting NFT can be a child NFT. For example, NFT token A and token B can be parents to token C, which can be a child token. A token C may also be generated using inputs from several (e.g., three or more) NFT tokens using similar techniques.

Figure 29:
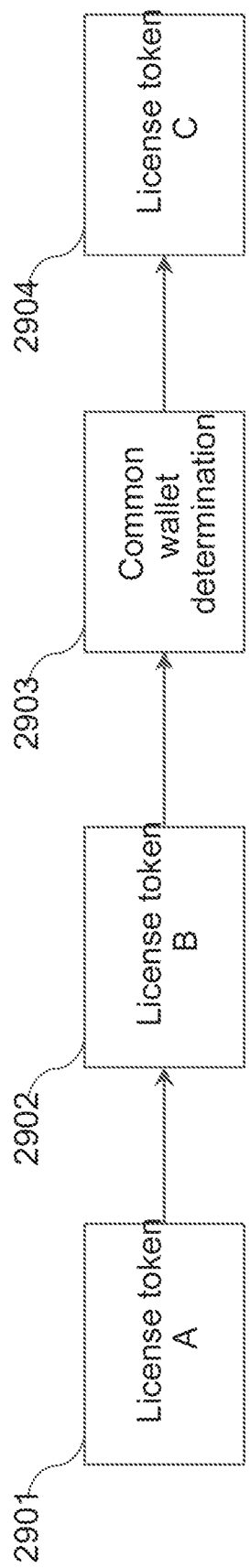
FIG. 29 illustrates an evolution of several tokens based on a combination of tokens in accordance with an embodiment of the invention.

NFT evolution platforms in accordance with several embodiments of the invention can generate and/or utilize NFTs that can evolve based on combinations of NFTs thru various types of activity, including transactions, sharing, among others. An evolution of several NFTs based on a combination of tokens in accordance with an embodiment of the invention is illustrated in FIG. 29. In particular, FIG. 29 illustrates an NFT evolution platforms in accordance with an embodiments of the invention that can evolve several (e.g., two) NFTs based on recombination. A user, having licensed (2901) token A, can acquire a license (2902) to token B, which can allow the user to license (2904) token C. In many embodiments of the NFT evolution platforms, a smart contract can be used and can execute with a token (e.g., token B) licensing 2902 and can identify that license token A 2901 and license token B 2902 are included in a same digital wallet and/or user address with a common wallet (2903), among various other circumstances as can be specified by the smart contract and/or one or more asset control policies associated with the various tokens. In many embodiments, based on a combination of several tokens (e.g., token A 2901 and token B 2902) an NFT evolution platform can trigger a license for a new NFT (e.g., token C 2904) by a smart-contract and automatically add the new NFT (e.g., token C 2904) to a user wallet. In many embodiments, an inventory can be maintained by the wallet as updated. In certain embodiments of the NFT evolution platforms, an alert to a user (e.g., artist, other fiduciaries, among others) may cause an automatic and/or manual application of a license (e.g., license token C 2904). Although FIG. 29 illustrates an evolution of several tokens based on a combination of tokens, any of a variety of processes for combining tokens can be utilized as appropriate to the requirements of specific applications in accordance with embodiments of the invention.

In many embodiments of the NFT evolution platform, a child NFT may be generated that may be a new NFT and/or may replace an existing NFT (e.g., a parent NFT). For example, a token C may be created as a new token, e.g., as a derived token, as described in U.S. patent application Ser. No. 17/808,264, filed Jun. 22, 2022, titled "Systems and Methods for Token Creation and Management", by Markus Jakobsson et al., which is herein incorporated by reference in its entirety.

NFT evolution platforms in accordance with many embodiments of the invention can generate an evolution that can appear between generations of NFTs, e.g., from the one or more generations corresponding to token A and B and the generation that corresponds to token C. A child token may replace one or more of parent tokens. For example, if token C replaces token A, it can be seen as an evolution of token A itself. In this context, token A may simply modify at least a component of the description of the content, and/or a reference to such content, and/or it may be created as a derived token that is derived from its previous incarnation, e.g., token A. NFT evolution platforms in accordance with many embodiments of the invention can include a description of content, and modified content, which can be included in a content container corresponding to an NFT. When content is being referenced, this reference may indicate another NFT (e.g., token B) and/or a storage container (e.g., a data item on a blockchain).

Figure 30:
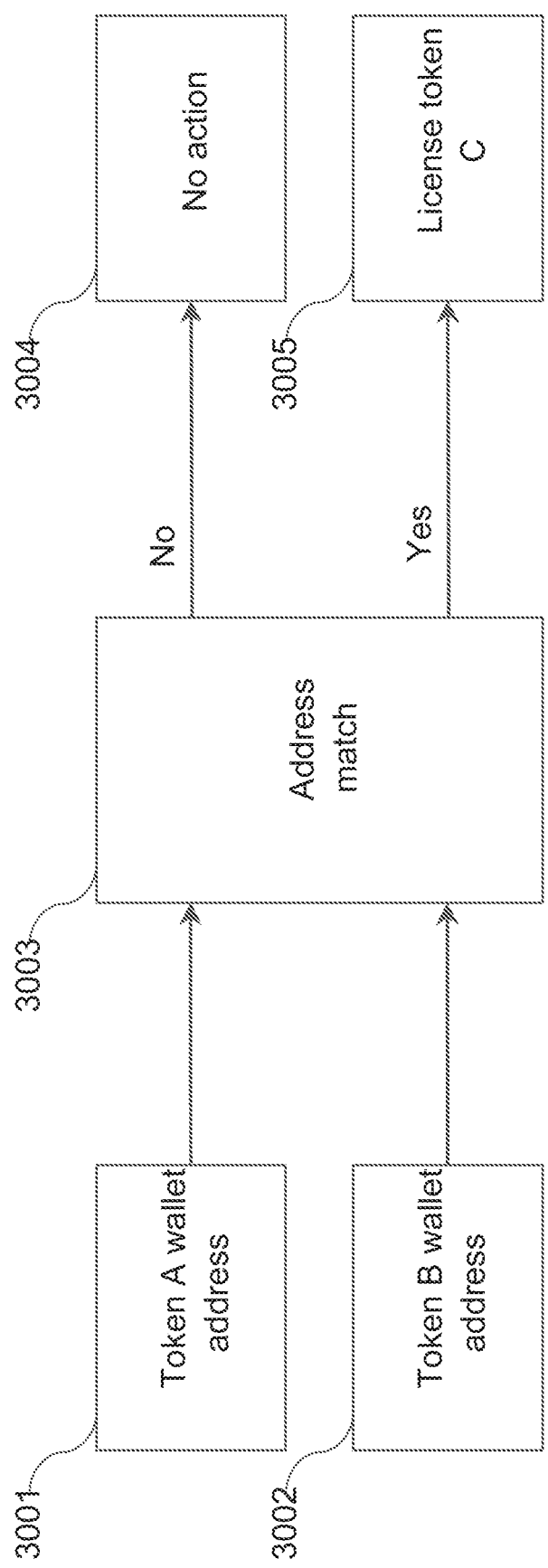
FIG. 30 illustrates a process for determining initiations of NFT evolutions in accordance with an embodiment of the invention.

NFT evolution platform in accordance with several embodiments of the invention can perform one or more processes to determine whether to initiate one or more evolutions of NFT tokens. A process for determining initiations of NFT evolutions in accordance with an embodiment of the invention is illustrated in FIG. 30. The process can analyze several NFTs (e.g., NFT A 3001 and NFT 3002) and determine (3003) whether there is an address match. In many embodiments, an address match can include performing a value comparison. In certain embodiments, an address match process can attempt to match wallet addresses (e.g., token A wallet address 3001 with token B wallet address 3002). In many embodiments, the process can be initiated based on various triggers, including transactions related to NFTs, stimulus such as a daily timer triggers, among others.

For example, to match wallet addresses, if a wallet address for a token A 3001 is 0xC5e615b39dE5E528458094d476fD6708c2793E4a and a wallet address for a token B 3002 is also 0xC5e615b39dE5E528458094d476fD6708c2793E4a then address match 3003 can initiate a licensing of new and/or adapted NFT (e.g., token C 3005) to a same user wallet. In many embodiments of the NFT platforms, if the addresses do not match, then no action can taken 3004. Although FIG. 30 illustrates a process for determining initiations of NFT evolutions based on address matches, any of a variety of processes using different types of identification data and considerations can be specified as appropriate to the requirements of specific applications in accordance with embodiments of the invention.

NFT evolution platforms in accordance with many embodiments of the invention can determine to combine several NFTs based on compatibility determinations. For example, if an NFT token A and NFT token B are drum solos, then a recombination of tokens A and B may still be represented as a drum solo, where recombination may include a selection of components of the two solos and a time-wise sequential concatenation of these. As another example, if NFT token A represents a plano riff and NFT token B is a drum solo, then a recombination may result in portions of the two parent tokens being overlaid on each other, time-wise. Similarly, a visual token such as an NFT including a photo may include a compatibility specification stating that it may not be combined with other visual content, but only audio content, even if contained in the same family.

Figure 31:
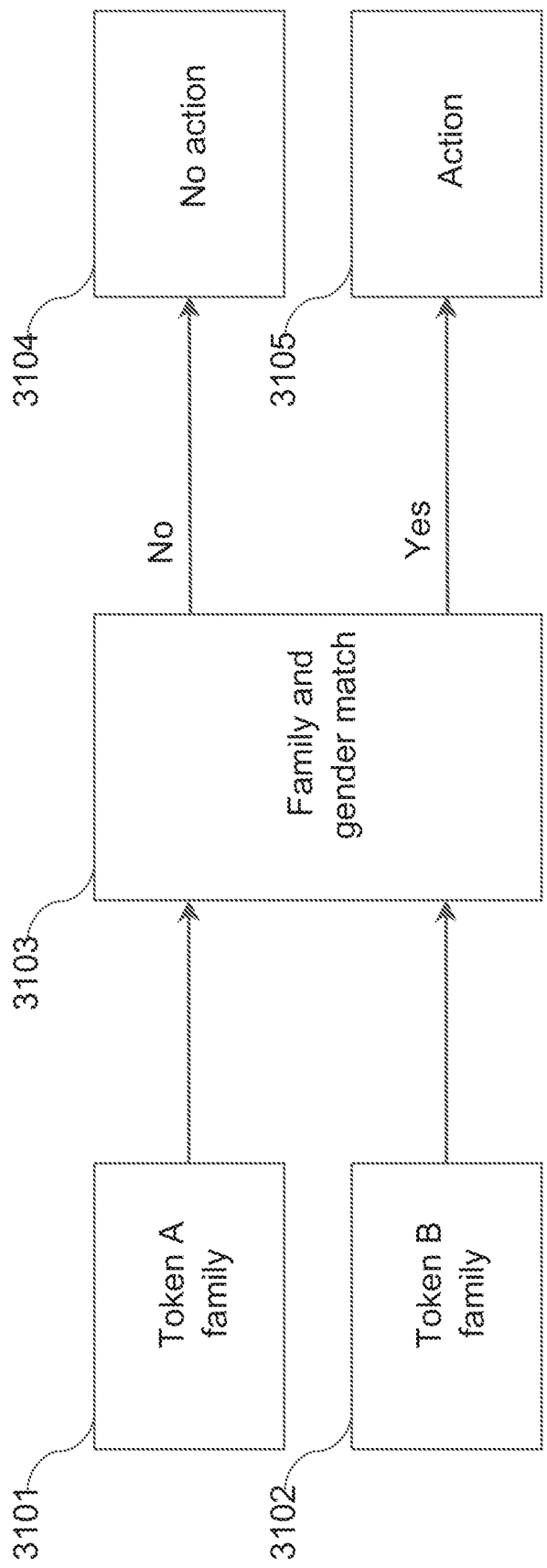
FIG. 31 illustrates a process for determining compatibility of several tokens in accordance with an embodiment of the invention.

NFT evolution platforms in accordance with many embodiments of the invention can combine NFT tokens based on a compatibility of the NFT tokens. A process for determining compatibility of several tokens in accordance with an embodiment of the invention is illustrated in FIG. 31. The process can receive several NFTs (e.g., NFT 3101 Token A family and NFT 3102 Token B family). The process can compare NFT metadata to determine if the several tokens are compatible. For example, of a same family, and/or species, such as two cat tokens being evaluated for token mating. In many embodiments, a family and gender match process 3103 can match the several tokens, including metadata associated with the NFTs (e.g., token A family metadata 3101 with token B family metadata 3102). The process can be triggered based on various triggers, including transactions associated with the NFTs (e.g., purchase, licensing, sharing, daily timer, among others). For example, if a family metadata for the several NFTs (e.g., token A 3101 is feline AND female and token B 3102 is feline AND male), the process can identify a match between the NFTs (e.g., the two feline characteristics) and a non-match in gender and triggers the action 3105, in this case a possible mating. If the family was a non-match and/or the genders were a match, no action 3104 would occur. Although FIG. 31 illustrates a particular process for determining compatibility of several NFTs using metadata including gender and family matching associated with the NFTs and comparisons of the metadata along a set of policies, any of a variety of types of data and policies can be specified as appropriate to the requirements of specific applications in accordance with embodiments of the invention.

NFT evolution platforms in accordance with many embodiments of the invention can include content elements associated with an NFT that may be associated with scores. Different scores can be computed based on different types of transactions and data. A score may indicate a purchase history, including prices. A score may indicate a number of bidders offering more than a particular amount (e.g., $1000) for the NFT. A score may indicate a number of times content has been leased, each lease representing a lease amount of at least a certain value (e.g., $0.10). A score may correspond to a number of likes received on a social media platform for the NFT. NFT evolution platforms in accordance with many embodiments of the invention can represent an NFT with an array of scores for different types of transactions and data, where several tokens can be processed according to the array of scores. Several arrays of scores can be processed to determine how the associated content elements can be combined to create child tokens, which may be a new NFT and/or may replace and/or update an existing NFT.

NFT evolution platforms in accordance with many embodiments of the invention can use recombine phases on tokens on a predetermined periodical basis, e.g., every month; in a randomized manner; and/or based on an occurrence triggering events. In many embodiments, a recombination between several tokens may depend on scores associated with the tokens, an alignment and/or non-alignment of array of scores, and/or on predicates generated from scores and compatibility determining data, which may be provided by token creators and/or which may be a function of a given token's current representation. In many embodiments, a recombination may ask that tokens that are inputs to a recombination be owned by one and the same entity, which encourages collection of items belonging to one and the same family of compatible token elements. In several embodiments, a likelihood of a recombination taking place may depend on whether parent tokens are owned by one and the same entity, and/or the frequency with which a determination is made of whether to perform recombination depends on the ownership.

NFT evolution platforms in accordance with many embodiments of the invention can modify NFTs by unlocking content, e.g., enabling access to content that was previously hidden, as described herein. In many embodiments of NFT evolution platforms, an unlocking-based type of evolution can be combined with a recombination-based evolution disclosed herein, e.g., an aspect and/or feature of content is unlocked and then used for purposes that include those of recombination. In certain embodiments, unlocking of content may be triggered by content having evolved to one out of potentially several states that can be pre-determined by a token originator, such as an artist, but which may not be known to a user, where one example user is a party that owns the corresponding token.

NFT evolution platforms in accordance with many embodiments of the invention can compare scores with thresholds to determine whether to start a phase of content evolution. For example, if a popularity score that is a value in the range from 0-100 exceeds 10 but not 20, then an evolution may be performed on a given day with a 10% probability, where the given day may be determined based on a secret schedule associated with the associated token, or which may be a periodic time such as on the 3rd Sunday of a month or every six weeks. If the popularity score exceeds 20 but not 30, an evolution may be performed with a 15% probability of such a day. If the popularity score of token A and token B both exceed 75, then these items may be used as parents for a recombination-based evolution with a 30% probability, provided both token A and token B are owned by a same entity. A token may be associated with one or more policies. Policies may be stored in an NFT token, and/or on an external location, (e.g., in a blockchain). Policies may be stored in plaintext and/or an encrypted format. Encrypted policies can be decrypted using decryption keys stored in and/or referenced by a token and/or an execution environment. Policies can be stored in plaintext, e.g., on a blockchain, and the relation between tokens using the policies and the stored policies may be protected and/or obfuscated, such that an observer may not be able to determine the policies that may apply to associated tokens (e.g., until the policy is triggered and the associated evolution takes place).

NFT evolution platforms in accordance with many embodiments of the invention may provide NFTs that include and/or reference executable code to determine the functionality and evolution of the NFTs. An evolution may also be facilitated by an execution environment, such as an app used to render token content, a wallet used to store tokens, and/or a digital rights management environment, which may execute using a secure processor, in a trusted execution environment (TEE) such as TrustZone, and/or on a platform that has been verified not to contain malware and undesirable applications. For example, an undesirable application can be one that is typically used for processing of pirated content. A family, as disclosed above, may also be associated with executable elements that can be referenced from tokens belonging to the family. Thus, a family can be both a property, e.g., membership, and a container including and/or referencing executable elements.

Figure 32:
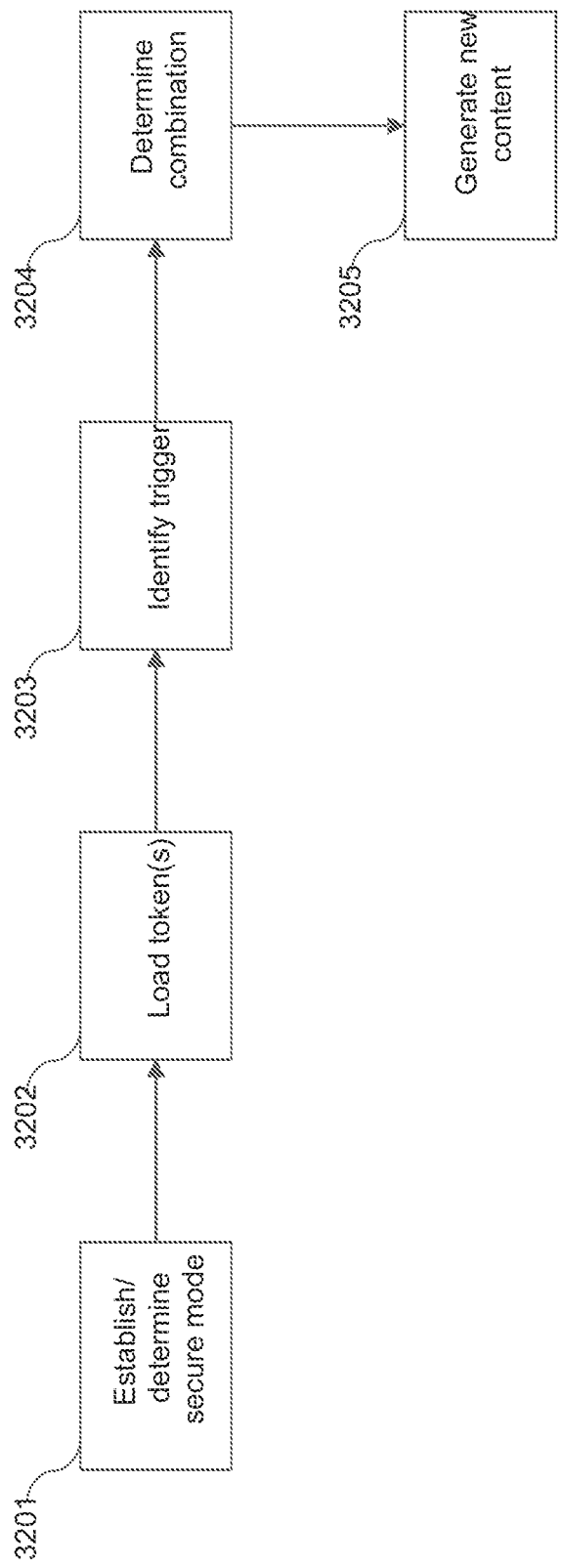
FIG. 32 illustrates a process for managing evolution of NFTs in secure environments in accordance with an embodiment of the invention.

NFT evolution platforms in accordance with many embodiments of the invention can include secure environments to manage evolution of NFTs. A process for managing evolution of NFTs in secure environments in accordance with an embodiment of the invention is illustrated in FIG. 32. The process (3200) can determine (3201) a secure mode. In many embodiments of the NFT evolution platforms, a secure mode can include booting a particular environment (e.g., TrustZone environment) and a selection of a digitally signed Digital Rights Management (DRM) module whose signature can be verified in order for execution of a module. In certain embodiments of the NFT evolution platforms, a secure mode can include execution of a remote software attestation that concludes with a positive assessment of the execution environment; a verification of a digital signature; a cryptographic hash function associated with a wallet application; and/or execution of an anti-virus software package, among various other types of environments. The process (3200) can load (3202) at least one NFT from memory to a verified execution environment. The process can identify (3203) a trigger for evolution. In many embodiments of the NFT evolution platforms, a trigger can be an external signal, a determination of a randomized process, and/or a value internal to a token, among various other types of triggers. The process 3200 can determine (3204) a combination based on content data from NFTs. In many embodiments, a combination may be influenced by trigger values. The process (3200) can generate (3205) new content that can be incorporated into at least one NFT, be made part of a derived NFT generated from the NFTs loaded in step 3202, and/or incorporated into a newly minted NFT. Although FIG. 32 illustrates a particular process for managing evolution of NFTs in secure environments, any of a variety of processes can be utilized as appropriate to the requirements of specific applications in accordance with embodiments of the invention.

An example, User A is a painter that creates visual scores as sheet music and has a musical piece represented in Visual form as Token A. User B is a violin player and User C is a cello player. Both User B and User C use User A's visual score to create a musical piece that creates a new Token ABC that is proportionally owned by User A, User B and User C. Another example is User D writes a script for a 1 minute story which is Tokenized as Token D. User E has built a series of NFT images that are represented as Token E. User F has built a song that is tokenized as Token F. User G, now buys and/or licenses Token D, E and F to create a new piece of work that is recombined and represented as Token G.

Another example is a piece of music that has tokenized and has evolutionary capabilities that is used inside a video game. As a user plays the video game, they can be able to earn a higher score as they move throughout the levels. Evolutionary elements of an asset may be controlled by a protocol, such as when a song changes as the player's score increases. For example, the background song can increase in tempo the higher the score gets.

NFT evolution platforms in accordance with many embodiments of the invention can generate NFT tokens that can use recombination on presentation aspects. For example, in the context of music, that might be the timbre, the choice of instruments, and/or the frequency shift patterns applied to vocals. For visual arts, it may correspond to the color scale and/or the type of brush strokes used. Thus, a recombination of two or more items may not create recombination in the form of the structure only, but also its presentation. Similarly, a text associated with a first token can be modified in the style associated with a second token. For example, token A may correspond to a recipe for pancakes, and token B may correspond to the book "One Hundred Years of Solitude" by author Gabriel Garcia Marquez; from this, the recipe for pancakes of token A may be expressed in the writing style exhibited in "One Hundred Years of Solitude", and embodied in token C. This can be done using Natural Language Processing (NLP) technologies that extract a sentence structure model from a text, such as that of token B, and apply them to a target text, such as the pancake recipe of token A, or a textbook on the topic of woodworking techniques from the renaissance period. There are many possible texts resulting from this application, and the selection of which one is generated may depend on an input that may either be a random string and/or which can be selected to reference one or more of the input tokens or parts of their content, one or more of the scores associated with these tokens, or an external value such as the closing value of the Dow Jones the day before the evolution in which token C is created. In several embodiments, content associated with a token can evolve for each use.

For example, a pancake recipe associated with token A may evolve each time it is accessed. It can also evolve based on an input provided from a sensor, such as a sensor that determines whether a person achieved a pre-set heart rate or the temperature in a given location exceeded 90 F within a given 24*h* period. A tattooable image may evolve from a butterfly to a butterfly hovering over a flower based upon the next vernal equinox date, or a financial tattoo artist transaction to indicate the completion of a butterfly on a client. A movie may evolve to offer an alternative ending, or director's cut, if and when the movie achieves a top 100 or top 10 popularity ranking as measured and provided by an oracle—an off-chain trusted resource for off-chain information.

NFT evolution platforms in accordance with many embodiments of the invention can use several tokens as inputs to a combination that results in a new token, where this new token may supplement and/or replace tokens that were part of an input to the calculation. For example, one input token may correspond to a first game character in a first game, and a second input token can correspond to a second game character in the same first game. The second game character is a bad actor, and would attempt to score points over a first character in the game. The second token also has that property, and when the wallet determines that the two tokens are in the same wallet, the second token causes the first token to cease to exist. For example, a user who buys a token representing a human and a token that represents a zombie-infected human may, as the second token becomes a zombie, lose the first token or have it also become zombie-infected, as a result of being stored in the same wallet. This moves the boundary of the game out into the wallet. Similarly, the token owned by Alice may affect a token owned by Bob if Alice and Bob engage in an exchange that permits such token interaction. For example, if Alice lends a token to Bob, Bob's tokens may affect the lent token and cause it to change and remain changed after it is returned to Alice. Another example type of interaction between Alice and Bob may be participation in the same game environment. If Alice's token has been associated with an infected state, that may also be applied to Bob's token if Alice and Bob interact in the game, both using game elements corresponding to the two tokens.

A second token may further modify its own representation, e.g., to indicate that it won over a character of the first token. A token can also correspond to a disease, where one or more other tokens may be associated with the same disease in response to being stored in a same wallet, being rendered in the same application, and/or by having the same owner. This can blur the line between the game, where different characters can influence (e.g., score points, wins/losses, etc.) against each other, and the wallet, where the properties of the tokens can be perpetrated, e.g., by one token scoring points, winning etc., over another token. Positive influences, similarly, can be affected, e.g., by the second token causing the first token to acquire a skill and/or capability. The influences can be performed across games having compatible NFT tokens.

Non-Fungible Token Peeling

Existing NFTs can be created and may remain in existence. However, structures enabling destruction and modification can be valuable to support the building of functionality that may require change, disclosure, and/or destruction. For example, a structure that may benefit from such one-way actions is a scratch-off lottery ticket. In the real world, a person with control over such a ticket can decide to scratch the ticket to determine whether she has won, and if so, what was won. However, the person with control over the ticket can also transfer the ticket to another user, who then can determine whether to scratch or not. Once a ticket is scratched, though, it must not be possible to "unscratch" it, or that would make the change of ownership of tickets that did not win meaningless, as new owners would know that the ticket has no value, or it would have been redeemed instead of being transferred. In other words, once a ticket has been scratched, it has a known value.

NFT evolution platforms in accordance with many embodiments of the invention provide for functionality for changing an NFT, including destruction of NFTs. Many different types of functionalities can benefit from destruction and/or modification of NFTs, as described in detail here.

NFT evolution platforms in accordance with many embodiments of the invention provide creations of tools that can allow conditional destruction and/or modification of NFTs to enable the generation of various other structures that can be of artistic, financial and/or societal value.

NFT evolution platforms in accordance with many embodiments of the invention can perform user-triggered content action related to NFTs, where the action can be a one-way action that modifies a perception of an NFT, such as an NFT's contents. In many embodiments, a modification can change various accessibilities related to different aspects of NFTs, including what is displayed, how the NFT functions, among many other characteristics, which can be referred to as "peeling" as it can change an apparent content of an NFT from a first apparent content to a second apparent content.

NFT evolution platforms in accordance with many embodiments of the invention can generate peelable NFTs, which can be peeled to reveal new content and/or and eliminate existing content. NFT evolution platforms in accordance with many embodiments of the invention can peel NFTs to reveal different sets of layers of the NFT, as described.

Figure 33:
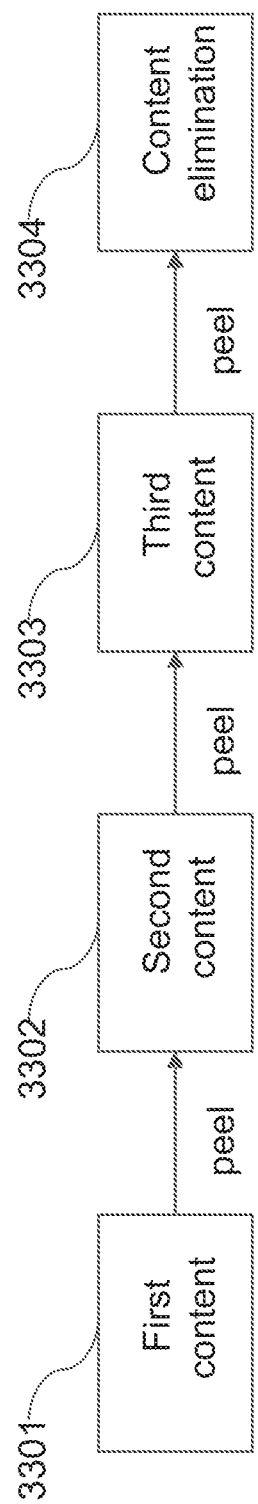
FIG. 33 illustrates a sequence of content representations, where one representation replaces another as a qualified user performs a peeling action in accordance with an embodiment of the invention.

An example sequence of content representations, where one representation replaces another as a qualified user performs a peeling action in accordance with an embodiment of the invention is illustrated in FIG. 33. First content 3301 can be a content (video, audio, rich media, a behavioral badge earned by user performing an action on a website, among many different types of content). The NFT evolution platform can detect a first user triggering a peeling action on first content 3301, whereby the platform can replace first content 3301 with second content 3302. First user can then engage in a transaction (e.g., sell second content 3302 to another user by placing a representation of second content 3302 in a marketplace), after which second content 3302 is sold to second user and transferred to the second user's wallet. Second user sells second content 3302 to third user. Third user performs peeling of second content 3302, resulting in third content 3303. Third user then performs peeling of third content 3303, destroying third content 3303 without creating a replacement, a situation represented by content elimination 3304. First content 3301, second content 3302 and third content 3303 may correspond to one and the same NFT, whose content representations are modified as a result of the peeling. In certain embodiments, NFT can be a series of associated NFTs, where one such an NFT replaces its predecessor as the predecessor is destroyed. In several embodiments, a content may spawn one or more secondary and/or tertiary content (e.g., when one NFT peels into two or more NFTs). Although FIG. 33 illustrates a particular process of peeling an NFT based on different triggering events, any of a variety of factors can be utilized to peel NFTs as appropriate to the requirements of specific applications in accordance with embodiments of the invention.

Figure 34:
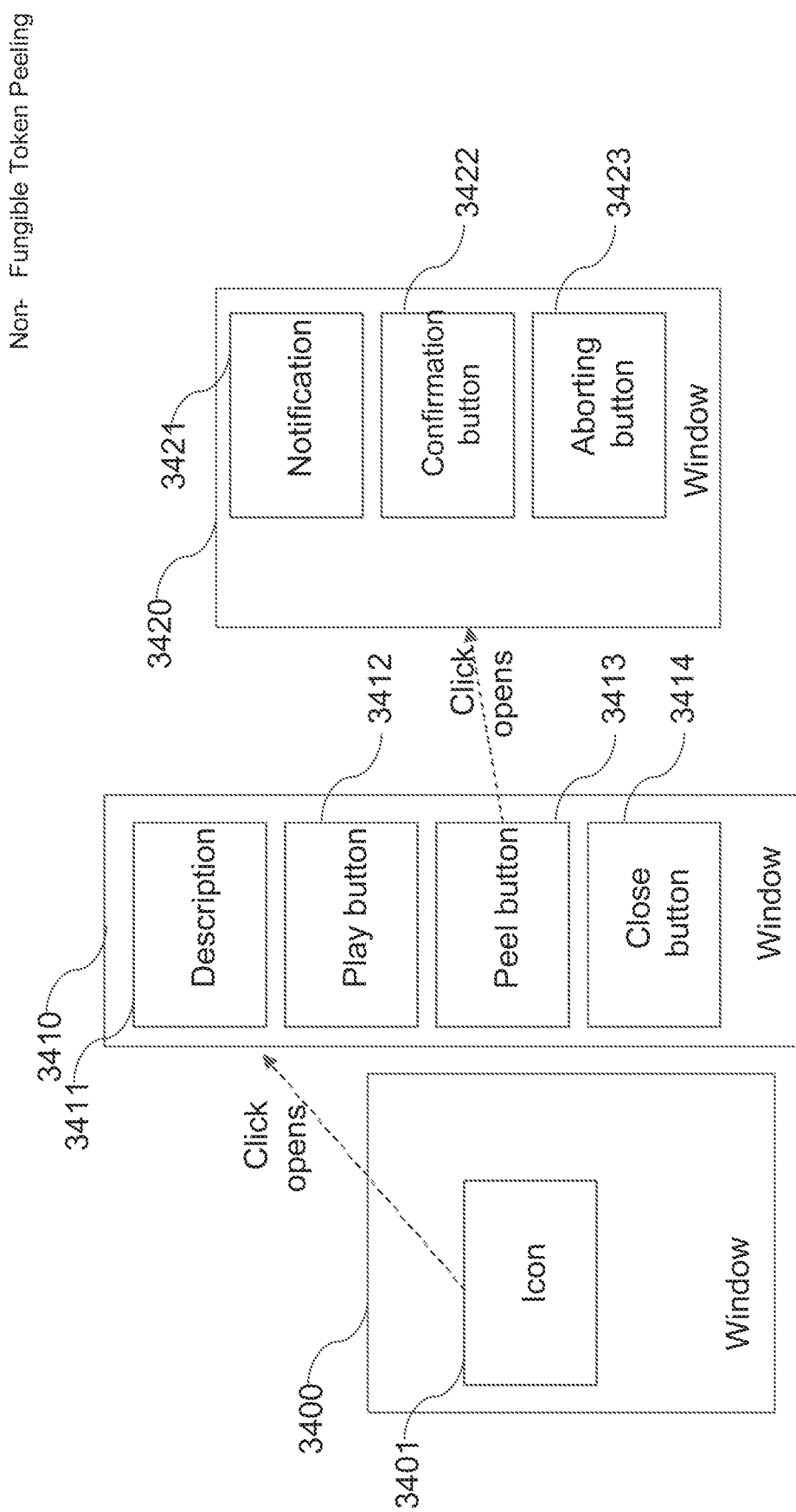
FIG. 34 illustrates a graphical user interface (GUI) used to initiate peeling of NFTs in accordance with an embodiment of the invention.

NFT evolution platforms in accordance with many embodiments of the invention can provide various user interfaces for interacting with NFTs. An example graphical user interface (GUI) used to initiate peeling of NFTs in accordance with an embodiment of the invention is illustrated in FIG. 34. Window 3400 can be used to display contents of a wallet of a first user. Window 3400 can include icon 3401, which can represent an NFT. A user click on icon 3401 can open window 3410. Window 3410 can include a description 3411 of an NFT associated with icon 3401, a play button 3412 that renders or otherwise uses the content of the NFT associated with icon 3401, and a peel button 3413 to initiate peeling. A user click on closing button 3414 can close window 3410. A user click on peel button 3413 can render window 3420, providing a user with a notification 3421 and options to proceed with peeling and/or aborting peeling, represented by confirmation button 3422 and aborting button 3423. If first user clicks confirmation button 3422, the peeling can be initiated. If the NFT associated with icon 3401, cannot be peeled, it may be destroyed as a result of the peeling request associated with first user clicking confirmation button 3422, or first user may be notified that peeling is not possible. If the NFT associated with icon 3401 can be peeled, the content associated with icon 3401 can be updated, and optionally, icon 3401 can be updated. Representations of content may be associated with NFTs and/or containers of digital content.

In many embodiments of the NFT evolution platforms, a peeling may be non-reversible. In particular, a token can be peeled a first time to modify its apparent functionality from a first functionality to a second functionality, and optionally, an additional time from a second functionality to a third functionality. Some tokens may be associated with a pre-specified number of times they can be peeled, whereas others are not. For some tokens, a user may be able to determine, without peeling a token, how many times the token can be peeled, if any, whereas for other tokens, this may not be possible to determine without initiating an action that corresponds to peeling.

In several embodiments of the NFT evolution platforms, initiating a peeling action to an NFT that cannot be peeled may cause irreparable damage to it, e.g., the destruction of the NFT, which can be expressed as a modification of one or more values indicating the validity of the NFT.

In several embodiments of the NFT evolution platform, an NFT that can be peeled can be associated with an indicator regarding the peelable characteristics of the NFT (e.g., in the form of a visual indication, sound, among many other types of user indicators). For example, a user may be able to click on an NFT to obtain information about it, such as the provenance of it. This may be displayed as a pop-up window with elements such as icons and text, where some elements can be interacted with by the user, e.g., clicked on. One such element may indicate that the NFT can be peeled. Interacting with this element, e.g., clicking on it, may cause a confirmation request to be rendered, where the user can accept or deny, and where if the user accepts, e.g., by clicking on an "Yes, please peel" button, then peeling is initiated.

NFT evolution platforms in accordance with many embodiments of the invention can provide a wallet used to store an NFT with a built-in shredder, which can be a functionality by which a user can irrevocably destroy an NFT, e.g., by dropping the NFT in a visual representation of the shredder. If a peelable NFT is dropped into the shredder, this may cause the peel to be torn off and the resulting "inside" content remain in the wallet, whereas if an NFT that cannot be peeled is dropped in the shredder, then it may be irreversibly destroyed. If the shredder has a confirmation step in which the user has to confirm wishing to shred the NFT, then the peeling may be initiated first after the user has agreed to the shredding, thereby risking the NFT if it is not a peelable NFT.

NFT evolution platforms in accordance with several embodiments of the invention may represent a peelable NFT as a purchase coupon, such as a traditional one-time use coupon recognized by a grocery store. A common problem with traditional coupons is that the reuse of the coupon is possible, such as by the grocery store clerk for the next customer. NFT evolution platforms in accordance with many embodiments of the invention provide may generate NFTs providing a single- or multiple-use right for a discounted purchase, for example, in the form of a peelable NFT. A single-use peelable NFT can be destroyed after use by actions, for example, performed by the user's wallet function.

NFT evolution platforms in accordance with many embodiments of the invention provide include at least one application that can process a peeling request, including applications executing on a wallet, running on a client side, server side, among many other configurations as appropriate to the requirements of specific applications in accordance with embodiments of the invention.

In many embodiments of the NFT evolution platforms, processing can include determining whether an NFT can be peeled, and if so, to perform the peeling. Some or all of this processing can be performed external to the client device, e.g., by a trusted service provider and/or by an entity that is designated by a content creator associated with the creation of the NFT to be peeled. A determination of whether an item may be peeled may require first that a user commits the NFT to the peeling in a way that is irrevocable. One example of such an irrevocable commitment is for the ownership information associated with an NFT to be modified to no longer accept the user as the owner, but instead, the process performing the peeling, whether this is an agent running on the client side, in a central location, with the content creator, and/or a distributed processing that may be performed by multiple entities that together can be trusted. These multiple entities may, for example, determine actions using consensus mechanisms.

NFT evolution platforms in accordance with many embodiments of the invention can include irrevocable commitments of NFTs that can transmit data that modifies the access capabilities to the NFTs, e.g., requiring the involvement of a party associated with a public key specified in the NFT to perform an action, such as generating a digital signature or decrypting a ciphertext, in order to regain access to the NFT. Processing associated with peeling itself may be performed using various techniques, including modifying a content that is being referenced by a link in the NFT. This link may be a URL, and the modification of the referencing may be performed by changing an IP address the domain resolves to, where a first domain results in one content being conveyed to the user and a different second domain results in a different content being conveyed. Certain embodiments can change referencing by modifying data that is stored at a location indicated by a URL, e.g., by replacing a file being indicated from being a first file to being a second different file. NFT evolution platforms in accordance with many embodiments of the invention can modify content that is conveyed to a user by replacing an NFT with a newly minted NFT that includes after-peel content.

NFT evolution platforms in accordance with many embodiments of the invention can augment an original NFT by indicating, in a database such as a certificate revocation list (CRL) that it is not valid anymore, and can generate a derived NFT token that can refer to the original NFT token and which is not made invalid. A derived token can make reference to an original token, and can inherit properties of the original token (e.g., ownership, etc.), while at a same time augmenting content of the original token by providing additional content including in and/or referenced by the derived token.

NFT evolution platforms in accordance with many embodiments of the invention can mint an original NFT that can carry multiple content representation from the time the original NFT was minted, and one or more of these content representations can be enabled during a peeling process. In many embodiments, content representations of an NFT may be ordered so that if several representations are enabled, one representation can be enabled based on various factors (e.g., only the representation with a highest counter can be rendered, as controlled by the display software, which may be governed by Digital Rights Management (DRM) modules run in Trusted Execution Environments (TEEs)).

In many embodiments, NFTs may be destroyed when peeled. In particular, a first NFT may be destroyed when peeled, and the owner of the destroyed NFT can be given a replacement NFT, which can be a second NFT, after the destruction of the first NFT. This may have a same effect to a user, as one content representation can be lost and another can be gained.

NFT evolution platforms in accordance with many embodiments of the invention can destroy an NFT by assigning a right of a party (e.g., ownership) to an entity that does not exist, and/or which may be unable resell and/or otherwise transfer the NFT to another party. In many embodiments, this can be achieved by assigning rights (e.g., ownership) of an NFT to a user with a public key that may not be derived using a traditional key derivation process (e.g., in which one public key and one private key can be generated). Accordingly, NFT evolution platforms in accordance with many embodiments of the invention can derive using a process that can create a public key with no associated known private key. For example, a process can set a public key to the concatenation of a series of hash values generated using a cryptographic hash process that takes as input a binary representation of an NFT to be destroyed.

NFT evolution platforms in accordance with many embodiments of the invention can provide data associated with peelable NFTs, including data regarding achievements among other types of data. In particular, a peelable NFT, before being peeled, may be associated with an achievement, similar to a badge, where a badge may be given to a user in response to the user having performed certain actions as set forth by an NFT (e.g., made 100 purchases, having reached an uncommon goal in a game, has purchased and then sold an NFT that has more than doubled in value, has been among the 1% most active users during a one-month period, among many other policies that can be specified with respect to NFTs). In many embodiments, an NFT can be peeled to reveal another NFT, which may not be tied to an achievement and can be derived from an NFT that was associated to the achievement. In many embodiments, a separation can be meaningful, as a person may not be able to sell an achievement (e.g., such as being the most active user), but would be able to sell an art piece that was obtained by peeling an NFT that was given in response to the achievement. NFT evolution platforms in accordance with many embodiments of the invention can generate peelable NFTs that may be capable of spawning more than one NFT based on different policies (e.g., when a user achieves 1% most active on a marketplace, in a game, peels the recognition badge ad receives both a replacement recognition badge NFT and an NFT with intrinsic or redeemable cryptocurrency value, among others). In many embodiments, in order to become peelable, two or more NFTs may need to be associated with each other, e.g., placed in a same container within a wallet, among other policies. A collection of associated NFTs may be peelable, e.g., have an action associated with the collection, where this action may result in the destruction of one or more of the members of the collection, and which may also result in the addition of and/or change of one or more members to the collection. Members can be NFTs and/or other representations of content.

NFT evolution platforms in accordance with many embodiments of the invention can generate NFTs that can be peeled and/or changed, from a perspective of a user with access rights to the NFT based on policies associated with the NFTs. For example, changing an NFT from being a representation of a first painting by a first artist, to being a representation of a second painting by a second artist. The second painting may be worth more or less than the first one, and may be more pleasing or less pleasing to the owner than the first one. Therefore, an act of peeling can be associated both with opportunity and risk. In many embodiments, an NFT conversion may include a transfer of rights (e.g., ownership transfer of a first painting to a first artist, or similar custodian).

NFT evolution platforms in accordance with many embodiments of the invention can generate series of NFTs and/or associated content representations associated with a series of peeling actions, that can provide a "sequence" of NFTs. In many embodiments, a sequence may correspond to different NFTs, where one replaces another NFT, and/or may correspond to a same NFT with different content representations being associated with it. A sequence may be created by an author (e.g., artist) who created the different content elements associated with the sequence. A sequence may be created by a content aggregator, (e.g., a company representing an artist or artists associated with the elements of the sequence, and/or obtaining NFTs and content from content creators and the elements can be part of a sequence). In many embodiments of the NFT evolution platforms, a sequence can be pre-determined if, at the time of a first peeling action, some or all the content associated with the sequence has been decided and represented in the NFT and/or a database used for a process of peeling. In certain embodiments, a sequence is not pre-determined if content can be added to the sequence after a first peeling action has been performed, and/or if the number of elements in the sequence has not yet been determined.

Peeling can be seen as a type of evolution, which was disclosed in U.S. Provisional Patent Application 63/248,570, filed Sep. 27, 2021, titled "Content Evolution Techniques" by Markus Jakobsson, which is herein incorporated by reference in its entirety.

Peeling can be applied to physical artworks using the techniques disclosed herein, combined with the techniques for evolution disclosed in U.S. Provisional Patent Application 63/254,062 filed Oct. 9, 2021 titled "Token Evolution with Physical Embodiment" by Markus Jakobsson et al., which is herein incorporated by reference in its entirety.

NFT evolution platforms in accordance with many embodiments of the invention can process NFTs that have been requested to be peeled by one or more switches, which can be a part of a user's wallet, where the wallet may be run in a trusted execution environment (TEE), a computational entity external to the user wallet (e.g., operated by a content creator and/or a party designated by the content creator) among various other configurations. In several embodiments, a switch may be a distributed party, e.g., an entity including multiple collaborating entities that make decisions based on consensus mechanisms. A switch can determine whether an NFT can be peeled. This determination may be made by accessing data associated with an NFT, which can be stored in an NFT, referenced by an NFT and/or stored in databases with records associated with the NFTs. In many embodiments, data may set out policies that indicate whether an NFT may be peeled, what the outcome of a peeling request is, and/or any conditions specifying when peeling is allowed. The data may also indicate what the result of a successful peeling request should be, and/or how it is determined. For example, an indication can be a reference to content to which the NFT content should be updated to as a result of the peeling. Such content can also be determined in response to a successful peeling request, e.g., as determined by a policy.

After new content has been associated with an entity requesting a peeling of an NFT, the new content, which may be an NFT and/or an update related to the NFT that requested to be peeled, can be conveyed to a user's wallet that requested the peeling.

Figure 35:
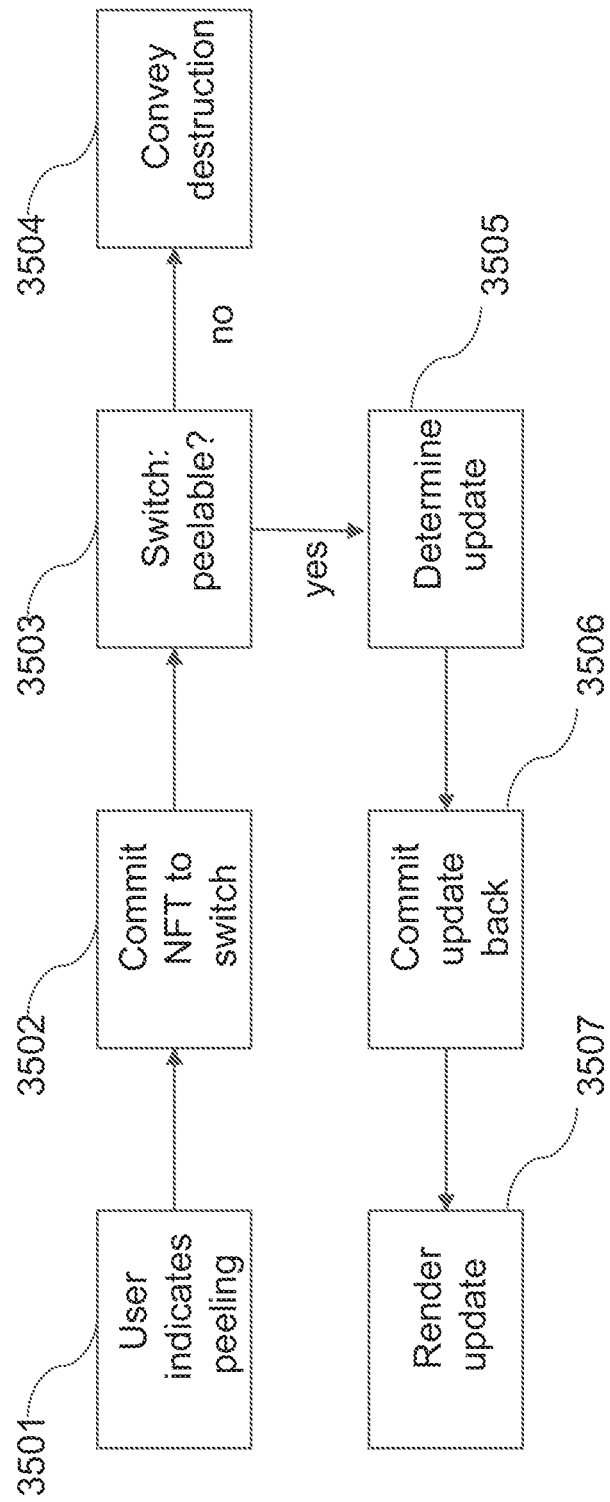
FIG. 35 illustrates a process for performing peeling of an NFT in accordance with an embodiment of the invention.

NFT evolution platforms in accordance with many embodiments of the invention can generate peelable NFTs. A process for performing peeling of an NFT in accordance with an embodiment of the invention is illustrated in FIG. 35. The process can receive 3501 a user indication to initiate a peeling of an NFT (e.g., a user clicking a confirmation button associated with the NFT). The process can commit 3502, using a user's wallet, the NFT to a switch, where the switch may be a trusted party and/or instance that can perform updates. A commitment may include a change of user rights (e.g., ownership away from a wallet and to the switch). In many embodiments, a switch may be an external processing entity, e.g., hosted by a content creator of an NFT being peeled, and/or a third-party resource, which may be a distributed entity making determinations based on consensus.

The process can determine 3503, using switch, whether an NFT being peeled can be peeled. In many embodiments, peelability of an NFT may be determined by accessing a database indexed by NFT identifiers, where such an identifier can be transmitted with a commitment 3502. In certain embodiments, peelability can be determined by decrypting a vault associated with the NFT being peeled.

The process can determine, using switch, that an NFT cannot be peeled, and conveys a destruction 3504 of the NFT to the user initiating the peeling. In many embodiments, a committed NFT that is not committed back is no longer present, and/or can be removed as part of garbage cleanup in the wallet as it is no longer valid.

The process can determine, using switch, that an NFT can be peeled and determine 3505 an update to the peeled NFT (e.g., by decrypting a vault and/or accessing a record in a database). The process can commit 3506, back the updated and/or replaced NFT (e.g., the NFT can be transferred back to the wallet from switch).

The process can render 3507, using wallet, an update of the NFT that has been committed back to the wallet. In certain embodiments of the evolution platforms, a notification indicating a success of the peeling action can be provided. Although FIG. 35 illustrates a particular process for peeling an NFT, any of a variety of processes can be utilized as appropriate to the requirements of specific applications in accordance with embodiments of the invention.

NFT evolution platforms in accordance with many embodiments of the invention can use a switch to perform logging indicating a request and actions taken, including an identity of a wallet making the request. Logs can be used to monitor various types of data, including a popularity of peeling among different users, to make recommendations to users based on such popularity observations, among other indications. Logs can also be used to detect anomalies and/or indications of fraud risk. For example, a wallet that is not known to be associated with a given NFT should not be making a peeling request of the NFT; similarly, a large number of peeling requests associated with NFTs that have been reported stolen, or been associated with a potential theft event, may be indicative of an attempt to launder the stolen NFTs. When such fraud indicators are identified, peeling requests may be blocked and/or NFTs believed to have been stolen can be placed on hold and optionally be returned to their believed owners.

For example, a first NFT that can potentially be peeled can be used in a game. It may correspond to a digital artifact, to a skill, to an achievement, to a personality, etc. The first NFT can also be representative of an artwork, whether inside the game, outside the game, or both. Based on the use of the first NFT in the game, and more generally, based on playing the game, a player may be provided with a hint, rendered in the game, where the hint indicates that the first NFT can be peeled. The hint may also indicate the nature of the content that peeling the first NFT would result in, or an indication of the identity of the creator of the content that peeling the first NFT would result in. Such hints may inform the user what NFTs can be peeled, in order not to risk destroying NFTs that cannot be peeled. The hint may be difficult to understand, thereby still exposing the user to a risk of destroying an NFT by peeling it, or to the risk of losing a valuable type of content and receiving a less valuable type of content as a result of successful peeling. The giving of hints is not specific to gaming environments, but can also be provided in the context of other applications or as part of advertisements targeted to the user of a relevant NFT.

Figure 36:
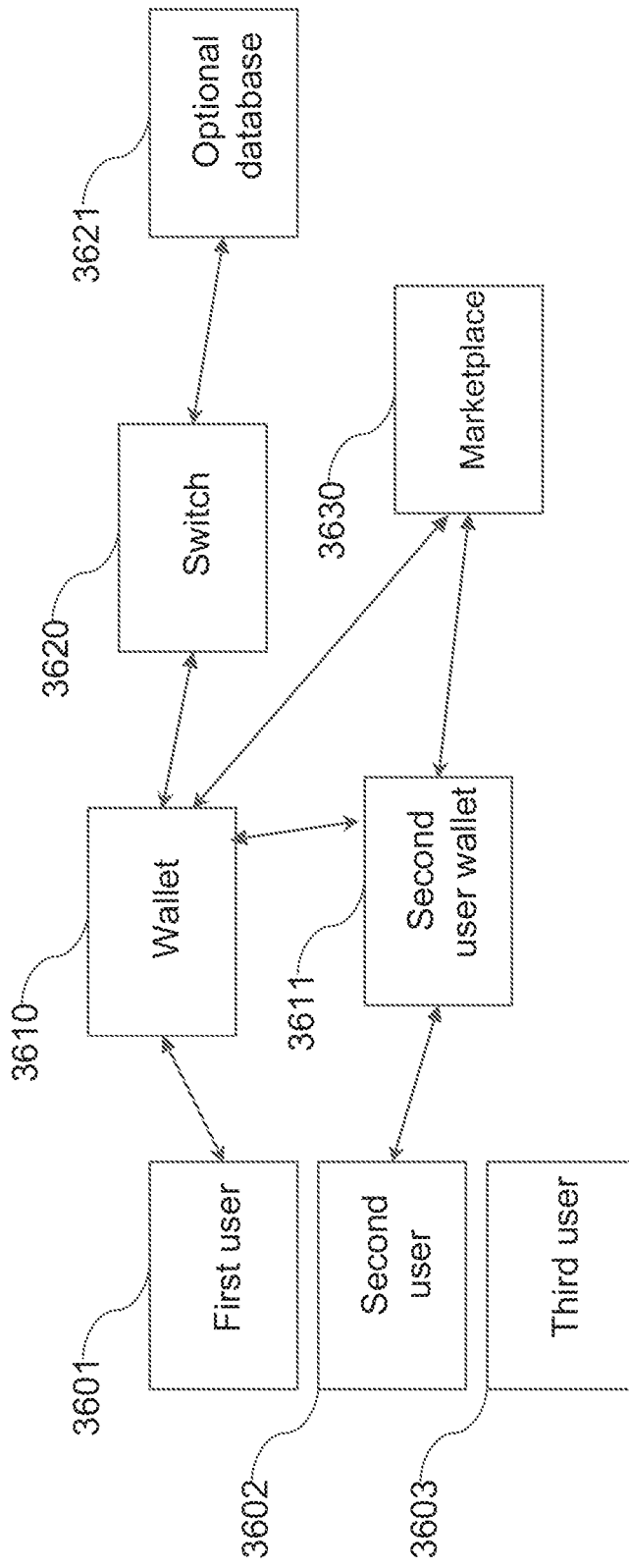
FIG. 36 illustrates an architecture for peeling NFTs of multiple different user wallets in accordance with an embodiment of the invention.

NFT evolution platforms in accordance with many embodiments of the invention can generate peelable NFTs across different user wallets and configurations. An architecture for peeling NFTs of multiple different user wallets in accordance with an embodiment of the invention is illustrated in FIG. 36. In particular, FIG. 36 shows first user 3601 with first users wallet, wallet 3610; second user 3602 and associated second user wallet 3611; and third user 3603 with an associated wallet (not shown). An NFT can be listed in a marketplace 3630 by transferring a representation of the NFT from wallet 3610 to marketplace 3630. Second user 3602 can interact with marketplace 3630 via second user wallet 3611, and access said representation. If purchased, an NFT can be transferred from wallet 3610 to second user wallet 3611, potentially using marketplace 3630 as a trusted intermediary. First user 3601 can peel an NFT such as the NFT corresponding to first content 101 by committing first content to a switch 3620, where the switch 3620 can use content stored in a database 3621 to determine whether the NFT can be peeled, and information regarding how content can be updated. Although FIG. 36 illustrates a particular architecture of an NFT evolution platform generating peelable NFTs, any of a variety of architectures can be utilized as appropriate to the requirements of specific applications in accordance with embodiments of the invention.

Figure 37:
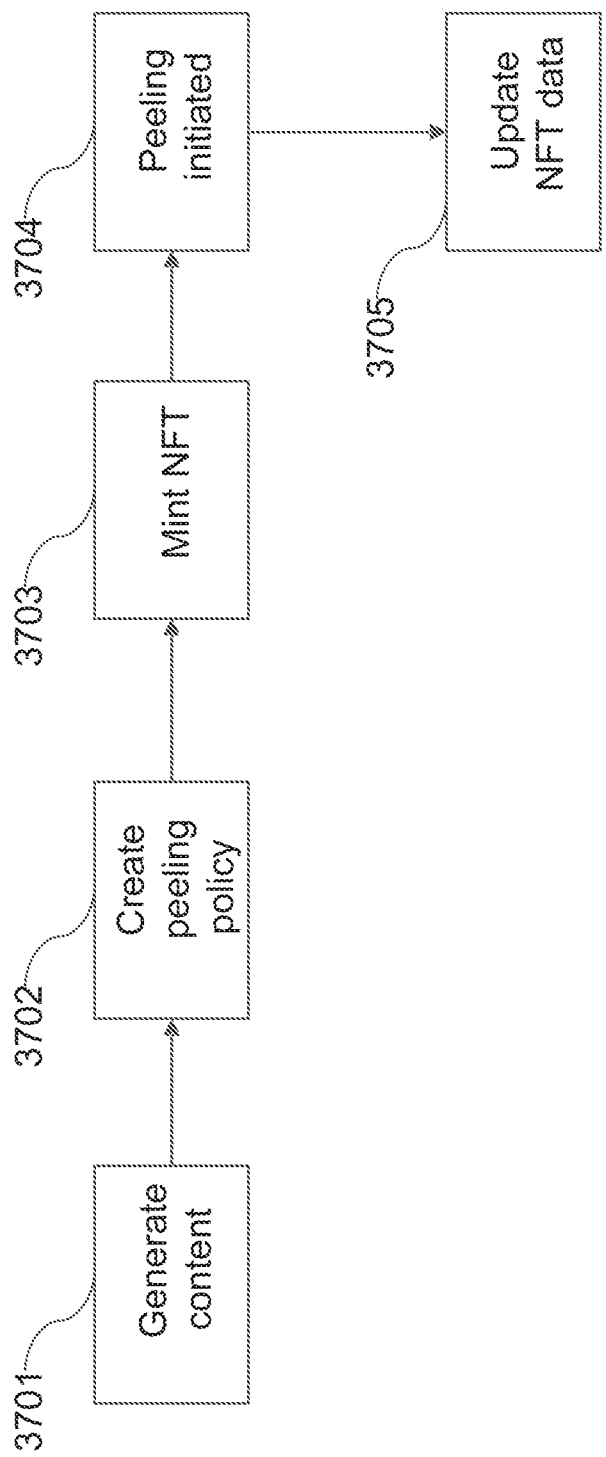
FIG. 37 illustrates a process for generating and peeling of a NFT in accordance with an embodiment of the invention.

NFT evolution platforms in accordance with many embodiments of the invention can generate peelable NFTs associated with policies that can determine an evolution of an NFT as it is peeled. A process for generating and peeling of an NFT in accordance with an embodiment of the invention is illustrated in FIG. 37. The process can generate 3701 content. The process can create 3702 a peeling policy (e.g., as specified by an author of the content) of associated with the content.

The process can mint 3703 an NFT from the content. In many embodiments, the process can generate a reference to data describing a peeling policy associated with the NFT. In certain embodiments, data may be a reference to an NFT, where such data may be encrypted to allow decryption by specific processes (e.g., a switch 420). A peeling policy may be stored in a database, in storage container within an NFT, and/or metadata associated with an NFT, among various other configurations as appropriate to the requirements of specific applications in accordance with embodiments of the invention.

The process can receive 3704 an indication of a user initiating a peeling of an NFT. The process can update 3705 data corresponding to the peeled NFT. In many embodiments, an update may perform various different actions, including indicate that an NFT was destroyed, and/or an update may cause a replacement of and/or modification of a peeled NFT, the selection of content it corresponds to, among various other modifications. Although FIG. 37 illustrates a particular process for generating and peeling an NFT, any of a variety of processes can be utilized as appropriate to the requirements of specific applications in accordance with embodiments of the invention.

User-Specific Evolution, Spawning and Peeling

NFT evolution platforms in accordance with many embodiments of the invention can determine, for a content modification operation such as evolution, spawning and/or peeling, a content element of likely relevance to a user. As described, evolution of an NFT can occur when at least on one content element is replaced by another content element, where both content elements may be associated with an NFT. In many embodiments of the NFT evolution platforms, evolution can include spawning new content, e.g., a newly minted NFT is obtained by a user in possession of an NFT for which spawning was initiated. Evolution can include peeling where a triggering event can lead to a change where a user action can be performed for the purposes of initiating change. Mechanisms for evolution are disclosed in in U.S. Provisional Patent Application 63/248,570, filed Sep. 27, 2021, titled "Content Evolution Techniques" by Markus Jakobsson and in U.S. Provisional Patent Application 63/254,062 filed Oct. 9, 2021 titled "Token Evolution with Physical Embodiment" by Markus Jakobsson et al., which are herein incorporated by reference in its entirety.

Figure 38:
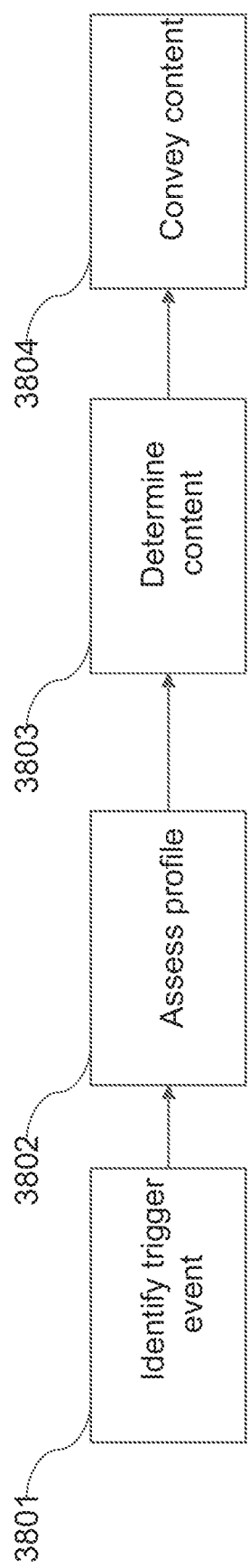
FIG. 38 illustrates a process for evolving an NFT based on triggering events in accordance with an embodiment of the invention.

NFT evolution platforms in accordance with many embodiments of the invention can generate NFTs that can evolve based on triggering events. A process for evolving an NFT based on triggering events in accordance with an embodiment of the invention is illustrated in FIG. 38. In particular, FIG. 38 illustrates a selection of new content for evolution (e.g., spawning and/or peeling). A selection of new content can be initiated by a wallet, an external entity such as a marketplace, and/or a service provider. A trigger event can be identified 3801. A trigger event can include a public event (e.g., one that is recorded on a blockchain, a user input or action, a random coin toss, and/or a combination of such) and/or private events. A profile associated with the wallet can be determined 3802. Determining a profile can include determining contents of a wallet, e.g., as disclosed in U.S. Provisional Application 63/270,092 titled "Protection Against Token-Based Malicious Scripts", by Markus Jakobsson, which is herein incorporated by reference in its entirety. Determining a profile associated with a user can include determining browsing history, applications associated with the wallet, and/or demographic information associated with the user. Profile data can be stored in a wallet and/or third-party service providers, such as Google (™), Facebook™ or Amazon™. The process can generate 3803 content for an NFT based on detecting one or more trigger events and the determined user profile. In certain embodiments of the NFT evolution platforms, content can be generated based on bids received from advertisers. The process can convey 3804 the content to the user (e.g., presented by the wallet). Although FIG. 38 illustrates a particular process for generating NFT content based on user profiles, any of variety of types of user information and activities can be utilized to generate content as appropriate to the requirements of specific applications in accordance with embodiments of the invention.

NFT evolution platforms in accordance with many embodiments of the invention can make modifications to an NFT based on the likely interests of a user associated with an NFT, which can provide specifically relevant material to the user, including beneficial advertisement opportunities that offer product placement. For example, a user may initiate a modification of an NFT badge by performing a peeling operation on the NFT badge. NFT evolution platforms in accordance with many embodiments of the invention can determine that the user is a gamer, and that he or she likes a particular type of games, and that he or she is unlikely to already be a player of one particular game of that type. By causing the replacement of the content associated with the NFT badge with content of use for the particular game identified provides the user with an incentive to try out that game and use their newly acquired resource, corresponding to the content of the NFT that results from the peeling of the NFT badge. Similarly, when an NFT spawns a second NFT, this second NFT may be selected to match the likely preferences of the user. In many embodiments of the NFT evolution platforms, user preferences can be determined by data obtained from various different sources, including a digital wallet (e.g., by the wallet identifying a user profile related to the presence of tokens, as described in U.S. Provisional Patent Application 63/270,386, filed Oct. 21, 2021 titled "Secure Sharing of Token Assets" by Markus Jakobsson which is herein incorporated by reference in its entirety, among various other sources of user data.

Figure 39:
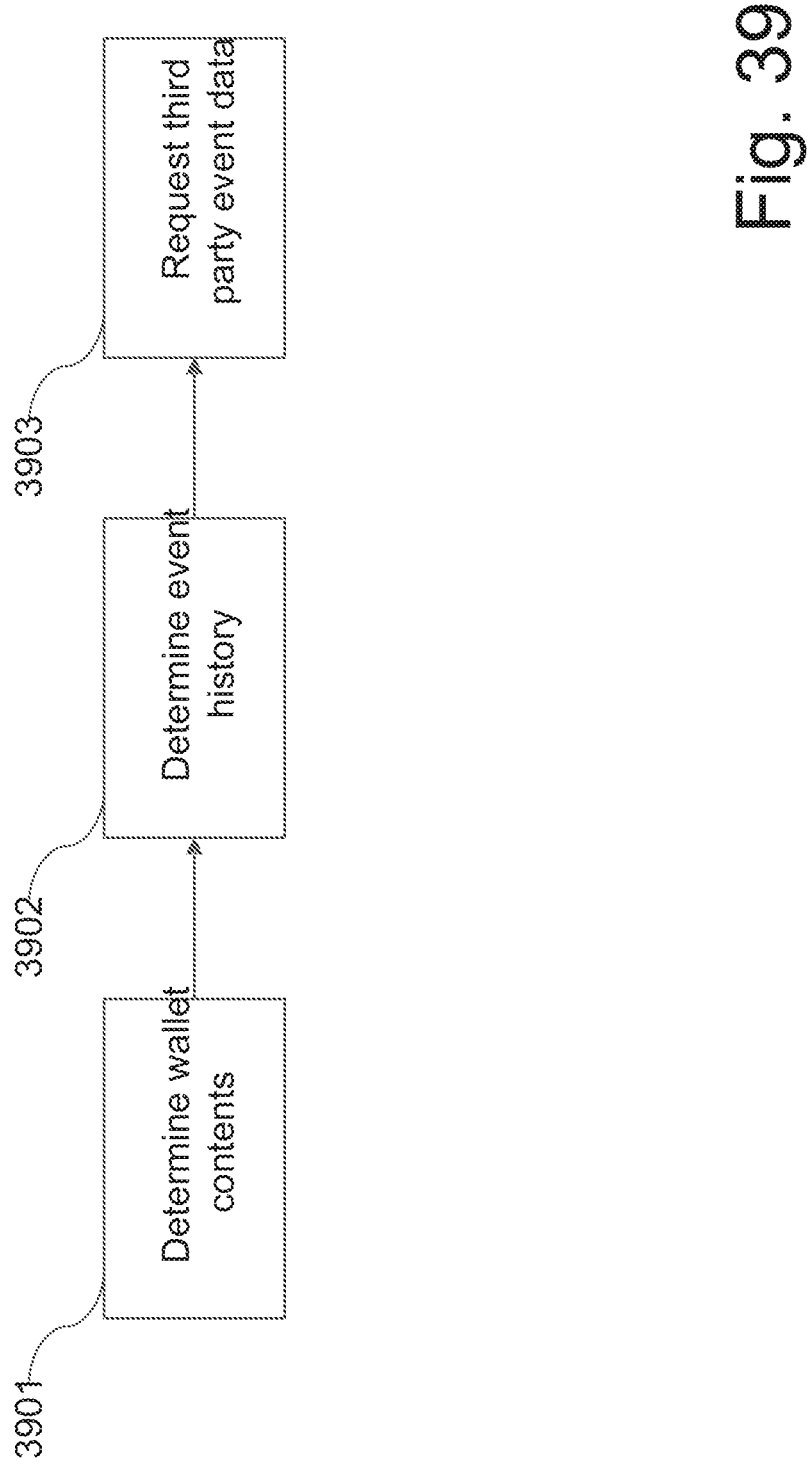
FIG. 39 illustrates a process for generating user profiles in accordance with an embodiment of the invention.

NFT evolution platforms in accordance with many embodiments of the invention can generate user profiles that can be used to generate NFTs tailored to specific needs of users. A process for generating user profiles in accordance with an embodiment of the invention is illustrated in FIG. 39. In particular, the process can determine 3901 contents of a wallet associated with a user. The process can determine 3902 an event history associated with the user. In many embodiments, the process can access other applications associated with a user wallet and can use an application programming interfaces (APIs) associated with these. In many embodiments, the process can be performed by a wallet and/or a third party external service provider on which a wallet application is executing. The process can request 3903 event data. In many embodiments, the process can obtain user permission regarding access to wallet data. In several embodiments, if a wallet does not have pre-set user preferences regarding permissions to access such data, a wallet may present a user with a request to access one or more resources. The user may select from various options, including "just this time", "always", "no". If a user selects "always", the configuration can be updated. The process can determine a profile associated with the user based on wallet contents, event histories, and various other types of third party event data, among various other sources and/or types of user data. Although FIG. 39 illustrates a particular process for generating user profiles based on wallet data and data from one or more third party service providers, any of a variety of processes can be utilized as appropriate to the requirements of specific applications in accordance with embodiments of the invention.

Figure 40:
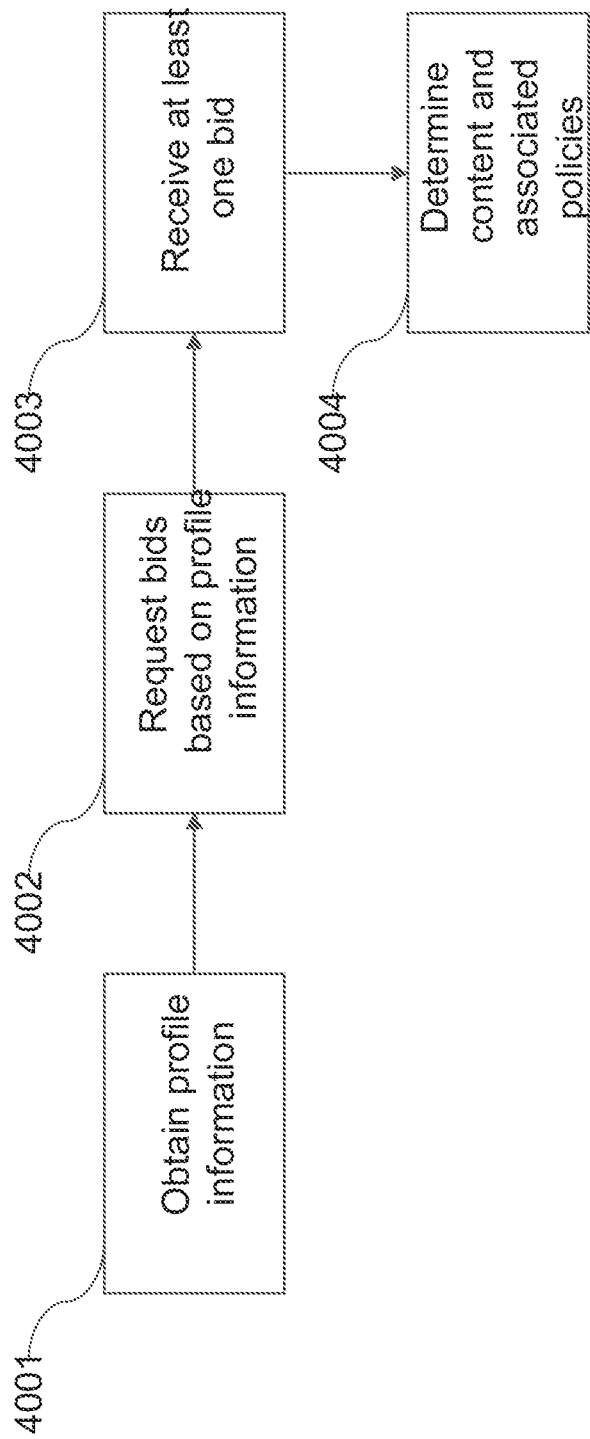
FIG. 40 illustrates a process for determining NFT content based on user profiles in accordance with an embodiment of the invention.

NFT evolution platforms in accordance with many embodiments of the invention can determine content based on user profiles. A process for determining NFT content based on user profiles in accordance with an embodiment of the invention is illustrated in FIG. 40. The process can obtain 4001 one or more user profiles. The profiles can include data gathered from one or more different sources, including digital wallets, applications associated with the digital wallets, and various third party sources. In several embodiments, the process can scrub profile information to remove personally identifiable information (PII).

The process can request 4002 bids based on the profile information. A request may, for example, include one or more demographic descriptors, such as "gender", "age", "interests", "purchase histories", "monetary values", among others.

The process can select 4003 a bid based on various criteria (e.g., highest bid, bid from trustworthy source, among other factors).

The process can determine 4004 NFT content and associated policies based on the selected bid. In many embodiments of the NFT evolution platforms, one or more policies may specify whether an NFT is transferable, whether it is associated with a limited number of uses, whether it has an expiration date, whether it can evolve, whether it can spawn, and/or whether it can be peeled. In many embodiments, policy information may be stored with the NFT, and other policy information may be stored in a database external to the NFT, where such information can be referenced by the NFT. Some content may be delivered as part of an NFT, whereas other content may be delivered without being encapsulated in a NFT. An example token-based delivery is an NFT that is the result of a spawning event. The associated policy may state that the NFT may be resold. An example non-token delivery may be a short movie that explains the use of a promoted product, and which can be stored in the user's wallet. An example policy may state that the content can be rendered the next time the user opens the wallet. Although FIG. 40 illustrates a particular process for generating NFT content based on bids, any of a variety of mechanisms for generating NFT content can be utilized as appropriate to the requirements of specific applications in accordance with embodiments of the invention.

NFT evolution platforms in accordance with many embodiments of the invention can make modifications based on likely interests of a user associated with an NFT token, which can be used as an incentive for users who know each other to exchange or gift tokens to each other, thereby acquiring new users. For example, a wallet associated with a first user may have been granted access to the social network of the first user, and determine that the first user is connected to a second user over social media. Here, the second user can be a desirable client to acquire for a service provider who sponsors the distribution of content to the first user where this content is selected with the likely interests of the second user in mind. The distribution may be related to an NFT evolution in which new content can be provided to a user. The first user may be provided with information that the distributed content may be desirable to the second user. Accordingly, the first user may transfer the content to the second user, and/or the first user may ask the second user to help the first user utilize the distributed content.

For example, a user buys an NFT that, may be unbeknownst to the user, has the capability of spawning. The NFT may initiate spawning in response to a particular trigger, which may be related to the user, which may be related to the environment, and/or a combination of these. Two users owning the same or related NFTs may both see their NFTs spawn if these are both exposed to events that cause the triggering. As an NFT is about to spawn, its representative icon may change. For example, about a week before a spawning takes place, the icon may slightly start changing. The changes may at first be hard to perceive, but later become much more evident. After a week of gradual changes of the NFT icon, or other representation of the NFT, the NFT icon may go back to its original state and one or more "child" NFTs can be located next to it. These icons may for a time period, remain closed, but at a later time period may allow a user to click on them to open them, thereby exposing new content to the user.

NFT evolution platforms in accordance with many embodiments of the invention can set an evolution capability of an NFT at a time the NFT is first minted, traded and/or used. In many embodiments of the NFT evolution platforms, evolution capabilities may be set retroactively by, e.g., a content creator generating a service request that causes a change in a database that enables an NFT to have a flexible nature after having had an inflexible nature at the time the particular NFT was minted. In certain embodiments, NFTs may be associated with a flexible nature at a time of minting.

In several embodiments of the NFT evolution platforms, a user can determine NFT characteristics, including whether an NFT is static and/or dynamic/flexible (e.g., by visual inspection of information provided with an NFT and/or by using a tool such as binary analysis tool. In certain embodiments of the NFT evolution platforms, NFT characteristics, including flexibility of an NFT, may not be determined by analysis of data displayed by the interaction with and/or use of the NFT, or by using a tool such as a binary analysis tool. In many embodiments, a binary analysis tool can scrutinize a binary representation of NFTs to determine their contents, functionality, among various other properties. Binary analysis tools may be created using similar techniques as those used by decompilers.

NFT evolution platforms in accordance with many embodiments of the invention can protect information regarding whether a token has a flexible nature by storing information in an encrypted manner and/or in a data container of the token, where the data container can be decrypted by an authorized entity. Certain embodiments of the NFT evolution platforms can protect NFT characteristic information by storing data indicating flexibility in a registry to which access is limited. A registry may be run by a trusted service provider. The registry may respond to requests from wallets and other execution environments associated with client-side applications used to store, render or otherwise use tokens.

Figure 41:
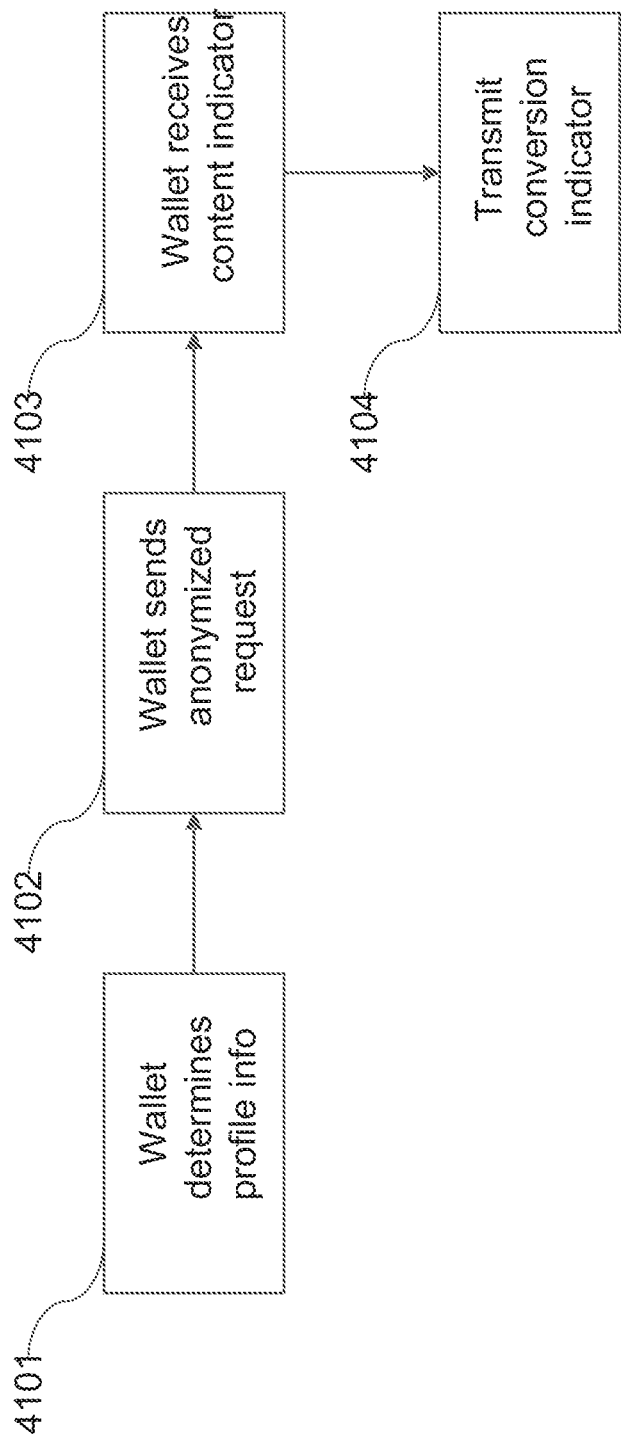
FIG. 41 illustrates a process for privacy-preserving requesting of content in accordance with an embodiment of the invention.

NFT evolution platforms in accordance with many embodiments of the invention can preserve user privacy while requesting content. A process for privacy-preserving requesting of content in accordance with an embodiment of the invention is illustrated in FIG. 41. In particular, FIG. 41 illustrates a privacy-preserving technique that can be used to request content. The process can determine profile information associated with a wallet.

The process sends 4102 an anonymized request from the wallet. The anonymization can be profile information and/or information regarding the particular wallet sending the request.

In several embodiments of the NFT evolution platforms, a request can be sent to a Private Information Retrieval (PIR) service provider in order to anonymize profile information. In several embodiments of the NFT evolution platforms, requests can be sent using privacy-enhancing proxies, whereby wallet information can be anonymized. One such proxy is the Tor network or another mix network.

In many embodiments of the NFT evolution platforms, a wallet can determine the content type to be requested and requests content of that content type from an external service provider, without disclosing PII to the external service provider.

The process can receive 4103 a content indicator, which may include the content and/or data that enables the retrieval of the content, such as an address.

The process can transmit 4103 a conversion indicator. In many embodiments of the NFT evolution platforms, a conversion indicator can assert that received content was used, and may include various data associating the conversion indicator to the request sent. A conversion indicator can be transmitted to an external service provider (e.g., an advertising service provider, and/or an entity that gets paid by advertisers to place advertisements and promotional material). Although FIG. 41 illustrates a particular process for protecting user information for NFT content generation, any of a variety of processes can be utilized as appropriate to the requirements of specific applications in accordance with embodiments of the invention.

NFT evolution platforms in accordance with many embodiments of the invention can include wallets that may send an inquiry about NFTs stored in the wallet to a registry at periodic intervals, asking whether one or more NFTs have had a status change. A registry can provide information regarding flexibility of one or more NFTs, which can be conveyed to a wallet in response to a user request, potentially along with indications of the triggering conditions. Received data may be associated with an NFT within a digital wallet. In many embodiments of the NFT evolution platforms, a wallet may verify, for flexible NFTs, whether triggering conditions associated with the NFTs have been satisfied.

NFT evolution platforms in accordance with many embodiments of the invention can partition the processing using processes both internal and/or external to the digital wallet. In particular, a wallet may convey usage information to a registry, and/or an associated entity, where this receiving entity can analyze received information along with environmental data it has collected, and determine whether a triggering event has been triggered. In many embodiments of the NFT evolution platforms, a portioned processing architecture can provide increased capabilities of protection information related to characteristics of triggering events and can provide a receiving entity (e.g., a registry), with information that may have commercial value. For example, signals conveyed to the registry may include usage statistics for the wallet, an inventory of NFTs stored in the wallet, user preferences, and/or user actions such as having achieved a new high score in a game. Signals conveyed to a registry may include outputs of artificial intelligence and/or machine learning analysis that can be performed locally in a wallet (e.g., a user identity prediction, a prediction regarding a user action with respect to an NFT in the user's wallet, among various other types of information with commercial value). In many embodiments, to protect user data, a proxy can be used to collect information, anonymize it, and transmit it to a registry. A user may select what proxy to use, and different proxies can compete based on features, prices and protections.

NFT evolution platforms in accordance with many embodiments of the invention can associate an event log with a user of an NFT to identify likely user needs. Determinations of likely needs is disclosed in U.S. Pat. No. 10,977,696, titled "Advertising Model", which is herein incorporated by reference in its entirety.

NFT evolution platforms in accordance with many embodiments of the invention can use a user's past and current events to determine a particular product and/or service may be of interest to the user, and can generate an NFT that is related to the product and/or service for the particular user.

In many embodiments, the NFT evolution platforms can generate (e.g., spawn) an NFT associated with a user that includes new elements corresponding to a product and/or service. For example, if a user has just purchased a camera, but not an associated telephoto lens, the NFT evolution platform can generate a new NFT that may correspond to software that performs a digital zoom functionality in a manner that improves on what is available from the camera manufacturer, e.g., using artificial intelligence (AI) or machine learning (ML) for interpolation of pixels, edge detection and enhancement, and other functionality that supports improved digital zoom. A new NFT may provide even greater benefits when paired with suitable hardware, such as a zoom lens of a brand that the software of the new NFT is specifically built to complement and enhance the functionality of. Thus, the user of a new NFT can receive a valuable benefit as their token spawns and they receive software that they may not have been aware of. The user can then be informed that the pairing with one of the lenses of the brand sponsoring the NFT to be provided to the user can further enhance the functionality of the new camera. The new NFT may include or give access to a discount token that can be used to purchase a zoom lens at a slight discount and/or with extended warranty. A warranty card may be automatically associated with the user at the time of the caching of the coupon, as this information can be obtained from the wallet in which the token is stored. Automatic registration of warranty, and similar functionality enhancements, is disclosed in U.S. patent application Ser. No. 17/401,687, filed Aug. 13, 2021, entitled "Proxy Management and Attribution" by Markus Jakobsson, which is herein incorporated by reference in its entirety. Structures relevant for the creation of discount tokens are disclosed in U.S. patent application Ser. No. 17/808,264, filed Jun. 22, 2022, titled "Systems and Methods for Token Creation and Management", by Markus Jakobsson et al., which is herein incorporated by reference in its entirety.

Figure 42:
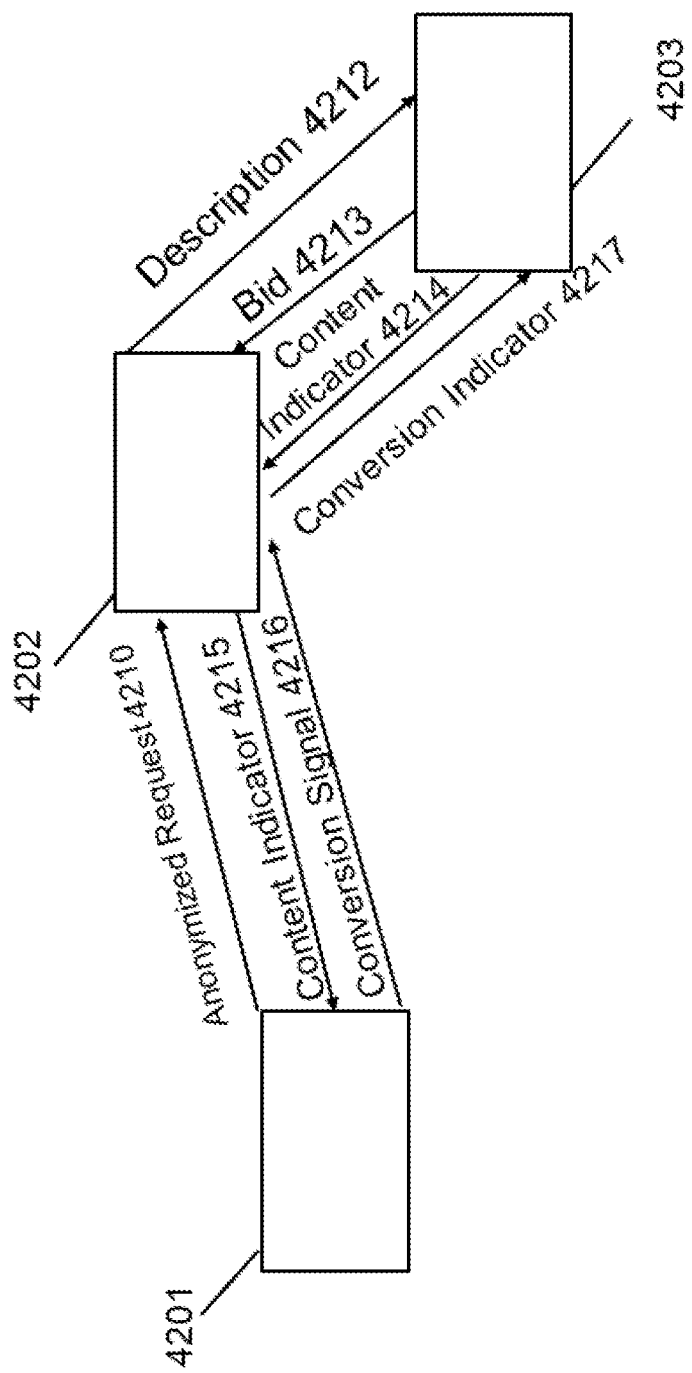
FIG. 42 illustrates an architecture of an NFT evolution platform in accordance with an embodiment of the invention.

NFT evolution platforms in accordance with many embodiments of the invention can use user data to mint NFTs that include content tailored to particular users. An architecture of an NFT evolution platform in accordance with an embodiment of the invention is illustrated in FIG. 42. In particular, a wallet 4201 can be used to perform various processes, including transmitting anonymized requests 4210 to external service providers 4202. External service providers 4202 can transmit a description 4212, which may be a request for bids to content provider 4203, and receive bids 4213 in response. Bids 4213 can be compared with other bids and external service provider 4202 can select a winning bid, e.g., bid 4213. Content provider 4203 can transmit content indicator 4214 to external service providers 4202. Content indicator 4214 may include the content and/or a reference to the content. External service provider 4202 can transmit content indicator 4215 to wallet 4201, where content indicator 4215 is and/or is associated with content indicator 4214 of the winning bid. In many embodiments, conversion signal 4216 can indicate that the user performed an action related to content indicator 4215, such as viewed the content associated with content indicator 4215, used the content associated with content indicator 4215, performed a purchase related to content indicator 4215, among other indications. In many embodiments of the NFT evolution platforms, conversion indicator 4217 may be a notification related to conversion signal 4216, and may include an invoice corresponding to the placement of the content associated with content indicator 4215. Although FIG. 42 illustrates a particular configuration for generating NFTs based on user profiles, any of a variety of configurations can be utilized as appropriate to the requirements of specific applications in accordance with embodiments of the invention.

NFT evolution platforms in accordance with many embodiments of the invention can use various different sources to identify interests and/or potential needs of users. NFT evolution platforms in accordance with many embodiments of the invention can utilize established mechanisms of recommender systems, including user behaviors on social channels such as Facebook, Twitter, Instagram, and others. User-targeted (and/or micro-targeted) marketing may be available from these social networks, as well as from search engine companies such as Google, Bing, and others. However, such mechanisms may not be usable in token-based systems, which may not have the capability and/or security measures incorporated to use such signals while providing protection against associated abuse. Accordingly, NFT evolution platforms in accordance with many embodiments of the invention can use data from various different platforms while providing security features to facilitate the incorporation of these third party systems.

NFT evolution platforms in accordance with many embodiments of the invention can use data regarding purchase histories among various other activities that may occur outside of an NFT ecosystem to determine interests and needs of users. For example, NFT evolution platforms in accordance with many embodiments of the invention can infer that a user is interested in a particular character or actor, possibly because of the types of movies they have streamed online. It could be that there already exist NFTs based on the movie(s), but not for the particular character, actor, or scene that would captivate the user and compel them to purchase an NFT. Based on discovery of such an interest, a user-targeted spawn or peel of a new NFT asset could be initiated based on that character or actor. Such assets could be created with human guidance—for instance, the creators of Thor: Ragnarok™ could curate a set of scenes for creating NFTs specifically appealing to fans of the character Valkyrie. Or, such assets could be created computationally using machine-learning-based techniques, for instance using facial recognition techniques to identify scenes featuring the specific character of interest, using pose and activity analysis techniques from computer vision to identify portions of a scene when the character is well-framed or doing a novel activity, and/or using speech recognition and natural language processing techniques on dialogue from the scene to choose a clip where the character speaks some notable lines. Such computational techniques can enable the scaling of NFT creation to a greater number of media items and characters.

NFT evolution platforms in accordance with many embodiments of the invention can use different types of data to facilitate evolution of NFTs, including spawning new NFTs, peeling NFTs, among other evolutions, where the types of data can include a user's birthday, anniversary, graduation, and/or other personal event for which a new NFT could be manufactured and presented to the user to enhance the celebration. For example, an NFT that the user already owns could suddenly appear in an enhanced form, and when accessed could reveal a personalized message, artwork, and/or behavior related to the user's personal event. Such a celebration-augmented NFT could optionally only persist for the day in question, or a few days after, reverting to its original form after the special event has passed. Traditionally, such personal data can be often available in existing social network profiles, user calendar data, among various other locations, and can be accessed using APIs provided by service providers. To protect the user data in cross-platform integrations, many embodiments of the NFT evolution platforms include various security features to address this. In particular, NFT evolution platforms in accordance with many embodiments of the invention can provide different levels of security that a user desires, and thus users may consent to the use of their data to create richer user experiences. For example, a user possessing a tokenized entry ticket to an upcoming music event might receive an evolved newly spawned NFT that includes a new song file and an ability to advertise to the user additional songs, albums, and merchandise that can be obtained.

NFT evolution platforms in accordance with many embodiments of the invention can use many different types of information to determine user interests, including social activities such as likes, dislikes, indications using emoticons and/or comments, as well as other overt behaviors. NFT evolution platforms in accordance with many embodiments of the invention can utilize machine learning and/or data analytics to various user signals including dwell time (e.g., the user spent extra time looking at an image, or reading an article or post, or scrolling through a list of options before selecting), click rate or click-thru rate, and others. In many embodiments of the NFT evolution platforms, these metrics can be collected from user activities within the NFT marketplace and/or external activities outside of the NFT marketplace. NFT evolution platforms in accordance with many embodiments of the invention can identify specific interests for users and generate a targeted NFT for the user. A user's behavior in viewing and/or purchasing an NFT can be used as an additional signal for training the NFT evolution platforms to further increase personalization. An NFT evolution, including spawning, and/or peeling can employ machine learning from user data and/or user signals to generate and/or modify NFTs. For example, a newly generated NFT could include visual artwork generated by applying techniques such as Style Transfer to a user's photos, and/or an NFT owned by a music fan could evolve to contain an iteratively growing poem whose lines are generated by a language model trained and/or fine-tuned on lyrics by the musicians the user listens to most often.

NFT evolution platforms in accordance with many embodiments of the invention can generate NFTs for different users based on analyzing events between users. In many embodiments, user connections to other users can be used to generate NFTs for users. For example, a first determination can be made regarding synergies between apparent preferences of a target user and the contacts of this target user. This may be expressed by the target user and the contact, on a given topic, expressing the same or similar opinions, e.g., as expressed by the use of feedback, where one type of feedback is the posting of the same or similar emoticons related to some content. Here, two emoticons are considered similar if their use both express happiness, both express sadness, both expressed desire, among others. The topic may be determined from the content based on tags, or by using content analysis methods to determine, e.g., whether the content is a video of a cat. Machine learning systems can be used to determine similarity of opinions between two or more users. The users can be connected to each other on a social network, and/or may express similar sentiments on related topics. Thus, the first determination can generate, on a topic-by-topic basis, a peer group regarding similarity of opinions related to the topic. In a second determination, a preference of a member of the peer group can be used to perform an action on behalf of a target user. In many embodiments, a weighting may be used based on a likelihood that a given topic coincides with a topic associated with a peer group. For example, if Alice and Bob are both in the same peer group based on both liking cats, and there is a content element that is determined to include a cat with a 35% probability, then an indication that Alice likes the content is an indication that Bob may also likely to like it. However, if the content element is only 0.5% likely to include a cat, and Alice indicates liking it, that may not be a sufficient support that Bob would like it. The preferences of a peer group can be important when determining how to identify what content is suitable for a target user, e.g., when a spawning event is scheduled to be performed. The use of signals from the peer group may, in fact, be more valuable than signals about the target user themselves, as the latter may confine a user to material they already know, and not sufficiently expand the user's horizons. However, different users may have different flexibilities in this regard, and therefore, NFT evolution platforms in accordance with many embodiments may observe the extent to which a user appears to benefit from and/or enjoy some content based on inferences from their past behavior, vs. inferences based on a peer group, and assign the user a score. Based on this score, a history of preferences of the target user and their peer groups, a selection of content can be made. NFT evolution platforms in accordance with many embodiments of the invention can use user data to evolve (e.g., spawn, peel, among others) NFTs and to direct content to users.

NFT evolution platforms in accordance with many embodiments of the invention can mint NFTs that are transferable, e.g., possible to gift or sell. Certain NFTs may be non-transferable. NFTs can have limited lifespans, e.g., only exist for 30 days and/or until they have been rendered a preset number of times (e.g., 3 times). Such limitations can be useful to encourage a recipient user to consume the content, as they cannot transfer it, save it for later, lend it to a friend, etc. This can be useful in the context of some promotions, e.g., wherein a user is granted a predefined capability in a particular game, potentially for a limited amount of time. An associated NFT may include a digital artifact that can be used in the game, and/or a reference to such, along with optional policies determining transferability, lifespan, and other usage rules.

Graphical User Interface for Complex Token Development and Simulation

As tokens, such as non-fungible tokens (NFTs) become increasingly complex, it can be increasingly difficult for content producers to understand, control and anticipate expressed functionality. For example, as evolving tokens are developed and deployed, artists will find themselves overwhelmed with content triggering contexts and how likely these are. Selecting triggers for evolutionary modifications is difficult as it will be hard for the artist to anticipate the likelihood of a given trigger taking place, and may therefore create tokens that evolve too easily or hardly at all, both of which can destroy the user experience of token owners and users. Similarly, understanding the consequences and security implications of a given trigger taking place may be difficult in situations where the consequences depend on an environmental context, such as the contents of a user's wallet. Thus, it is critical for the development of complex tokens, such as evolving NFTs, for a content creator to be able to simulate or otherwise assess, based on realistic contexts, the consequences of a given set of parameter choices, and to be provided with guidance for how to modify parameters to achieve intended consequences. This disclosure introduces novel techniques to address this complex problem.

NFT evolution platforms in accordance with various embodiments of the invention can provide user interfaces to one or more users that provide tools to generate parameter choices that can govern functionality of NFTs, such as parameters controlling evolution, parameters impacting the economics of an NFT release, among various other features related to NFTs.

Figure 43:
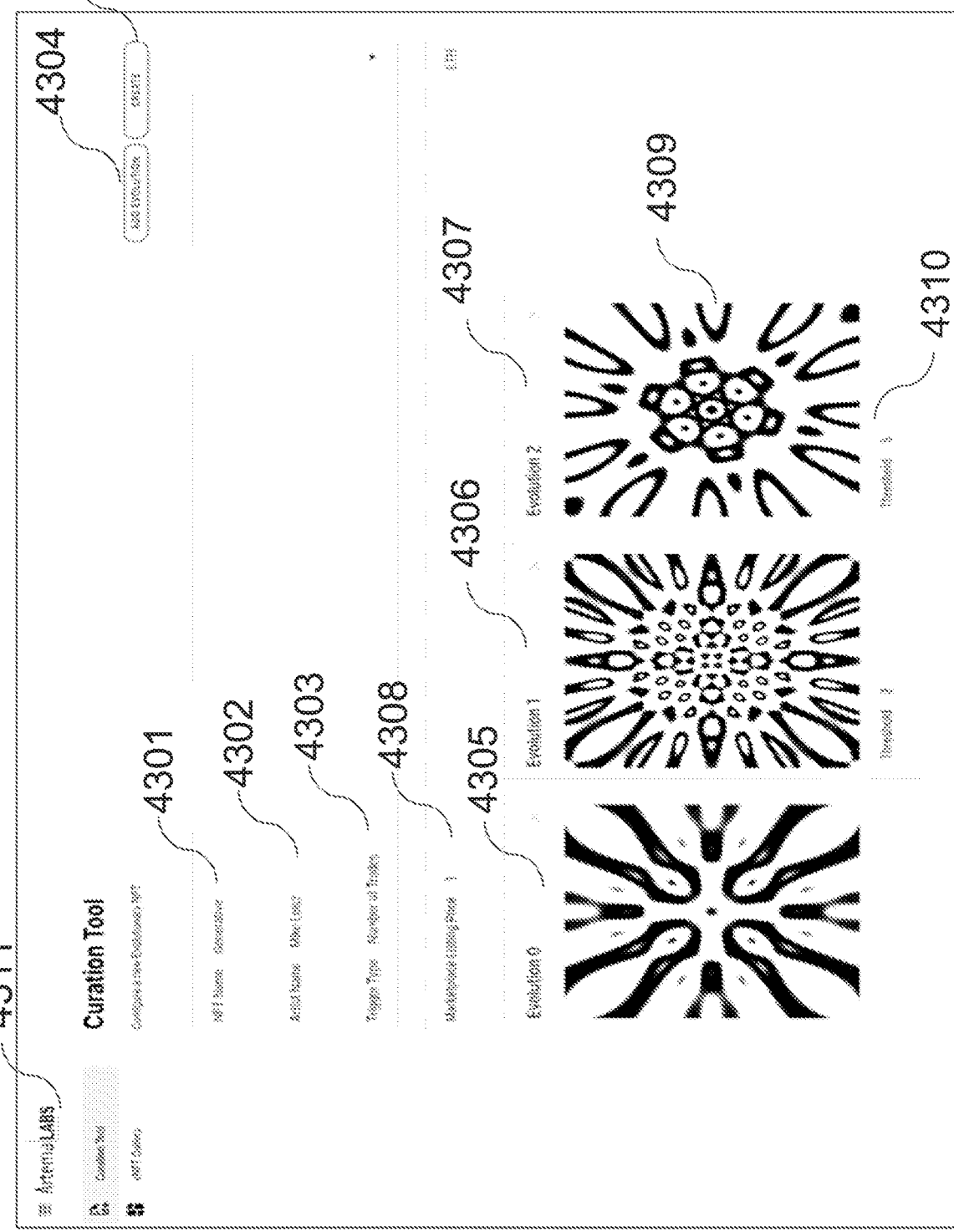
FIG. 43 illustrates a graphical user interface (GUI) that allows a user to enter descriptive information about an NFT being configured in accordance with an embodiment of the invention.

NFT evolution platforms can provide curation tools that allow users to configure NFTs. FIG. 43 illustrates graphical user interface (GUI) of a curation tool in accordance with an embodiment of the invention. A user can enter descriptive information about the NFT being configured such as title of the NFT artwork 4301 and name of the artist 4302 who created the NFT media. Evolution of the NFT can be driven by an event trigger 4303 selected by the user. The user can add a desired number of evolutionary stages to an NFT using a button 4304 which can dynamically add media containers 4305, 4306 and 4307 corresponding to each evolutionary stage. The user can populate each evolutionary stage with media elements 4309, such as image and/or video files. The evolutionary NFT can move from one stage to the next based on the 4310 configurable threshold values corresponding to the chosen trigger event. The user can set an initial marketplace listing price 4308 for their configured NFT. Once all the described fields are configured, the user can press 4309 a button that generates a description of the NFT and feeds the description to a smart contract which can be deployed thereby minting the user's NFT and listing it on a desired marketplace platform. A logo and navigation tool 4311 can be provided for identification and navigation. Although FIG. 43 illustrates a particular GUI of a curation tool for configuring NFTs, any of a variety of interfaces can be utilized as appropriate to the requirements of specific applications in accordance with embodiments of the invention.

In many embodiments of the NFT evolution platforms, selection of parameters can be based on simulations (e.g., of the likely commonality of triggering events and/or different royalty structures) and can be based on previous releases and various measurements obtained from these. A user interface can be generated and provided for a user to obtain information relating to simulation results, parameter choices, potential options to consider, and/or an identification of potential risks (e.g., a relative absence of comparable cases leading to a low statistical significance of assessments), among various other types of information that can be useful for a user structuring NFTs.

Figure 44:
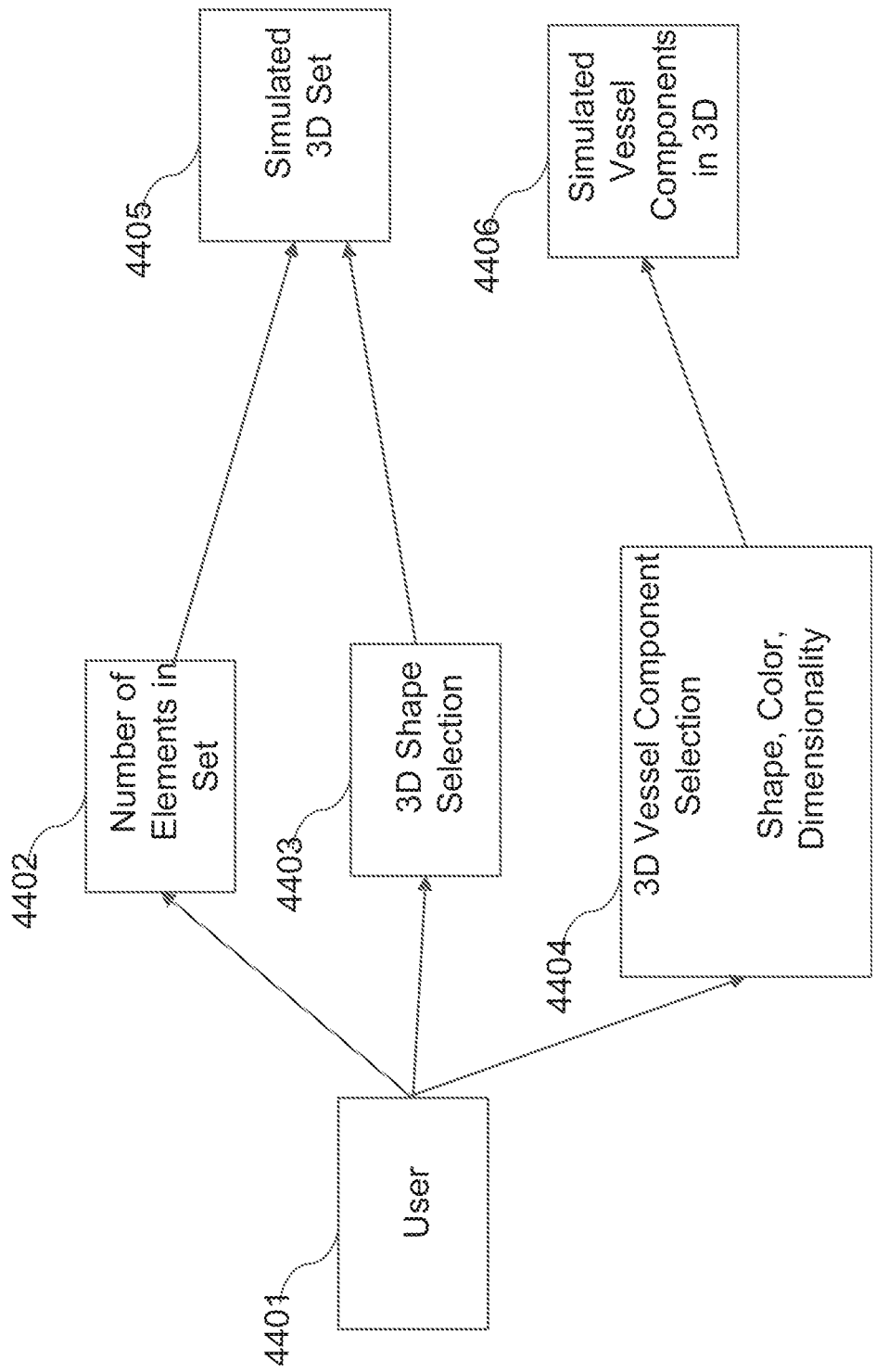
FIG. 44 illustrates a block diagram for a graphical user interface (GUI) where a user can enter a number of elements in a set as well as a representation of the set which can be in 2D or 3D in accordance with an embodiment of the invention.

NFT evolution platforms in accordance with many embodiments can provide user interfaces for generating a simulation and viewing it in 2D and/or 3D. FIG. 44 illustrates a process for using a graphical user interface (GUI) for configuring a simulation in 2D and/or 3D. A user 4401 can enter a number of elements in a set 4402 as well as a shape representation of the set 4403 which can be in 2D (e.g., circle, square, triangle, among other shapes) and/or 3D (e.g., cube, pyramid, globe, among others). Each vessel holding the NFT can be represented in a 3D vessel and the user can enter in elements of each of these components in 4404 (e.g., shape, color, dimensionality, among others). Based on the items entered in by the user, a simulation of the representation of the set can be visualized in the GUI for the user as a set 4405 as well as each component in 4406. The user may be able to iterate and make changes in the GUI to get the desired look and feel by changing selections in 4402, 4403 and 4404 as appropriate. Although FIG. 44 illustrates a process for using graphical user interface (GUI) for configuring a simulation in 2D and/or 3D, any of a variety of processes can be utilized as appropriate to the requirements of specific applications in accordance with embodiments of the invention.

In several embodiments of the NFT evolution platforms, a user may select a set of parameters based on making a selection among several proposed options. NFT evolution platforms in accordance with various embodiments can allow a user to upload and/or enter their own parameters and obtain feedback related to the assessed risks and benefits associated with such parameters, which a user can use in order to determine whether to make changes to an NFT structure. NFT evolution platforms in accordance with many embodiments can provide a user with several parameter choices and the user may select parameter choices presented by the user interface, where the parameter choices can correspond to commonly made choices, choices that have been assessed to have high benefits/low risks, and/or otherwise be suitable for the content associated with the NFT to be minted.

NFT evolution platforms in accordance with many embodiments of the invention can represent a user with an identifier and can be associated with one more clusters. Clusters may be clusters of other users, whose identities may be shared with the user and/or kept private, where the clusters include users providing content that is functionally similar and/or which are assessed to be governed by similar economic and/or technical constraints as the user. Thus, NFTs associated with users in this cluster may be used as comparable to determine likely community responses to NFTs generated by the user. In certain embodiments of the NFT evolution platforms, clusters may be clusters of content, where a given cluster may include some content of a given content provider. For example, a cluster may include only content of one or more types, e.g., only music content of one user but not movie content, and only image content of another user. The selection of content for the cluster can be performed in a manner that minimizes an estimated error risk, and may be done using processes, including machine learning (ML) techniques, statistical techniques, and/or using artificial intelligence (AI).

Figure 45:
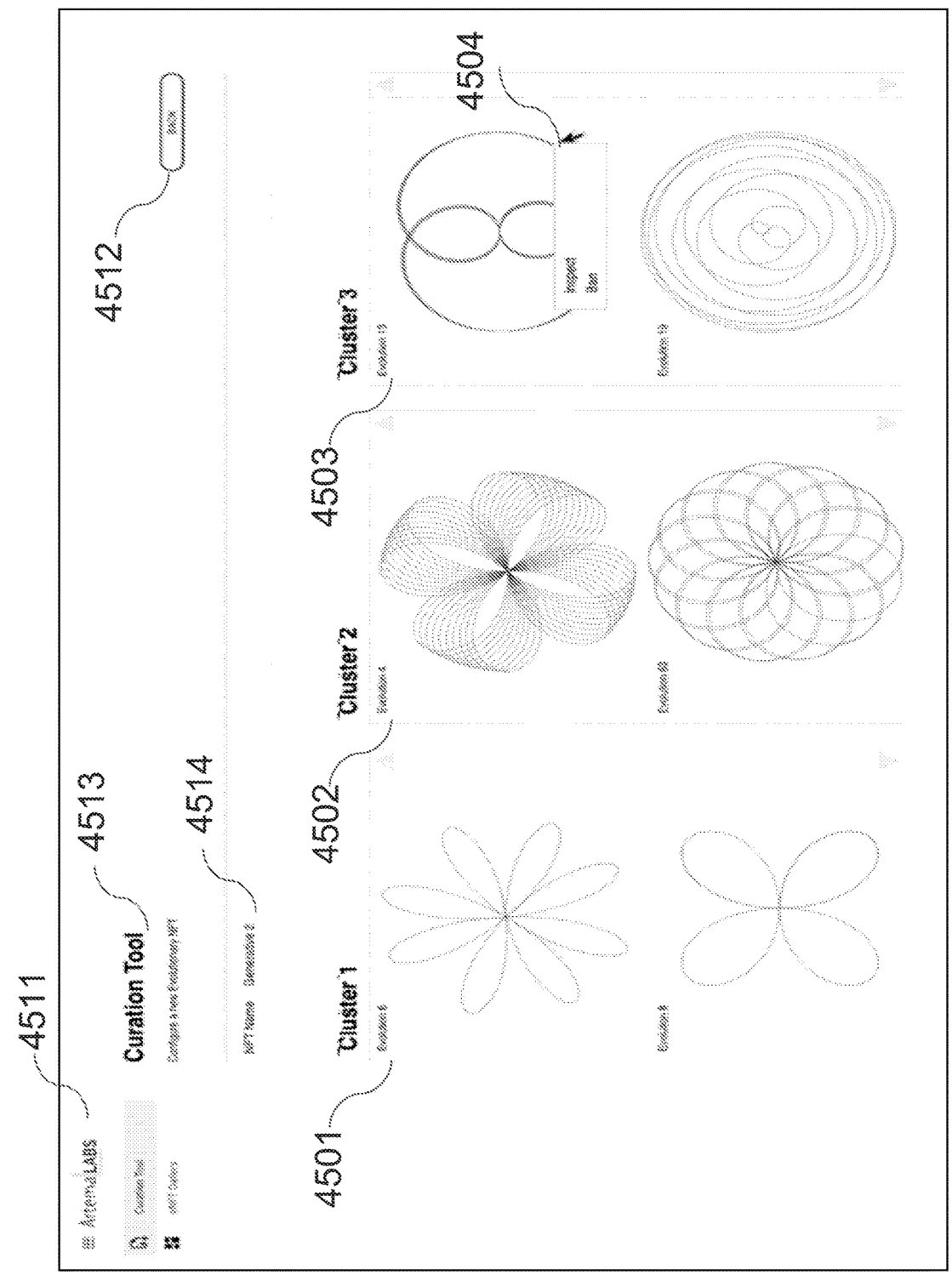
FIG. 45 illustrates a graphical user interface (GUI) for viewing and examining content clusters in accordance with an embodiment of the invention.

NFT evolution platforms in accordance with many embodiments can provide user interfaces for viewing and examining content clusters. A graphical user interface (GUI) for viewing and examining content clusters in accordance with an embodiment of the invention is illustrated in FIG. 45. Here, three clusters of images that include evolutionary outcomes from a procedural image generation program have been detected using a clustering algorithm, where each cluster includes similar images. Each cluster is shown in the GUI as a separate visual group 4501, 4502, and 4503 that includes thumbnails of images. Clicking on a thumbnail 4504 allows a user to choose to inspect this image further, for instance to identify the precise parameters used to generate this evolution, and/or to ban this particular image from being deployed as an NFT, perhaps because this evolution is visually unsatisfactory. A logo and navigation tool 4511 can be provided for identification and navigation. Additional navigation can be provided through a back button 4512, page title 4513, and NFT naming 4514. Although FIG. 45 illustrates a particular GUI for viewing and examining content clusters, any of a variety of UIs can be utilized as appropriate to the requirements of specific applications in accordance with embodiments of the invention.

NFT evolution platforms in accordance with various embodiments can include a cluster that includes content that is likely representative of how the user's content may be interacted with by a group of users, and can therefore be used to perform determinations of best parameter choices for a given content element uploaded and/or otherwise provided by the user.

NFT evolution platforms in accordance with various embodiments can provide a user configuring an NFT (e.g., author) with an economic simulation whereby the user can be able to configure various parameters such as, but not limited to, a number of evolutions, types of evolutions, expected fees, royalties, trigger types, trigger levels, number of editions, number of derived tokens allowed and expected, and number of spawned tokens for the purpose of simulating economic outcomes and recommending optimal configuration settings. Derived tokens are described in U.S. patent application Ser. No. 17/808,264, filed Jun. 22, 2022, titled "Systems and Methods for Token Creation and Management", by Markus Jakobsson et al., which is herein incorporated by reference in its entirety.

For example, Alice has a new photograph that she would like to sell as an NFT. The photograph is an image of a famous rock star on stage in her home town. She desires to sell a cropped version of the photograph showing only the rock star as the initial NFT. When the NFT has sold for more than $500, she wants the NFT to evolve to reveal the entire stage from the original uncropped photograph. Alice is uncertain if she should sell one NFT of the initial image, or multiple editions, and if she should burn the original NFT once the uncropped image has evolved, or if she should enable the current owner to resell the original NFT and what royalties she may select for the various NFT sales. NFT evolution platforms in accordance with various embodiments can provide simulations for various economic outcomes based upon her NFT evolution configurations and her expected sale prices. Alice decides that selling 10 editions of the rock star image and allowing it to evolve at a $100 sale or resale trigger level without burning the original NFT will result in a higher profit and lower pricing risk than a single edition with a $500 trigger level. The determination of a likely future price of a token, such as an NFT, can be performed, e.g., using the techniques disclosed in in U.S. patent application Ser. No. 17/806,728 filed Jun. 13, 2022, titled "Systems and Methods for Encrypting and Controlling Access to Encrypted Data Based Upon Immutable Ledgers" by Markus Jakobsson et al., which is herein incorporated by reference in its entirety.

Figure 46:
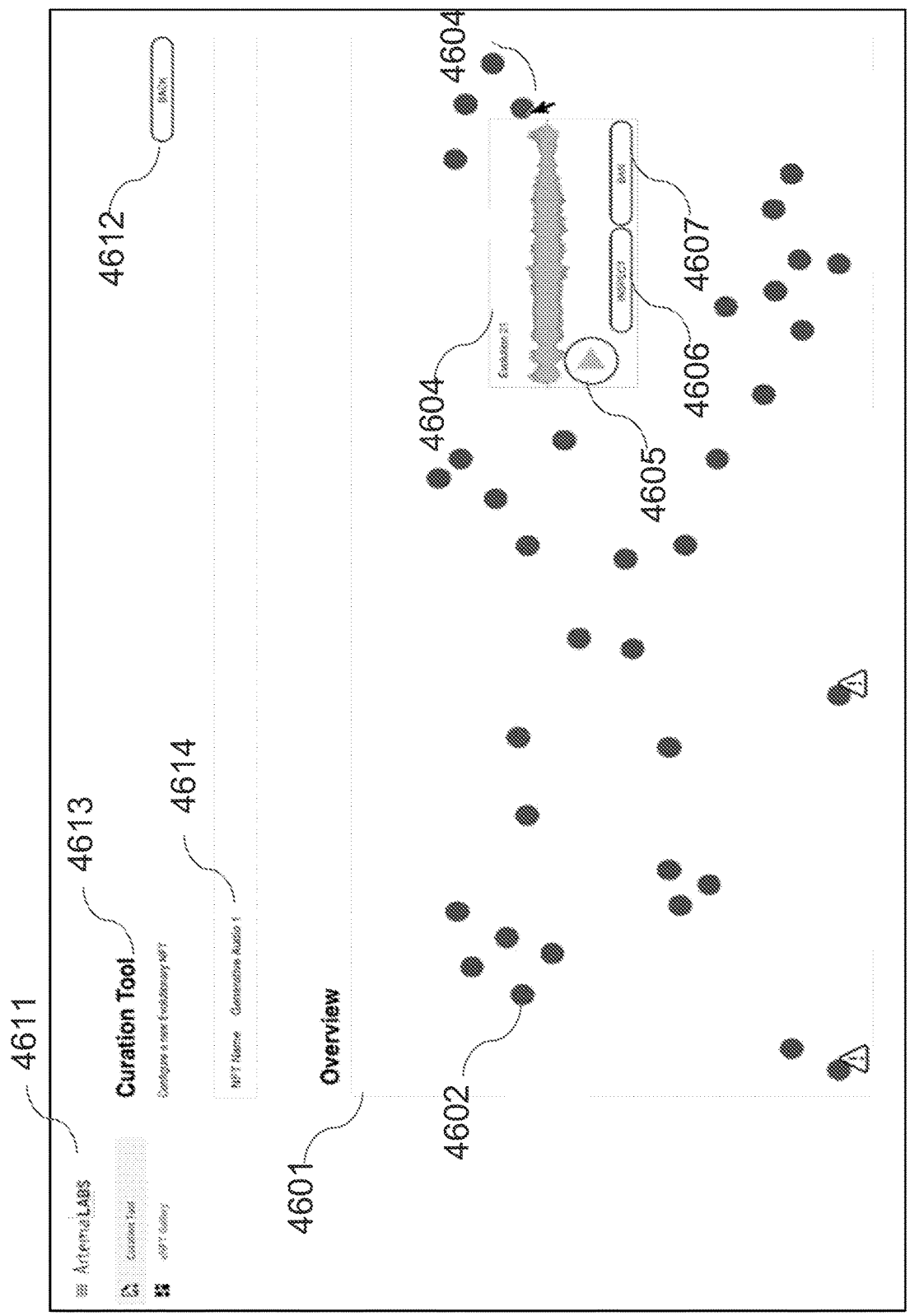
FIG. 46 illustrates a graphical user interface (GUI) for viewing an overview of evolutionary outcomes in accordance with an embodiment of the invention.

NFT evolution platforms in accordance with many embodiments can provide user interfaces for viewing of evolutionary outcomes. An illustrative graphical user interface (GUI) for viewing an overview of evolutionary outcomes in accordance with an embodiment of the invention is illustrated in FIG. 46. Here, a dimensionality reduction process such as t-SNE can be applied to a set of many and/or all possible evolutions for an audio artwork, assigning each audio element produced by evolution to a position in a two-dimensional space 4601 where audio elements close to each other in space are more likely to be similar to each other than audio elements farther from each other in the space. A small icon representing each audio element can be displayed at its corresponding point in the space, e.g. 4602. Mousing over an icon 4603 can allow the user to view the audio waveform 4604, play back the audio 4605, inspect this element further 4606 for instance to identify the process that led to the creation of this evolution, and/or to ban 4607 this particular audio element from being deployed as an NFT. A logo and navigation tool 4611 can be provided for identification and navigation. Additional navigation can be provided through a back button 4612, page title 4613, and NFT naming-4614. Although FIG. 46 illustrates a particular GUI for viewing of evolutionary outcomes, any of a variety of UIs can be utilized as appropriate to the requirements of specific applications in accordance with embodiments of the invention.

A user can upload content to an NFT evolution platform service in accordance with various embodiments. NFT evolution platforms in accordance with various embodiments can import content and provide a graphical user interface (GUI) to a user, whereby a user can select tentative parameters related to the imported content, obtain feedback, and/or make potential changes in the parameter choices, including to select system-provided parameter choices.

NFT evolution platforms in accordance with various embodiments can allow users to associate content with one or more profiles and link to other users with content that a user believes is similar. NFT evolution platforms in accordance with various embodiments can identify such other users and other content. NFT evolution platforms in accordance with various embodiments can cluster content in the public domain into one or more clusters, and associate a given uploaded content element with one or more of these clusters. For each cluster, at least one strategy can be determined by an NFT evolution platform, where a strategy may correspond to a set of parameter choices that may already be associated with the content of the cluster. For example, a strategy may be to mint 10 copies of a given content element, and another strategy may be to mint 100 from a given content element. Based on such strategies, NFT evolution platforms in accordance with several embodiments may determine an estimate of profits for the content creators, e.g., based on existing sales data, and associate the profit with the strategy. This can be done for multiple strategies and multiple clusters.

NFT evolution platforms in accordance with various embodiments can determine a ranking of strategies based on various considerations including, e.g., based on estimated profit, estimated distribution speed, estimated number of content views, estimated rental income, estimated number of citations, among many other considerations. A user can prioritize each such basis for ranking. A user may want to maximize the estimated profit, whereas another user may want to maximize the number of references or citations, where an example reference or citation corresponds to a mention of content in a tweet, in a newspaper article, etc. A user may want to optimize based on the number of estimated content views, which may be influenced by the number of references. Different weights may be assigned to each one of these bases, and a weighted ranking may be performed.

NFT evolution platforms in accordance with various embodiments can allow a user to select one basis at a time and provide a ranking. A ranking may be simulated for a collection of different likely scenarios, e.g., based on historical purchases, page views, references, among other measurements, of material with various parameter choices and associated strategies.

NFT evolution platforms in accordance with various embodiments can provide a user with parameter choice that can maximize a performance of the deployment of the content under the associated strategy, and provide a probability, for a given selection made by the user, where one example selection is "maximize profits" and another is a weighted ranking based on different degrees of importance that can be assigned by a user and/or determined by the NFT evolution platforms. A parameter affecting an estimated profits associated with one or more NFTs can be the associated royalty structures. Example royalty structures are disclosed in U.S. Prov. Application 63/281,721 filed Nov. 21, 2021, entitled "Royalty Sharing Method" by Markus Jakobsson, which is herein incorporated by reference in its entirety.

NFT evolution platforms in accordance with various embodiments can automatically determine clusters of users and/or clusters of content using machine learning techniques, including k-means clustering, Gaussian mixture models, agglomerative hierarchical clustering, among others. Such clustering approaches can be applied to representations of users and/or content that include, among other things, information about content creators such as demographics, information about creators' fan bases such as size and demographic profile, information about creators' history such as number and pricing structures of past sales, textual information such as descriptions of content and/or text from social media posts about content or the creator as well as computational features extracted from this textual information, metadata about creative works such as indications of the medium and style, and/or computationally extracted features related to the content of a creative work, which may relate to a work's genre, style, subject, or other properties, and which may be extracted using machine learning and/or other techniques for visual, audio, and/or textual analysis.

NFT evolution platforms in accordance with various embodiments can provide a graphical user interface that may provide a visualization of clusters determined automatically by a clustering process to then be examined and manually adjusted by a user (e.g., a content creator and/or system administrator), in order to finetune the selection of related users and/or content used to inform the simulations. NFT evolution platforms in accordance with various embodiments can match a user to a cluster or sets of clusters using information about a user's demographics, profile, and past work, among various other factors.

NFT evolution platforms in accordance with various embodiments can allow a user to manually perform matching, where a user interface allows a user to run multiple simulations under alternative hypotheses about their cluster membership. In certain embodiments of the NFT evolution platforms, matching may be a hybrid of automated and manual assignment, where a process can initially match a user to a cluster or set of clusters and the user may use a graphical user interface to manually finetune this match and/or experimentally adjust the match to observe how simulated results change.

NFT evolution platforms in accordance with various embodiments can match a user to clusters, where users can be represented mathematically as binary vector indicating the presence or absence of membership in each cluster. In several embodiments of the NFT evolution platforms, user can be represented as a vector of real values indicating weighted assignment of membership over multiple clusters and/or may be represented as a vector whose elements correspond to a probability distribution over membership in each cluster.

NFT evolution platforms in accordance with various embodiments can perform simulations using stochastic methods including Monte Carlo methods and discrete-event simulation techniques, where probabilities of a simulated phenomenon and/or event are informed by data associated with users and content associated with the relevant clusters, weighted by the corresponding degree and/or probability of cluster membership for each cluster where applicable. Probability distributions associated with certain simulated phenomena and/or events can also be manually set, explored, and fine-tuned by system designers and/or users employing a graphical user interface, for example to set and experimentally adjust probabilities where existing data is sparse and so cannot be used on its own to compute good priors.

For example, an NFT evolution platform in accordance with various embodiments of the invention can be used by a user (e.g., content creator Mike), to configure an NFT whose associated media content changes over the lifetime of the NFT according to a particular model of change, which may be encoded as part of the NFT and/or may reside externally to the NFT and be referenced by the NFT, or known to be associated with the NFT, e.g., by a wallet. The service first presents Mike with the choice between a series of models including evolution, spawning, and peeling, and a combination of such. Each of these models can serve the user a graphical user interface for configuration of parameters pertaining to changes to the NFT's media dictated by that particular model. For example, when Mike selects an evolution model, the service can present to Mike a graphical user interface that enables him to attach media to each evolutionary stage that the NFT will undergo over its lifetime if certain configurable conditions are met, where this media may be unique to the NFT. To build this evolutionary NFT using the service, Mike specifies the desired number of evolutions his NFT will undergo and attaches media to each evolutionary stage. Next, he specifies from a list of options, an event such as the NFT is traded a specified number of times, the NFT's value reaches a specified threshold amount, or the NFT receives a specified number of likes on an NFT marketplace platform, that can trigger an evolution, causing the NFT media to change, moving from one evolutionary stage to the next. With the evolutionary event selected, Mike can specify a threshold value pertaining to the selected event for each evolutionary stage. For example, if Mike selects 'value of the NFT in ETH' as his desired evolutionary event, he may specify the exact desired ETH value which will move the NFT from one evolutionary stage to the next. Once Mike has configured all described evolutionary parameters, he may include descriptive information about his NFT, including title of the NFT and the name of the artist who created any media associated with the NFT. Mike can then press a button to signal completion of the configuration process to the service which causes the service to construct a metadata file that include configuration parameters, media files, and descriptive information about the NFT. The service can then pair this metadata with a smart contract that describes the configured evolutionary NFT, deploys the smart contract, and publishes a listing describing the NFT to a desired marketplace.

NFT evolution platforms in accordance with various embodiments can be used by a user to determine a parameterization and/or evolution of an NFT associated with at least one content element. For example, an NFT evolution platform in accordance with several embodiments of the invention can be used by user Bob to determine a parametrization and/or evolution of an NFT associated with at least one content element, which Bob uploads to the NFT evolution platforms, e.g., by using a drag-and-drop method of one or more files from his desktop. Bob can then select that this content should be associated with a strategy for evolution, peeling and/or spawning. Any of these techniques can be associated with a strategy identifying what triggers an event, what type of event can be triggered, and how the associated NFT or NFTs are maintained. These strategies can correspond to parameter choices. The same parameter choices may have been possible to make for other users in other contexts, e.g., for other NFTs. In response to the parameter choices of such other tokens, measurable results have been created in the marketplace, where these results include changes in price, changes in citations, changes in access counts, among various other measurements. A strategy that is right for one type of token may not be right for another type of content, e.g., the results caused by one strategy applied to audio files with rap music may not match the results of the same strategy as applied to audio files with rock music, or as applied to photographs of wildlife.

For each comparable NFT, a set of parameters can be determined, as well as a set of descriptors. An example parameter identifies the conditions causing the triggering of evolution. A descriptor may be a classification of content as being rap music. Descriptors may be selected by content provider and/or inferred using automated processing. A descriptor may also be associated with a cluster. There may not be a perfect match between descriptors of an uploaded content and one or more comparable, but to the extent that there is overlap, this can be used to determine, e.g., using simulations, what the results of a given strategy would be under various scenarios, where a scenario may correspond to a set of events with estimated probabilities of occurrence.

Simulations may indicate expected outcomes, e.g., how long it will take for a triggering action to take place, how the content will be modified in response to the trigger, and what the results in the marketplace are estimated to be, where example results may be the number of citations or the estimated price increase as a result of the increased number of accesses to the evolved content, among others. In many embodiments, assessments come with associated probabilities of occurrence, e.g., based on the likelihood of events in the past being similar to that of events in the future, or given an estimated speedup of events due to an increase of the marketplace, where the size of the marketplace may be measured in terms of the number of distinct users that own an NFT, for example. A user can select a parameter choice based on one or more such simulations and/or assessments.

NFT evolution platforms in accordance with various embodiments can allow users to modify selected strategies. For example, a user who selects one strategy for evolution, spawning or peeling may later wish to modify the strategy, e.g., associate a new set of parameters with the NFT. In some deployment scenarios, that can be allowed. In such scenarios, content creator Bob may log in to the service, whether before or after having sold an NFT including some particular content, and modify the strategy associated with that content. At regular time intervals, e.g., as a user wallet loads content of an NFT, the wallet may initiate a verification with a service provider associated with the content creator, where such a service provider may update the parameters associated with the NFT, according to a new strategy selected by the content creator, and thereby modify the manner in which the NFT evolves, peels or spawns.

NFT evolution platforms in accordance with various embodiments can be used to monitor content of other NFTs to determine whether simulations appear to match reality as it plays out, and based on new observations, optionally modify the recommendations made to users regarding the most beneficial strategy using some basis of evaluation selected by this user. Thus, strategy recommendations and associated parameter choices can be made in an iterative manner, and potentially with retroactive effects, e.g., causing an evolutionary event based on a triggering event that has already been observed, based on a new set of parameters for identifying such a trigger. Users may be different than the asset creator, as is the case when a curator is involved in the preparation and listing of an artwork. As a result, NFT platforms in accordance with several embodiments may be configured to monitor the inventory of an artist's wallet rather than the tool user's wallet.

NFT evolution platforms in accordance with various embodiments can review predicted performance against actual performance by monitoring actual transactions on accessible blockchains.

NFT evolution platforms in accordance with various embodiments can provide reports to users related to the efficacy of various deployments, where the efficacies are assessed according to one or more bases, such as estimated profits, estimated content views, estimated number of citations, among others.

NFT evolution platforms in accordance with various embodiments can provide visualizations to a user of already measured statistics and estimated future statistics, as quantified using one or more simulations and/or ML-based assessments.

NFT evolution platforms in accordance with various embodiments can provide users with information about likely impacts, such as estimated profits, for hypothetical situations, such as a situation in which a different parameter strategy had been chosen for some particular content. This enables the user to make better decisions for strategy selection onwards, for new content. The same intelligence can be fed into recommendation engines to provide users with improved guidance for future deployments. A user's own content may be used as reference as well as the content and NFTs of associated clusters, where a different weight can be assigned to different elements, e.g., based on their assessed similarity with a recently uploaded content element. This may allow for improved recommendations for parameter choices based on the performance of previously deployed NFTs by the same user and/or users associated with the user.

NFT evolution platforms in accordance with several embodiments of the invention can be used in concert with the techniques disclosed in U.S. patent application Ser. No. 17/808,264, filed Jun. 22, 2022, titled "Systems and Methods for Token Creation and Management", by Markus Jakobsson et al., which is herein incorporated by reference in its entirety, to provide a menu-based system that facilitates the generation of a token, where users can select parameter choices based on various simulations and associated illustrations identifying predicted outcomes, where one outcome can be a revenue associated with a token, and where predictions of the revenue may be based on a simulation indicating the likely rental royalties obtained from the rental of a token, if permitted, vs. a potential reduction of the expected resale price if the token is freely available for rent as opposed to being limited in terms of its use to the owner alone. Such simulations may draw upon economic theory, statistical observations of related events, and/or using machine learning models to predict popularity, access counts, sales revenues, among various other measurements.

NFT evolution platforms in accordance with many embodiments of the invention can allow multiple users (such as Alice and Bob) to use their individual GUIs associated with the same and/or related services to determine the parameters to be used for one or more tokens that they are collectively creating. For example, Bob can generate a derived work, based on content of Bob's, and based on a token and/or other content container previously generated by Alice. Here, both Alice and Bob may have an interest in determining the parameter choices that address their potentially differing needs. One of them may initiate a simulation or other evaluation of likely ranking of strategies associated with parameter choices and select one or more preferred strategies, then submit a request for review by the other party, who is shown simulation results, proposed strategies, and optionally, markups made by the other person. One such markup could be a comment, such as "I have tried this before, and it works well for audio. I suggest we go with this recommended parameter choice." When both parties have approved a strategy and associated parameter choice, an NFT evolution platform can initiate the generation of the resulting token. This approach generalizes to multiple stakeholders, each one of which may be indicated as having the right to make parameter changes, have the right to veto a selected parameter choice, have the right to view parameter choices, among various other rights. The rights can be determined based on assertions associated with the content contributed by the different participants, e.g., in the form of digital rights management (ORM) policies, smart contracts, digitally signed agreements, general terms of service associated with the collaborative tool associated with the disclosed GUI, among others.

NFT evolution platforms in accordance with various embodiments can provide a framework a framework for creators (e.g., musicians) to create audio-based NFTs. A user may upload a melody as an audio file. An interface can receive user input to auto-generate a set of unique musical excerpts using the uploaded melody file using AI and generative music techniques. A user interface can display a menu of auto-generated music for the user to listen to and select. The user can like or dislike each auto-generated file clicking a thumbs-up selector icon or a thumbs-down selector icon in the GUI, or to swipe left and right on mobile, where a left swipe indicates a dislike and swipe right indicates a like.

NFT evolution platforms in accordance with various embodiments can save selected files the artist likes into a collection for release. NFT evolution platforms in accordance with various embodiments can uses machine learning (ML) to learn what type of items a user chooses, allowing it to generate more items that are personalized to that user over time. A GUI may have a panel to add a visual dimension to the selected set of items as well. In a 2D interface, NFT evolution platforms in accordance with various embodiments can automatically use a time-based waveform of the audio file, and auto generate a colored background, which the user has an ability to change by uploading their own color schemes or image(s) as a background. In a 3D format, a user may be able to build a 3D vessel representing the container for each audio NFT now represented in a 3D augmented reality or virtual reality and/or Metaverse world. A user can have the ability to select the color, dimensionality, and visual aspects of the vessel in the set. NFT evolution platforms in accordance with various embodiments can provide tools to configure an appearance of the set, for example a user can represent the set of generated NFT sets as a square, or a circle, or in 3D a cube or a pyramid.

NFT evolution platforms in accordance with several embodiments of the invention can provide a GUI that provides access to tools for a user to create evolving music NFTs. Using the GUI, a user can upload a set of sound files, and select elements of the desired evolving music such as beat per minute, pitch, harmonic scale, duration, and a selection of parameters for other musical signal processing techniques like reverb, compression and filters. These settings can then be used to seed an NFT that then can evolve over time. Similar to the visual based NFTs described, users may be able to build financial models and other aspects of the release. NFT evolution platforms in accordance with various embodiments can provide a preview of the generated evolving NFTs and allow users to make adjustments to the parameters in real time to get the final output to what they want as an artist.

NFT evolution platforms in accordance with several embodiments of the invention can generate evolving musical NFTs using musical code such as Chuck, SuperCollider, or Max/MSP, among others. These programs are examples of software that can be used to make algorithmic music for composers.

NFT evolution platforms in accordance with several embodiments of the invention can files and scan a code to automatically find key parameters for music generation and evolutions, and add an API message and/or musical protocol hook to allow the artist to connect parameters of the smart contract to communicate with the composition, converting smart contract details such as price and/or number of trades into musical triggers via musical protocols such as MIDI or Open Sound Control. A GUI can allow a user to set what these musical triggers are and allows for the user to preview and test how their composition would sound based on simulated smart contract interaction.

NFT evolution platforms in accordance with many embodiments of the invention include a GUI that can provide feedback to a user from some set of reviewers (e.g., who may be workers on Amazon Mechanical Turk (™}, fans who have signed up for this service, friends who have agreed to help assess compositions, etc.) Feedback can be used for non-audio material. Related techniques are disclosed in U.S. patent application Ser. No. 17/811,853 filed Jul. 11, 2022, entitled "Artifact Origination and Content Tokenization" by Kapur et al., which is herein incorporated by reference in its entirety.

NFT evolution platforms in accordance with many embodiments of the invention can use machine learning to assist users in browsing, analyzing, and/or manipulating a scope of potential content outcomes for evolving NFTs in visual, audio, music, and/or other domains. Clustering algorithms such as k-means and Gaussian Mixture Models can be applied to group potential NFT evolutions according to perceptual similarity and/or other content measures of interest to the user, to aid a user in understanding what general types of content may be produced. Dimensionality reduction and visualization methods such as Principal Component Analysis and t-SNE can likewise be used to project possible content evolution realizations into a two- or three-dimensional space which a user can browse to understand the space of possible evolutions. NFT evolution platforms in accordance with many embodiments of the invention can use machine-learning-driven techniques for content analysis to flag problematic possible outcomes for evolving NFTs. This can include flagging evolutions that result in content that is perceptually far from other content, for instance generated melodies with properties that are uncharacteristic of melodies in a database of existing melodies, which could indicate that they sound unrealistic or displeasing. This can include flagging evolutions that violate certain desirable norms, such as detecting that modifications to a photograph of a face have transformed it beyond being recognizable as a face, detecting that spoken or text words become nonsensical, or detecting that spoken or text words contain offensive content. When problematic content is flagged within the simulation GUI, this can facilitate a user in preventing or minimizing an impact of such content after an NFT is released. For example, a user may adjust the NFT evolution process to avoid the possibility of generating such content. In several embodiments of the NFT evolution platforms, a user may specify that an evolving NFT employ checks during its evolution process to ensure that it does not evolve in particular ways. For example, disallowing evolution that leads to the specific problematic outcomes identified in the simulation GUI and/or disallowing evolution that fails algorithmic checks identified within the simulation GUI as being relevant.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A non-fungible token (NFT) evolution system, comprising:
    a plurality of computer systems, wherein:
        the plurality of computer systems:
            is connected via a network;
            comprises at least one immutable ledger; and
            provides a non-fungible token (NFT) registry, wherein entries in the NFT registry correspond to programmatically defined smart contracts written to the at least one immutable ledger; and
        at least one of the plurality of computer systems is configured as an NFT registry service, wherein the NFT registry service is configured to:

authenticate a set of content creator credentials;
mint an NFT to the at least one immutable ledger based on the authentication; and
record the minted NFT in the NFT registry, wherein the minted NFT:
is cryptographically co-signed by the NFT registry service and an authenticated content creator;
corresponds to a plurality of pieces of content;
comprises a plurality of layers, each layer associated with a particular piece of the plurality of pieces of content; and
is associated with a set of data access permissions for the plurality of layers; and
a user device that is configured by a media wallet application to:
securely store at least part of the minted NFT in a memory on the user device;
display, in a user interface, content corresponding to a first subset of layers of the plurality of layers of the minted NFT, wherein the content corresponding to the first subset of layers is displayed based on the set of data access permissions;
perform at least one of:
sending a communication to the plurality of computer systems, wherein:
the communication instructs the plurality of computer systems to write media consumption data to the at least one immutable ledger according to the set of data access permissions; and
the media consumption data corresponds to the minted NFT and the displaying of the content corresponding to the first subset of layers; or
detecting a trigger event, corresponding to a change in displayable layers of the minted NFT, wherein detecting the trigger event comprises:
accessing stored data comprising a plurality of data types, from the user device, wherein the plurality of data types comprises at least one of location data, sound data, voice data, biometric data, audio data, image data, or QR-codes; and
using the stored data to determine whether a pre-determined condition is met; and
when the trigger event is detected by the user device:
obtain a set of updated data access permissions for the plurality of layers; and
display, in the user interface, content corresponding to a second subset of layers of the plurality of layers of the minted NFT, wherein:
the second subset of layers is decrypted in response to the trigger event; and
the content corresponding to the second subset of layers is displayed based on the set of updated data access permissions.

2. The NFT evolution system of claim 1, wherein detecting a trigger event further comprises detecting at least one event selected from the group consisting of: detecting a transaction associated with the NFT; detecting a geophysical location of the user device associated with the NFT is at a particular area; detecting a certain monetary value associated with the NFT; and detecting an amount of bidding activity associated with the NFT.

3. The NFT evolution system of claim 1, wherein, when the minted NFT is recorded, the NFT registry service is configured to:
receive a smart contract that provides an asset control policy associated with the minted NFT;
store the smart contract in a storage element associated with the minted NFT; and
add the storage element to the at least one immutable ledger.

4. The NFT evolution system of claim 3, wherein:
storage elements on the at least one immutable ledger are linked; and
a more recent storage element references a prior storage element and adds data that augments the prior storage element.

5. The NFT evolution system of claim 1, wherein:
the minted NFT is associated with one or more of a particular timestamp or a particular GPS location; and
detecting the trigger event comprises retrieving at least one of a current time of day and a current GPS location of the user device.

6. The NFT evolution system of claim 1, where the NFT registry service is configured to mint a new NFT based on the trigger event.

* * * * *